US011263823B2

(12) United States Patent
Gausebeck et al.

(10) Patent No.: US 11,263,823 B2
(45) Date of Patent: Mar. 1, 2022

(54) EMPLOYING THREE-DIMENSIONAL (3D) DATA PREDICTED FROM TWO-DIMENSIONAL (2D) IMAGES USING NEURAL NETWORKS FOR 3D MODELING APPLICATIONS AND OTHER APPLICATIONS

(71) Applicant: Matterport, Inc., Sunnyvale, CA (US)

(72) Inventors: David Alan Gausebeck, Mountain View, CA (US); Babak Robert Shakib, Menlo Park, CA (US)

(73) Assignee: Matterport, Inc., Sunnyvale, CA (US)

( * ) Notice: Subject to any disclaimer, the term of this patent is extended or adjusted under 35 U.S.C. 154(b) by 507 days.

(21) Appl. No.: 16/141,649

(22) Filed: Sep. 25, 2018

(65) Prior Publication Data
US 2019/0026958 A1 Jan. 24, 2019

Related U.S. Application Data

(60) Division of application No. 16/141,558, filed on Sep. 25, 2018, which is a continuation-in-part of (Continued)

(51) Int. Cl.
*G06T 19/20* (2011.01)
*H04N 13/10* (2018.01)
(Continued)

(52) U.S. Cl.
CPC ............. *G06T 19/20* (2013.01); *G06T 7/521* (2017.01); *G06T 7/579* (2017.01); *G06T 7/593* (2017.01);
(Continued)

(58) Field of Classification Search
CPC ......... G06T 19/20; G06T 7/579; G06T 7/521; G06T 7/593; H04N 13/106; H04N 13/204; H04N 13/246
(Continued)

(56) References Cited

U.S. PATENT DOCUMENTS 6,396,496 B1   5/2002 Pfister et al.
7,054,478 B2   5/2006 Harman
(Continued)

FOREIGN PATENT DOCUMENTS

WO   2007/102663 A1   9/2007

OTHER PUBLICATIONS

International Search Report and Written Opinion for International Patent Application Serial No. PCT/US2019/053040 dated Jan. 6, 2020, 7 pages.

(Continued)

*Primary Examiner* — Clifford Hilaire
*Assistant Examiner* — Kristin Dobbs
(74) *Attorney, Agent, or Firm* — Ahmann Kloke LLP

(57) ABSTRACT

The disclosed subject matter is directed to employing machine learning models configured to predict 3D data from 2D images using deep learning techniques to derive 3D data for the 2D images. In some embodiments, a method is provided that comprises employing, by a system comprising a processor, one or more three-dimensional data from two-dimensional data (3D-from-2D) neural network models to derive three-dimensional data from one or more two-dimensional images captured of an object or environment from a current perspective of the object or environment viewed on or through a display of the device. The method further comprises, determining, by the system, a position for integrating a graphical data object on or within a representation of the object or environment viewed on or through the display based on the current perspective and the three-dimensional data.

20 Claims, 31 Drawing Sheets

Related U.S. Application Data application No. 15/417,162, filed on Jan. 26, 2017, now Pat. No. 10,848,731, which is a continuation-in-part of application No. 14/070,426, filed on Nov. 1, 2013, now Pat. No. 10,482,679, which is a division of application No. 13/776,688, filed on Feb. 25, 2013, now Pat. No. 9,324,190.

(60) Provisional application No. 61/603,221, filed on Feb. 24, 2012.

(51) Int. Cl.

| | |
|---|---|
| *H04N 13/246* | (2018.01) |
| *H04N 13/204* | (2018.01) |
| *H04N 13/106* | (2018.01) |
| *H04N 13/156* | (2018.01) |
| *G06T 7/521* | (2017.01) |
| *G06T 19/00* | (2011.01) |
| *G06T 17/00* | (2006.01) |
| *G06T 7/593* | (2017.01) |
| *H04N 13/271* | (2018.01) |
| *G06T 7/579* | (2017.01) |
| *H04N 13/00* | (2018.01) |

(52) U.S. Cl.
CPC ............ *G06T 17/00* (2013.01); *G06T 19/006* (2013.01); *H04N 13/10* (2018.05); *H04N 13/106* (2018.05); *H04N 13/156* (2018.05); *H04N 13/204* (2018.05); *H04N 13/246* (2018.05); *H04N 13/271* (2018.05); *G06T 2207/10016* (2013.01); *G06T 2207/10024* (2013.01); *G06T 2207/10052* (2013.01); *G06T 2210/04* (2013.01); *H04N 2013/0081* (2013.01); *H04N 2213/001* (2013.01)

(58) Field of Classification Search
USPC .......................................................... 348/53
See application file for complete search history.

(56) References Cited

U.S. PATENT DOCUMENTS

| | | | |
|---|---|---|---|
| 7,697,749 | B2 | 4/2010 | Ogawa |
| 8,957,919 | B2 | 2/2015 | Han et al. |
| 8,973,029 | B2 | 3/2015 | Deshpande et al. |
| 9,001,227 | B2 | 4/2015 | Aleksic et al. |
| 9,609,307 | B1* | 3/2017 | Lopez .................. H04N 13/128 |
| 10,154,244 | B2 | 12/2018 | Peterson |
| 10,860,100 | B2* | 12/2020 | Osterhout ............... G06F 1/163 |
| 2003/0227615 | A1 | 12/2003 | Montgomery et al. |
| 2003/0231788 | A1 | 12/2003 | Yukhin et al. |
| 2004/0023612 | A1 | 2/2004 | Kriesel |
| 2005/0257748 | A1 | 11/2005 | Kriesel et al. |
| 2006/0244746 | A1 | 11/2006 | England et al. |
| 2008/0170123 | A1 | 7/2008 | Albertson et al. |
| 2008/0310757 | A1 | 12/2008 | Wolberg et al. |
| 2010/0097444 | A1 | 4/2010 | Lablans |
| 2010/0194860 | A1 | 8/2010 | Mentz et al. |
| 2011/0018973 | A1 | 1/2011 | Takayama |
| 2011/0102763 | A1 | 5/2011 | Brown et al. |
| 2011/0157696 | A1 | 6/2011 | Bennett et al. |
| 2011/0211042 | A1 | 9/2011 | Thorpe et al. |
| 2012/0105574 | A1 | 5/2012 | Baker et al. |
| 2012/0162366 | A1 | 6/2012 | Ninan et al. |
| 2012/0185094 | A1 | 7/2012 | Rosenstein et al. |
| 2012/0223937 | A1 | 9/2012 | Bendall |
| 2013/0063550 | A1 | 3/2013 | Ritchey et al. |
| 2015/0288877 | A1 | 10/2015 | Glazer |
| 2016/0005179 | A1 | 1/2016 | Petyushko et al. |
| 2016/0249039 | A1 | 8/2016 | Tran et al. |
| 2016/0291136 | A1 | 10/2016 | Lindskog et al. |
| 2017/0278289 | A1* | 9/2017 | Marino ................... G06T 11/60 |
| 2018/0139431 | A1 | 5/2018 | Simek |
| 2018/0144555 | A1 | 5/2018 | Ford |
| 2018/0253869 | A1 | 9/2018 | Yumer |
| 2018/0276841 | A1 | 9/2018 | Krishnaswamy |
| 2019/0259170 | A1 | 8/2019 | Qi |

OTHER PUBLICATIONS

Final Office Action for U.S. Appl. No. 15/417,162 dated Dec. 4, 2019, 31 pages.
Non-Final Office Action received for U.S. Appl. No. 13/776,688 dated May 29, 2015, 102 pages.
Non-Final Office Action received for U.S. Appl. No. 14/070,426 dated Dec. 17, 2015, 38 pages.
Notice of Allowance received for U.S. Appl. No. 13/776,688 dated Dec. 18, 2015, 28 pages.
Non-Final Office Action received for U.S. Appl. No. 14/070,430 dated Jan. 21, 2016, 17 pages.
Non-Final Office Action received for U.S. Appl. No. 14/070,429 dated Jan. 26, 2016, 53 pages.
Non-Final Office Action received for U.S. Appl. No. 14/070,427 dated Feb. 11, 2016, 42 pages.
Non-Final Office Action received for U.S. Appl. No. 14/070,428 dated Feb. 11, 2016, 44 pages.
Final Office Action received for U.S. Appl. No. 14/070,426 dated Jun. 30, 2016, 38 pages.
Final Office Action received for U.S. Appl. No. 14/070,427 dated Aug. 11, 2016, 40 pages.
Final Office Action received for U.S. Appl. No. 14/070,428 dated Sep. 9, 2016, 41 pages.
Final Office Action received for U.S. Appl. No. 14/070,429 dated Sep. 8, 2016, 52 pages.
Non-Final Office Action received for U.S. Appl. No. 14/070,426 dated Oct. 11, 2016, 45 pages.
Non-Final Office Action received for U.S. Appl. No. 14/070,427 dated Nov. 10, 2016, 43 pages.
Final Office Action received for U.S. Appl. No. 14/070,430 dated Oct. 20, 2016, 45 pages.
Davidson et al., "MonoSLAM: Real-Time Single Camera SLAM", IEEE Transactions on Pattern Analysis and Machine Intelligence, vol. 29, IEEE Computer Society, Jun. 2007, pp. 1-16.
Yeh et al., "Semantic Image Inpainting With Perceptual and Contextual Losses", Dept. of Electrical and Computer Engineering University of Illinois at Urbana-Champaign, 2016, 10 pages.
Szeliski et al., "A Comparative Study of Energy Minimization Methods for Markov Random Fields with Smoothness-Based Priors", IEEE Transactions on Pattern Analysis and Machine Intelligence, IEEE, vol. 30, Issue 6, Jun. 2008, pp. 1068-1080.
Birchfield et al., "Depth Discontinuities by Pixel-To-Pixel Stereo", International Journal of Computer Vision, vol. 35, Issue 3, Dec. 1999, pp. 269-293.
Hirschmuller, Heiko, "Accurate and Efficient Stereo Processing by Semi-Global Matching and Mutual Information", IEEE Computer Society Conference on Computer Vision and Pattern Recognition, D.C., vol. 2, 2005, pp. 807-814.
Zabih et al., "Non-Parametric Local Transforms for Computing Visual Correspondence", European Conference on Computer Vision, Springler-Verlag New York, Inc., Secaucus, NJ, USA, vol. 3, 1994, pp. 151-158.
Hosni et al., "Secrets of Adaptive Support Weight Techniques for Local Stereo Matching", Digital Representations od the Real World: How to Capture, Model, and Render Visual Reality, Computer Vision and Image Understanding, vol. 117, Elsevier Science Inc. New York, NY, USA., 2013, pp. 620-632.
Kolmogorov et al., "Computing Visual Correspondence with Occlusion Using Graph Cuts", 3D-TV System with Depth-Image-Based Rendering Architectures, Techniques and Challenges. Computer Vision, ICCV, IEEE, 2001, 37 pages.
Sun et al., "Stereo Matching Using Belief Propogation", IEEE Transactions on Pattern Analysis and Machine Intelligence, vol. 25, Issue 7, IEEE Computer Society Washington, D.C. USA, 2003, pp. 787-800.

(56) References Cited

OTHER PUBLICATIONS

Non-Final Office Action received for U.S. Appl. No. 14/070,428 dated Jan. 12, 2017, 46 pages.
Non-Final Office Action received for U.S. Appl. No. 14/070,429 dated Jan. 12, 2017, 55 pages.
Final Office Action received for U.S. Appl. No. 14/070,426 dated May 4, 2017, 78 pages.
Non-Final Office Action received for U.S. Appl. No. 14/070,430 dated Jun. 15, 2017, 48 pages.
Non-Final Office Action received for U.S. Appl. No. 14/070,426 dated Jan. 18, 2018, 50 pages.
Final Office Action received for U.S. Appl. No. 14/070,427 dated May 18, 2017, 55 pages.
Final Office Action received for U.S. Appl. No. 14/070,428 dated Sep. 5, 2017, 68 pages.
Final Office Action received for U.S. Appl. No. 14/070,429 dated Aug. 31, 2017, 77 pages.
Final Office Action received for U.S. Appl. No. 14/070,430 dated Dec. 28, 2017, 58 pages.
Final Office Action received for U.S. Appl. No. 14/070,426 dated Sep. 13, 2018, 52 pages.
International Search Report and Written Opinion received for International Patent Application Serial No. PCT/US2018/015330 dated Apr. 19, 2018, 11 pages.
Notice of Allowance for U.S. Appl. No. 14/070,426 dated Jul. 11, 2019, 24 pages.
Notice of Allowance for U.S. Appl. No. 14/070,427 dated Sep. 5, 2019, 20 pages.
Notice of Allowance for U.S. Appl. No. 14/070,428 dated Sep. 5, 2019, 19 pages.
Notice of Allowance for U.S. Appl. No. 14/070,429 dated Sep. 4, 2019, 20 pages.
Notice of Allowance for U.S. Appl. No. 14/070,430, dated Oct. 5, 2020, 10 pages.
Notice of Allowance for U.S. Appl. No. 15/417,162 dated Jul. 14, 2020, 9 pages.
Non-Final Office Action for U.S. Appl. No. 16/141,558 dated Sep. 25, 31 pages.
Lin, Guo-Shiang et al., "2D to 3D Image Conversion Based on Classification of Background Depth Profiles," Proceedings of the 5th Pacific Rim Symposium on Advances in Image and Video Technology (PSIVT 2011), Part II, pp. 381-392, Nov. 2011.
Peng, Lim Wen et al., "3D Object Reconstruction and Representation Using Neural Networks," Proceedings of the 2nd International Conference on Computer Graphics and Interactive Techniques in Australasia and South East Asia (GRAPHITE '04) pp. 139-147, Jun. 2004.
Non-Final Office Action received for U.S. Appl. No. 15/417,162 dated May 9, 2019, 53 pages.
Xiong, "Eliminating Ghosting Artifacts for Panoramic Images," 11th IEEE International Symposium on Multimedia, Jan. 2009, pp. 432-437, IEEE, Palo Alto, CA, USA, 6 pages.
Non-Final Office Action for U.S. Appl. No. 16/141,558 dated Mar. 19, 2021, 8 pages.
Non-Final Office Action for U.S. Appl. No. 16/141,630 dated Jan. 26, 2021, 10 pages.
Non-Final Office Action for U.S. Appl. No. 16/141,638, dated Feb. 5, 2021, 13 pages.
Non Final Office Action for U.S. Appl. No. 16/141,630, dated Aug. 26, 2021, 9 pages.
Notice of Allowance for U.S. Appl. No. 16/141,638, dated Jun. 30, 2021, 8 pages.

\* cited by examiner

1100 →

```
┌─────────────────────────────────────────────┐
│ RECEIVING, BY A SYSTEM OPERATIVELY COUPLED TO│
│ A PROCESSOR, RELATED TWO-DIMENSIONAL IMAGES  │──1102
│ CAPTURED OF AN OBJECT OR ENVIRONMENT,        │
│ WHEREIN THE TWO-DIMENSIONAL IMAGES ARE       │
│ RELATED BASED ON PROVIDING DIFFERENT         │
│ PERSPECTIVES OF THE OBJECT OR ENVIRONMENT    │
└─────────────────────────────────────────────┘
                        │
                        ▼
┌─────────────────────────────────────────────┐
│ DERIVING, BY THE SYSTEM, DEPTH INFORMATION FOR│
│ AT LEAST ONE TWO-DIMENSIONAL IMAGE OF THE    │
│ RELATED TWO-DIMENSIONAL IMAGES BASED ON THE  │──1104
│ RELATED TWO-DIMENSIONAL IMAGES USING ONE OR  │
│ MORE NEURAL NETWORK MODELS AND THE RELATED   │
│ TWO-DIMENSIONAL IMAGES AS INPUT TO THE ONE OR│
│ MORE NEURAL NETWORK MODELS                   │
└─────────────────────────────────────────────┘
```

FIG. 11

EMPLOYING THREE-DIMENSIONAL (3D) DATA PREDICTED FROM TWO-DIMENSIONAL (2D) IMAGES USING NEURAL NETWORKS FOR 3D MODELING APPLICATIONS AND OTHER APPLICATIONS

RELATED APPLICATIONS

This application is a divisional of U.S. patent application Ser. No. 16/141,558 filed on Sep. 25, 2018 and entitled "EMPLOYING THREE-DIMENSIONAL (3D) DATA PREDICTED FROM TWO-DIMENSIONAL (2D) IMAGES USING NEURAL NETWORKS FOR 3D MODELING APPLICATIONS AND OTHER APPLICATIONS," which is a continuation-in-part of U.S. patent application Ser. No. 15/417,162 filed on Jan. 26, 2017 and entitled "CAPTURING AND ALIGNING PANORAMIC IMAGE AND DEPTH DATA," which is a continuation-in-part of U.S. patent application Ser. No. 14/070,426, filed on Nov. 1, 2013 and entitled, "CAPTURING AND ALIGNING THREE-DIMENSIONAL SCENES," which is a divisional of U.S. patent application Ser. No. 13/776,688, filed on Feb. 25, 2013 and entitled, "CAPTURING AND ALIGNING THREE-DIMENSIONAL SCENES," which claims the priority benefit of U.S. provisional patent application No. 61/603,221, filed on Feb. 24, 2012 and entitled "CAPTURING AND ALIGNING THREE-DIMENSIONAL SCENES." The entireties of the aforementioned applications are incorporated by reference herein.

TECHNICAL FIELD

This application generally relates to techniques for employing three-dimensional (3D) data predicted from two-dimensional (2D) images using neural networks for 3D modeling applications and other applications.

BACKGROUND

Interactive, first-person 3D immersive environments are becoming increasingly popular. In these environments, a user is able to navigate through a virtual space. Examples of these environments include first person video games and tools for visualizing 3D models of terrain. Aerial navigation tools allow users to virtually explore urban areas in three dimensions from an aerial point of view. Panoramic navigation tools (e.g. street views) allow users to view multiple 360-degree (360°) panoramas of an environment and to navigate between these multiple panoramas with a visually blended interpolation.

Such interactive 3D immersive environments can be generated from real-world environments based on photorealistic 2D images captured from the environment with 3D depth information for the respective 2D images. While methods for capturing 3D depth for 2D imagery have existed for over a decade, such methods are traditionally expensive and require complex 3D capture hardware, such as a light detection and ranging (LiDAR) devices, laser rangefinder devices, time-of-flight sensor devices, structured light sensor devices, lightfield-cameras, and the like. In addition, current alignment software remains limited in its capabilities and ease of use. For example, existing alignment methods, such as the Iterative Closest Point algorithm (ICP), require users to manually input an initial rough alignment. Such manual input typically exceeds the capabilities of most non-technical users and inhibits real-time alignment of captured imagery. Accordingly, techniques for generating 3D data for 2D images using affordable, user friendly devices and techniques for accurately and efficiently aligning the 2D images using the 3D data to generate immersive 3D environments are in high demand.

BRIEF DESCRIPTION OF THE DRAWINGS

FIG. 11 presents an example computer-implemented method for employing auxiliary data related to captured 2D image data to facilitate deriving 3D data from the captured 2D image data in accordance with various aspects and embodiments described herein.

DETAILED DESCRIPTION

Figure 1:
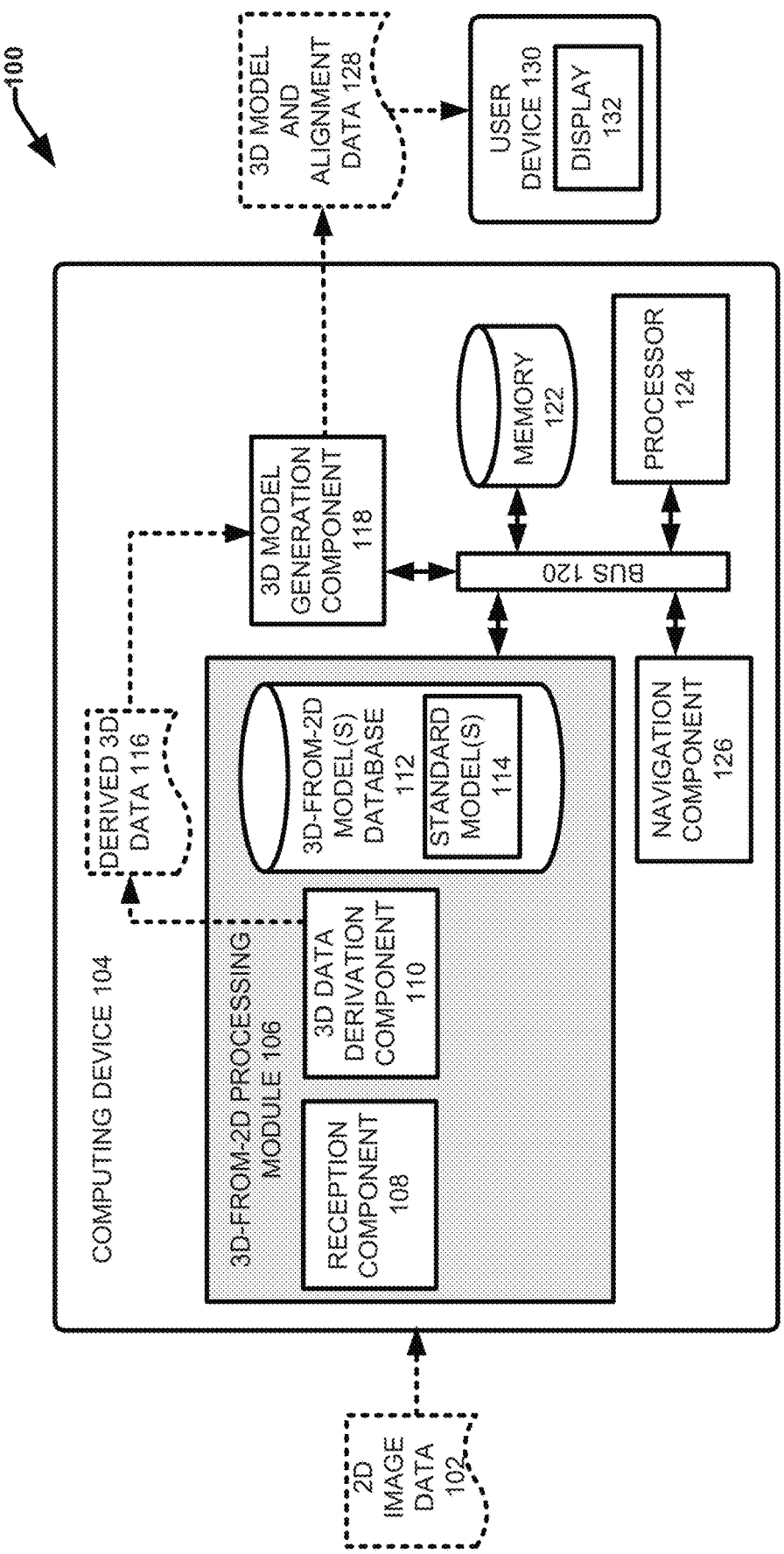
FIG. 1 presents an example system that facilitates deriving 3D data from 2D image data and generating reconstructed 3D models based on the 3D data and the 2D image data in accordance with various aspects and embodiments described herein.

By way of introduction, the subject disclosure is directed to systems, methods, apparatuses and computer readable media that provide techniques for deriving 3D data from 2D images using one or more machine learning models and employing the 3D data for 3D modeling applications and other applications. Various techniques for predicting 3D data (e.g., depth data or relative 3D positions of image pixels) from a single 2D (color or grayscale) using machine learning (referred to from herein on as "predicting 3D-from-2D" or simply "3D-from-2D") have been developed and are recently receiving increased attention. During the past decade, significant effort has been made in the research community to improve the performance of monocular depth learning, and significant accuracy has been achieved thanks to the rapid development and advances of deep neural networks.

The disclosed subject matter is directed to employing one or more machine learning models configured to predict 3D data from 2D images to derive 3D data for the 2D using deep learning techniques, including one or more neural network models. In various embodiments, the predicted depth data can be used to generate 3D models of an environment captured in the 2D image data. Other applications include employing the predicted depth data to facilitate augmented reality applications, live object tracking, live navigation of an environment, user face based biometric authentication applications, and the like. Various elements described in connection with the disclosed techniques can be embodied in computer implemented system or device and/or a different form such as a computer-implemented method, a computer program product, or another form, (and vice versa).

In one embodiment, a method for using panoramic image data to generate accurate depth predictions using 3D-from-2D is provided. The method can comprise receiving a panoramic image by a system comprising a processor, and employing, by the system, 3D-from-2D convolutional neural network model to derive 3D data from the panoramic image, wherein the 3D-from-2D convolutional neural network model employs convolutional layers that wrap around the panoramic image as projected on a 2D plane to facilitate deriving the three-dimensional data. In accordance with the subject method, the convolutional layers minimize or eliminate edge effects associated with deriving the 3D data based on wrapping around the panoramic image as projected on the 2D plane. In some implementations, the panoramic image can be received as projected on the two-dimensional plane. In other implementations, the panoramic image can be received as a spherical or cylindrical panoramic image, and wherein the method further comprises projecting, by the system, the spherical or cylindrical panoramic image on the 2D plane prior to the employing the 3D-from-2D convolutional neural network model to derive the 3D data.

In one or more implementations, the 3D-from-2D neural network model can include a model that was trained based on weighted values applied to respective pixels of projected panoramic images in association with deriving depth data for the respective pixels, wherein the weighted values varied based on an angular area of the respective pixels. For example, during training, the weighted values were decreased as the angular area of the respective pixels decreased. In addition, in some implementations, downstream convolutional layers of the convolutional layers that follow a preceding layer are configured to re-project a portion of the panoramic image processed by the preceding layer in association with deriving depth data for the panoramic image, resulting in generation of a re-projected version of the panoramic image for each of the downstream convolutional layers. In this regard, the downstream convolutional layers are further configured to employ input data from the preceding layer by extracting the input data from the re-projected version of the panoramic image. For example, in one implementation, the input data can be exacted from the re-projected version of the panoramic image based on locations in the portion of the of the panoramic image that correspond to a defined angular receptive field based the re-projected version of the panoramic image.

In another embodiment, a method for using panoramic image data to generate accurate depth predictions using 3D-from-2D is provided that can comprise receiving, by a system operatively coupled to a processor, a request for depth data associated with a region of an environment depicted in a panoramic image. The method can further comprise, based on the receiving, deriving, by the system, depth data for an entirety of the panoramic image using a neural network model configured to derive depth data from a single 2D image. The method can further comprise extracting, by the system, a portion of the depth data corresponding to the region of the environment, and providing, by the system, the portion of the depth data to an entity associated with the request.

Other embodiments of the disclosed subject matter provide techniques for optimizing 3D-from-2D based depth predictions using augmented input data in addition to a single 2D image to a 3D-from-2D neural network model and/or two or more images as input to a 3D-from-2D neural network model. For example, in one embodiment a method is provided that comprises receiving, by a system operatively coupled to a processor, a 2D image, and determining, by the system, auxiliary data for the 2D image, wherein the auxiliary data comprises orientation information regarding a capture orientation of the 2D image. The method can further comprise deriving, by the system, 3D information for the 2D image using one or more neural network models configured to infer the 3D information based on the 2D image and the auxiliary data. In some implementations, the orientation information can be determined based on internal measurement data associated with the 2D image generated by an IMU in association with capture of the 2D image.

The auxiliary data can also comprise position information regarding a capture position of the 2D image, and wherein the determining the auxiliary data comprises identifying the position information in metadata associated with the 2D image. The auxiliary data can also comprise one or more image capture parameters associated with capture of the 2D image, and wherein the determining the auxiliary data comprises extracting the one or more image capture parameters from metadata associated with the 2D image. For example, the one or more image capture parameters can comprise one or more camera settings of a camera to capture the 2D image. In another example, the one or more image capture parameters are selected from a group consisting of, camera lens parameters, lighting parameters, and color parameters.

In some implementations, the 2D image comprises a first 2D image, and wherein the method further comprises receiving, by the system, one or more second 2D images related to the first 2D image, and determining, by the system, the auxiliary data based on the one or more second 2D images. For example, the auxiliary data can comprise a capture position of the 2D image, and wherein the determining the auxiliary data comprises determining the capture position based on the one or more second 2D images. In another example, the first 2D image and the one or more second 2D images were captured in association with movement of a capture device to different positions relative to an environment, and wherein the determining the auxiliary data comprises employing at least one of, a photogrammetry algorithm, a simultaneous localization and mapping (SLAM) algorithm, or a structure from motion algorithm. In another example, the first 2D image and a second 2D image of the one or more second 2D images from a stereo-image pair, wherein the auxiliary data comprise depth data for the first 2D image, and wherein the determining the auxiliary data comprises determining the depth data based on stereo-image pair using a passive stereo function.

The method can also include receiving, by the system, depth information for the 2D image captured by a 3D sensor in association with capture of the 2D image, and wherein the deriving comprises deriving the 3D information using a neural network model of the one or more neural network models configured to infer the 3D information based on the 2D image and the depth information. Further in some implementations, the auxiliary data comprises one or more semantic labels for one or more object depicted in the 2D image, and wherein the determining the auxiliary data comprises determining, by the system, the semantic labels using one or more machine learning algorithms.

Still in other implementations, the 2D image comprises a first 2D image, and wherein the auxiliary data comprises one or more second 2D images related to the first 2D image based on comprising image data depicting a different perspective of a same object or environment as the first 2D image. For example, the first 2D image and the one or more second 2D images can comprise partially overlapping fields-of-view of the object or environment. In accordance with these implementations, the auxiliary data can further comprise information regarding one or more relationships between the first 2D image, and wherein the determining the auxiliary data comprises determining the relationship information, including determining at least one of, relative capture positions of the first 2D image and the one or more second 2D images, relative capture orientations of the first 2D image and relative capture times of the first 2D image and the one or more second 2D images.

In another embodiment, a method is provided that comprises receiving, by a system operatively coupled to a processor, related 2D images captured of an object or environment, wherein the 2D images are related based on providing different perspectives of the object or environment. The method can further comprise deriving, by the system, depth information for at least one 2D image of the related 2D images based on the related 2D images using one or more neural network models and the related 2D images as input to the one or more neural network models. In some implementations, the method further comprises determining, by the system, relationship information regarding one or more relationships between the related images, and wherein the deriving further comprises deriving the depth information using the relationship information as input to the one or more neural network models. For example, the relationship information can comprise relative capture positions of the related 2D images. In another example, the relationship information can comprise relative capture orientations of the related 2D images. In another example, the relationship information comprises relative capture times of the plurality of 2D images.

In other embodiments, a system a memory that stores computer executable components and a processor that executes the computer executable components stored in the memory. The computer executable components can comprise a reception component that receives a 2D image, and a pre-processing component that alters one or more characteristics of the 2D image to transform the image into a pre-processed image in accordance with a standard representation format. The computer executable components can further comprise a depth derivation component that derives 3D information for the pre-processed 2D image using one or more neural network models configured to infer the 3D information based on the pre-processed 2D image.

In some implementations, the pre-processing component alters the one or more characteristics based one or more image capture parameters associated with capture of the 2D image. The pre-processing component can also extract the one or more image capture parameters from metadata associated with the 2D image. The one or more image capture parameters can comprise for example one or more camera settings of a camera used to capture the 2D image. For instance, the one or more image capture parameters are selected from a group consisting of, camera lens parameters, lighting parameters, and color parameters. In some implementations, the one or more characteristics can comprise one or more visual characteristics of the 2D image and the pre-processing component alters the one or more characteristics based on variances between the one or characteristics and one or more defined image characteristics of the standard representation format.

Various additional embodiments are directed to devices and/or systems that facilitate capturing 2D images of an object or environment and deriving 3D/depth data from the images using one or more 3D-from-2D techniques in accordance with various aspects and embodiments described herein. Various permutations of the devices and/or systems are disclosed that include one or more cameras configured to capture 2D images, a 3D data derivation component configured to derive 3D data for the images, and a 3D modeling component configured to generate a 3D model of an environment included in the images. These permutations can include some embodiments in which all components are provided on a single device, embodiments in which the components are distributed between two devices, and embodiments in which these components are distributed between three devices.

For example, in one embodiment, a device is provided comprising a camera configured to capture 2D images, a memory that stores computer executable components, and a processor that executes the computer executable components stored in the memory. The computer executable components can comprise a 3D data derivation component configured to employ one or more 3D-from-2D neural network models to derive 3D data for the 2D images. In some implementations, the computer executable components can further comprise a modeling component configured to align the 2D images based on the 3D data to generate a 3D model of an object or environment included in the 2D images. In other implementations, the computer executable components can comprise a communication component configured to send the 2D images and the 3D data to an external device, wherein based on reception of the two-dimensional images and the three-dimensional data, the external device generates a 3D model of an object or environment included in the 2D images by aligning the 2D images to one another based on the 3D data. With these implementations, the communication component also be configured to receive the 3D model from the external device and device can render the 3D model via a display of the device.

In some implementations of this embodiment, the 2D images can comprise one or more images characterized as a wide field-of view image based on having a field of view exceeding a minimum threshold. In another implementation, the computer-executable components can further comprise a stitching component configured to combine two or more first images of the two-dimensional images to generate a second image having a field-of-view that is greater than respective fields-of-view of the two or more first images, and wherein the three-dimensional data derivation component is configured to employ the one or more 3D-from-2D neural network models to derive at least some of the three-dimensional data from the second image.

In some implementations of this embodiment, in addition to the camera, the device can also comprise a 3D sensor configured to capture depth data for a portion of the 2D images, wherein the 3D derivation component is further configured to employ the depth data as input to the one or more 3D-from-2D neural network models to derive the 3D data for the 2D images. For example, the 2D images can comprise panoramic color images with a first vertical field-of-view, wherein the 3D sensor comprises a structured light sensor configured capture the depth data for a second vertical field-of-view within the first vertical field-of-view, and wherein the second vertical field-of-view comprises a narrower field of view than the first vertical field-of-view.

In another embodiment, a device is provided comprising a memory that stores computer executable components, and a processor that executes the computer executable components stored in the memory. The computer executable components comprise a reception component configured to receive 2D images from a 2D image capture device, and a 3D data derivation component configured to employ one or more 3D-from-2D neural network models to derive 3D data for the 2D images. In some implementations, the computer executable components further comprise a modeling component configured to align the 2D images based on the 3D data to generate a 3D model of an object or environment included in the 2D images. The computer executable components can also comprise a rendering component configured to facilitate rendering the 3D model via a display of a device (e.g., directly, using a web-browser, using a web-application, etc.). In some implementations, the computer executable components can further comprise a navigation component configured to facilitate navigating the 3D model as displayed. In one or more alternative implementations, the computer executable components can comprise a communication component configured to send the 2D images and the 3D data to an external device, wherein based on reception of the two-dimensional images and the three-dimensional date, the external device generates a three-dimensional model of an object or environment included in the two-dimensional images by aligning the two-dimensional images to one another based on the three-dimensional data. With these implementations, the communication component can receive the 3D model from the external device, and wherein the computer executable components further comprise a rendering component configured to render the 3D model via a display of the device. The external device can further facilitate navigating the 3D model in association with accessing and rendering the 3D model (e.g., using a web-browser or the like).

Still in yet another embodiment, a device is provided comprising a memory that stores computer executable components, and a processor that executes the computer executable components stored in the memory. The computer executable components comprise a reception component configured to receive 2D images of an object or environment captured from different perspectives of the object or environment and derive depth data for respective images of the 2D images using one or more 3D-from-2D neural network models. The computer executable components further comprise a modeling component configured to align the 2D images to one another based on the depth data to generate a 3D model of the object or environment. In some implementations, the computer executable components further comprise a communication component configured to send the 3D model to a rendering device via a network for displaying at the rendering display. With these implementations, the computer executable components can also comprise a navigation component configured to facilitate navigating the 3D model as displayed at the rendering device. In one or more alternative implementations, the computer executable components can comprise a rendering component configured to facilitate rendering the 3D model via a display of the device. With this alternative implementation, the computer executable components can further comprise a navigation component configured to facilitate navigating the 3D model as displayed at the device.

In another embodiment, a method is provided that comprises capturing, by a device comprising a processor, 2D images of an object or an environment, and sending, by the device, the 2D images to a server device, wherein based on reception of the 2D images, the server device employs one or more 3D-from-2D neural network models to derive 3D data for the 2D images and generates a 3D reconstruction of the object or environment using the 2D images and the 3D data. The method further comprises receiving, by the device, the 3D reconstruction from the server device, and rendering, by the device, the 3D reconstruction via a display of the device.

In some implementations, the 2D images are captured from different perspectives of the object or environment in association with an image scan of the object or environment. With these implementations, the method can further comprise sending, by the device, a confirmation message confirming the image scan is complete. Further, based on reception of the confirmation message, the server device generates final 3D reconstruction of the object or environment. For example, in some implementation, the final 3D reconstruction has a higher level of image quality relative to the initial 3D reconstruction. In another implementation, the final 3D reconstruction comprises a navigable model of the environment and wherein the initial 3D reconstruction is not navigable. In another implementation, the final 3D reconstruction was generated using a more precise alignment process relative to an alignment process used to generate the initial 3D reconstruction.

In various additional embodiments, systems and devices are disclosed that facilitate improving AR applications using 3D-from-2D processing techniques. For example, in one embodiment, a system is provided that comprises a memory that stores computer executable components, and a processor that executes the computer executable components stored in the memory. The computer executable components can comprise a 3D data derivation component configured to employ one or more 3D-from-2D neural network models to derive 3D data from one or more 2D images captured of an object or environment from a current perspective of the object or environment viewed on or through a display of the device. The one or more computer executable components can further comprise a spatial alignment component configured to determine a position for integrating a (virtual) graphical data object on or within a representation of the object or environment viewed on or through the display based on the current perspective and the 3D data. For example, the representation of the object or environment can comprise a live view of the environment viewed through a transparent display of the device. In another implementation, the representation of the object or environment can comprise one or more 2D image and/or frames of video captured of the object or environment. In various implementations, the device can include one or more cameras that capture the one or more 2D images.

The computer executable components can further comprise an integration component configured to integrate the graphical data object on or within the representation of the object or environment based on the position. In some implementations, the computer executable components can further comprise an occlusion mapping component configured to determine a relative position of the graphical data object to another object included in the representation of the object or environment based on the current perspective and the 3D data. In this regard, based on a determination that the relative position of the graphical data object is behind the other object, the integration component can be configured to occlude at least a portion of the graphical data object located behind the other object in association with integrating the graphical data object on or within the representation of the object or environment. Likewise, based on a determination that the relative position of the graphical data object is in front of the other object, the integration component is configured to occlude at least a portion of the other object located behind the graphical data object in association with integrating the graphical data object on or within the representation of the environment.

In yet another embodiment, systems and devices are disclosed that facilitate tracking an object in real-time using 3D-from-2D processing techniques. For example, a device is provided that comprises a memory that stores computer executable components, and a processor that executes the computer executable components stored in the memory. The computer executable components can comprise a 3D data derivation component configured to employ one or more 3D-from-2D neural network models to derive 3D data from 2D images captured of an object over a period of time, and an object tracking component configured to track a position of the object over the period of time based on the 3D data. For example, the 2D image data comprises sequential frames of video data captured over the period of time. In some implementations, the object comprises a mobile object and wherein the 2D images comprise images captured from one or more fixed capture devices. In other implementations, the object comprises a fixed object and wherein the 2D image data comprises images of the object captured by a camera in association with movement of the camera over the period of time. For example, the camera can be attached to a vehicle and wherein the object tracking component is configured to track the position of the object relative to the vehicle.

It is noted that the terms "3D model," "3D object," "3D reconstruction," "3D image," "3D representation," "3D rendering," "3D construct," and the like are employed interchangeably throughout, unless context warrants particular distinctions among the terms. It should be appreciated that such terms can refer to data representing an object, space, scene, and the like in three dimensions, which may or may not be displayed on an interface. In an aspect, a computing device, such as a graphic processing unit (GPU) can generate, based on the data, performable/viewable content in three dimensions. The term "3D data," refer to data utilized to generate a 3D model, data describing a 3D model, data describing perspectives or points of view of a 3D model, capture data (e.g. sensory data, images, etc.), metadata associated with a 3D model, and the like. In various embodiments, the term 3D data and depth data are employed interchangeably throughout, unless context warrants particular distinctions among the terms.

The term image as used herein refers to a 2D image unless otherwise specified. In various embodiments, the term 2D image is used for clarity and/or merely to emphasize the fact that the image is 2D as opposed to the 3D data that is derived therefrom and/or a 3D model that is generated based on the image and the derived 3D data. It is noted that the terms "2D model," "2D image(s)," and the like are employed interchangeably throughout, unless context warrants particular distinctions among the terms. It should be appreciated that such terms can refer to data representing an object, space, scene, and the like in two dimensions, which may or may not be displayed on an interface. The terms "2D data," "2D imagery data," and like are employed interchangeably throughout, unless context warrants particular distinctions among the terms and can refer to data describing a 2D image (e.g. metadata), capture data associated with a 2D image, a 2D image, a representation of a 2D image, and the like. In an aspect, a computing device, such as a graphical processing unit (GPU), can generate, based on the data, performable/viewable content in two dimensions. In another aspect, 2D models can be generated based on captured image data, 3D imagery data, and the like. In embodiments, a 2D model can refer to a 2D representation of a 3D model, real-world scene, 3D object, or other 3D construct. As an example, a 2D model can comprise a 2D image, a set of 2D images, a panoramic 2D image, a set of panoramic 2D images, 2D data wrapped onto geometries, or other various 2D representations of 3D models. It is noted that a 2D model can include a set of navigation controls.

In addition, terms such as "navigational position," "current position," "user position," and the like are employed interchangeably throughout, unless context warrants particular distinctions among the terms. It should be appreciated that such terms can refer to data representing a position relative to a digital 3D model during user navigation and the like. For example, in accordance with various embodiments, a 3D model can be viewed and rendered from various perspectives and/or fields of view of a virtual camera relative to the 3D model in association with navigation of the 3D model, interacting with the 3D model, generating the 3D model, and the like. In some embodiments, different view or perspectives of the model can be generated based on interaction with the 3D model in one or more modes such, a walking mode, a dollhouse/orbit mode, a floor plan mode, a feature mode and the like. In an aspect, a user can provide input to a 3D modeling system and the 3D modeling system can facilitate navigation of a 3D model. As used herein, navigation of a 3D model can include altering a perspective and/or field of vision, as described in more detail below. For example, a perspective can rotate about a viewpoint (e.g., an axis or pivot point) or alternate between viewpoints, and a field of vision can enhance a region of a model, alter a size of a region of a model (e.g., "zoom in," or "zoom out," etc.), and the like.

Versions of a 3D model presented from different views or perspectives of the 3D model are referred to herein as representations or renderings of the 3D model. In various implementations, a representation of a 3D model can represent a volume of the 3D model, an area of the 3D model, or an object of the 3D model. A representation of a 3D model can include 2D image data, 3D image data or a combination of 2D and 3D image data. For example, in some implementations, a representation or rendering of a 3D model can be a 2D image or panorama associated with the 3D model from a specific perspective of a virtual camera located at a specific navigation position and orientation relative to the 3D model. In other implementations, a representation or rendering of a 3D model can be the 3D model or a part of the 3D model generated from a specific navigation position and orientation of a virtual camera relative to the 3D model and generated using aligned sets or subsets of captured 3D data employed to generate the 3D model. Still in other implementations, a representation or rendering of a 3D model can include a combination of 2D images and aligned 3D data sets associated with the 3D model.

Terms such as "user equipment," "user equipment device," "mobile device," "user device," "client device," "handset," or terms representing similar terminology can refer to a device utilized by a subscriber or user to receive data, convey data, control, voice, video, sound, 3D models, gaming, and the like. The foregoing terms are utilized interchangeably herein and with reference to the related drawings. Furthermore, the terms "user," "subscriber," "customer," "consumer," "end user," and the like are employed interchangeably throughout, unless context warrants particular distinctions among the terms. It should be appreciated that such terms can refer to human entities, human entities represented by user accounts, computing systems, or automated components supported through artificial intelligence (e.g. a capacity to make inference based on complex mathematical formalisms), which can provide simulated vision, sound recognition and so forth.

In various implementations, the components described herein can perform actions online or offline. Online/offline can refer to states identifying connectivity between one or more components. In general, "online" indicates a state of connectivity, while "offline" indicates a disconnected state. For example, in an online mode, models and tags can be streamed from a first device (e.g., a server device) to a second device (e.g., a client device), such as streaming raw model data or rendered models. In another example, in an offline mode, models and tags can be generated and rendered on one device (e.g., a client device), such that the device does not receive data or instructions from a second device (e.g., a server device). While the various components are illustrated as separate components, it is noted that the various components can be comprised of one or more other components. Further, it is noted that the embodiments can comprise additional components not shown for sake of brevity. Additionally, various aspects described herein may be performed by one device or two or more devices in communication with each other.

The above-outlined embodiments are now described in more detail with reference to the drawings, wherein like reference numerals are used to refer to like elements throughout. In the following description, for purposes of explanation, numerous specific details are set forth in order to provide a thorough understanding of the embodiments. It may be evident, however, that the embodiments can be practiced without these specific details. In other instances, well-known structures and devices are shown in block diagram form in order to facilitate describing the embodiments.

Referring now to the drawings, FIG. 1 presents an example system 100 that facilitates deriving 3D data from 2D image data and generating reconstructed 3D models based on the 3D data and the 2D image data in accordance with various aspects and embodiments described herein. Aspects of systems, apparatuses or processes explained in this disclosure can constitute machine-executable components embodied within machine(s), e.g. embodied in one or more computer readable mediums (or media) associated with one or more machines. Such components, when executed by the one or more machines, e.g. computer(s), computing device(s), virtual machine(s), etc. can cause the machine(s) to perform the operations described.

In the embodiment shown, system 100 includes a computing device 104 configured to receive and process 2D image data 102 using one or more computer-executable components. These computer-executable components can include a 3D-from-2D processing module 106 configured perform various functions associated with processing the 2D image data 102 to derive 3D data (e.g., derived 3D data 116) from the 2D image data 102. The computer-executable components can also include a 3D model generation component 118 configured to generate reconstructed 3D models of objects or environments included in the 2D image data 102 based at least in part on the derived 3D data 116. The computer-executable components can also include a navigation component 126 that facilitates navigating immersive 3D models generated by the 3D model generation component. For example, as described in greater detail infra, in various embodiments, the 2D image data 102 can include several 2D images captured of an object or environment, such as several 2D images captured of an interior of a home for example. The 3D model generation component 118 can be configured to use derived 3D data 116 corresponding to relative 3D positions of the 2D images and/or features (e.g., pixels, superpixels, objects, etc.) included in the 2D images to generate an alignment between the 2D images and/or the features included in the respective 2D images relative to a common 3D coordinate space. The 3D model generation component 118 can further employ the alignment between the 2D image data and/or the associated 3D data to generate reconstructed representations or 3D models of objects or environments represented in the 2D image data. In some embodiments, the 3D models can include immersive virtual reality VR environments that can be navigated as facilitated by the navigation component 126. In the embodiment shown, the reconstructed representations/3D models and associated alignment data generated by the 3D model generation component 118 is identified as 3D model and alignment data 128. System 100 can further include a suitable user device 130 comprising a display 132 that can receive and render the reconstructed/3D models generated by the 3D model generation component 118. For example, the user device 130 can include but is not limited to: a desktop computer, a laptop computer, a mobile phone, a smartphone, a tablet personal computer (PC), a personal digital assistant (PDA), a heads-up display (HUD), a virtual reality (VR) headset, augmented reality (AR) headset or device, a standalone digital camera, or another type of wearable computing device.

The computing device 104 can include or be operatively coupled to at least one memory 104 and at least one processor 124. The at least one memory 122 can further store computer-executable instructions (e.g., the 3D model generation component 118, the 2D-from-3D processing module 106, one or more components of the 2D-from-3D processing module 106, and the navigation component 126) that when executed by the at least one processor 124 facilitate performance of operations defined by the computer-executable instructions. In some embodiments, the memory 122 can also store data received and/or generated by the computing device, such as (but not limited to), the received 2D image data 102, the derived 3D data 116, and the 3D model and alignment data 128. In other embodiments, the various data sources and data structures of system 100 (and other systems described herein) can be stored in other memory (e.g., at a remote device or system), that is accessible to the computing device 104 (e.g., via one or more networks). The computing device 104 can further include a device bus 120 that communicatively couples the various components and data sources/data structures of the computing device 104. Examples of said processor 124 and memory 122, as well as other suitable computer or computing-based elements that can be used in connection with implementing one or more of the systems or components shown and described in connection with FIG. 1 or other figures disclosed herein, can be found with reference to FIG. 35.

In the embodiment shown, the 3D-from-2D processing module 106 can include reception component 108, 3D data derivation component 110, and a 3D-from-2D model database 112. The reception component 108 can be configured to receive 2D image data 102 for processing by the 3D-from-2D processing module 106 (and/or the 3D model generation component 118). The source of the 2D image data 102 can vary. For example, in some implementations, the reception component 108 can receive 2D image data 102 from one or more image capture devices (e.g., one or more cameras), one or more network accessible data sources (e.g., network accessible archives of 2D image data), user devices (e.g., user uploaded images from personal computing devices), and the like. In some implementations, the reception component 108 can receive 2D image data in real-time as it is captured, (or within substantially real-time as it is captured such that it is received within a manner of seconds of capture) to facilitate real-time processing applications associated with real-time derivation of 3D data from the 2D image data, including real-time generation and rendering of 3D models based on the 2D image data, live object tracking, live relative position estimation, live AR applications, and the like. In some embodiments, the 2D image data 102 can include images captured by a variety of camera types with various settings and image processing capabilities (e.g., various resolutions, field-of-views, color space, etc.). For example, the 2D image data can include standard red, green, blue (RGB) images, black and white images, high dynamic range images and the like. In some implementations, the 2D image data 102 can include images captured using a camera that is included with another device, such as mobile phone, smartphone, tablet PC, a standalone digital camera, or the like. In various embodiments the 2D image data 102 can include a plurality of images providing different perspectives of a same object or environment. With these embodiments, the image data from the respective images can combined and aligned relative to one another and a 3D coordinate space by the model generation component 118 to generate 3D models of the object or environment.

The 3D data derivation component 110 can be configured to process the received 2D image data 102 using one or more 3D-from-2D machine learning models to determine (or derive, infer, predict, etc.) derived 3D data 116 for the received 2D image data 102. For example, the 3D data derivation component 110 can be configured to employ one or more 3D-from-2D machine learning models configured to determine depth information for one or more visual features (e.g., pixels, superpixels, objects, planes, etc.) included in a single 2D image. In the embodiment shown, these one or more machine learning models can be provided in a 3D-from-2D model database 112 accessible to the 3D data derivation component 110.

In various embodiments, the 3D data derivation component 110 can employ one or more existing, proprietary and/or non-proprietary 3D-from-2D machine learning models that have been developed in the field to generate the derived 3D data 116 for received 2D image data 102. These existing 3D-from-2D models are characterized in system 100 and referred to herein as "standard models." For example, in the embodiment shown, the 3D-from-2D model database 112 can include one or more standard models 114 that can be selected and applied to the received 2D image data 102 by the 3D data derivation component 110 to generate derived 3D data 116 from the 2D image data 102. These standard models 114 can include various types of 3D-from-2D prediction models configured to receive a single 2D image as input and process the 2D image using one or more machine learning techniques to infer or predict 3D/depth data for 2D image. The machine learning techniques can include for example, supervised learning techniques, unsupervised learning techniques, semi-supervised learning techniques, decision tree learning techniques, association rule learning techniques, artificial neural network techniques, inductive logic programming techniques, support vector machine techniques, clustering techniques, Bayesian network techniques, reinforcement learning techniques, representation learning techniques, and the like.

For example, the standard models 114 can include one or more standard 3D-from-2D models that perform depth estimation using Markov random fields (MRF) techniques, conditional MRF techniques and non-parametric methods. These standard 3D-from-2D models make strong geometric assumptions that the scene structures consist of horizontal planes, vertical walls and superpixels, employing the MRF to estimate the depth by leveraging the handcrafted features. The standard models 114 can also include one or more models that perform 3D-from-2D depth estimation using non-parameter algorithms. Non-parameter algorithms learn depth from a single RGB image, relying on the assumption that the similarities between regions in the RGB images imply similar depth cues. After clustering the training dataset based on global features, these models first search the candidate RGB-D of the input RGB image in the feature space, then, the candidate pairs are warped and fused to obtain the final depth.

In various exemplary embodiments, the standard models 114 can employ one or more deep learning techniques, including deep learning techniques that use one or more neural networks, and/or deep convolutional neural networks to derive 3D data from a single 2D image. During the past decade, significant effort has been made in the research community to improve the performance of monocular depth learning, and significant accuracy has been achieved thanks to the rapid development and advances of deep neural networks. Deep learning is a class of machine learning algorithms that use a cascade of multiple layers of nonlinear processing units for feature extraction and transformation. In some implementations, each successive layer uses the output from the previous layer as input. Deep learning models can include one or more layers that learn using supervised learning (e.g., classification) and/or unsupervised learning (e.g., pattern analysis) manners. In some implementations, deep learning techniques for deriving 3D data from 2D images can learn using multiple levels of representations that correspond to different levels of abstraction, wherein the different levels form a hierarchy of concepts.

There are many existing models for 3D-from-2D depth prediction based on deep convolutional neural networks. One approach is to use fully convolutional residual networks that directly predict depth values as regression outputs. Other models use multi-scale neural networks to separate overall scale prediction from prediction of the fine details. Some models refine the results by incorporating fully-connected layers, adding conditional random field (CRF) elements to the network, or predicting additional outputs such as normal vectors and combining those with the initial depth predictions to produce refined depth predictions.

In various embodiments, the 3D model generation component 118 can employ the derived 3D data 116 for respective images received by the computing device 104 to generate reconstructed 3D models of objects or environments included in the images. The 3D models described herein can include data representing positions, geometric shapes, curved surfaces, and the like. For example, a 3D model can include a collection of points represented by 3D coordinates, such as points in a 3D Euclidean space. The collection of points can be associated with each other (e.g. connected) by geometric entities. For example, a mesh comprising a series of triangles, lines, curved surfaces (e.g. non-uniform rational basis splines (NURBS)), quads, n-grams, or other geometric shapes can connect the collection of points. For example, a 3D model of an interior environment of building can comprise mesh data (e.g., a triangle mesh, a quad mesh, a parametric mesh, etc.), one or more texture-mapped meshes (e.g., one or more texture-mapped polygonal meshes, etc.), a point cloud, a set of point clouds, surfels and/or other data constructed by employing one or more 3D sensors. In one example, the captured 3D data can be configured in a triangle mesh format, a quad mesh format, a surfel format, a parameterized solid format, a geometric primitive format and/or another type of format. For example, each vertex of polygon in a texture-mapped mesh can include a UV coordinate for a point in a given texture (e.g., a 2D texture), where U and V are axes for the given texture. In a non-limiting example for a triangular mesh, each vertex of a triangle can include a UV coordinate for a point in a given texture. A triangle formed in the texture by the three points of the triangle (e.g., a set of three UV coordinates) can be mapped onto a mesh triangle for rendering purposes.

Portions of the 3D model geometric data (e.g., the mesh) can include image data describing texture, color, intensity, and the like. For example, the geometric data can comprise data points of geometry in addition to comprising texture coordinates associated with the data points of geometry (e.g., texture coordinates that indicate how to apply texture data to geometric data). In various embodiments, received 2D image data 102 (or portions thereof) can be associated with portions of the mesh to associate visual data from the 2D image data 102 (e.g., texture data, color data, etc.) with the mesh. In this regard, the 3D model generation component 118 can generate 3D models based and 2D images and the 3D data respectively associated with the 2D images. In an aspect, data used to generate 3D models can be collected from scans (e.g. utilizing sensors) of real-world scenes, spaces (e.g. houses, office spaces, outdoor spaces, etc.), objects (e.g. furniture, decorations, goods, etc.), and the like. Data can also be generated based on computer implemented 3D modeling systems.

In some embodiments, the 3D model generation component 118 can convert a single 2D image of an object or environment into a 3D model of the object or environment based on the derived depth data 116 for the single image. According to these embodiments, the 3D model generation component 118 can use depth information for respective pixels, superpixels, features, etc., derived for the 2D image to generate a 3D point cloud, 3D mesh, or the like corresponding to the respective pixels in 3D. The 3D model generation component 118 can further register visual data of the respective pixels, superpixels, features, etc. (e.g., color, texture, luminosity, etc.) with their corresponding geometric points in 3D (e.g., colored point clouds, colored mesh, etc.). In some implementations, the 3D model generation component 118 can further manipulate the 3D model to facilitate rotating the 3D model relative to one or more axis in 3D such that the 3D point cloud or mesh can be viewed from different perspectives, alternative to the original capture perspective.

In other embodiments in which the 2D image data 102 comprises a plurality of different images captured of an environment from different capture positions and/or orientations relative to the environment, the 3D model generation component 118 can perform an alignment process that involves aligning the 2D images and/or features in the 2D images to one another and a common 3D coordinate space, based at least in part, the derived 3D data 116 for the respective images, to generate an alignment between the image data and/or the respective features in the image data. The alignment data can also include for example, information mapping respective pixels, superpixels, objects, features, etc., represented in the image data with defined 3D points, geometric data, triangles, areas, and/or volumes relative to the 3D space.

With these embodiments, the quality of the alignment will depend in part on the amount, type and accuracy of the derived 3D data 116 determined for the respective 2D images, which can vary depending on the machine learning techniques (e.g., the one or more 3D-from-2D models used) used by the 3D data derivation component 110 to generate the derived 3D data 116. In this regard, the derived 3D data 116 can include 3D position information for each (or in some implementations one or more), received 2D image (of the 2D image data 102). Depending on the machine learning techniques employed to determine the derived 3D data 116, the derived 3D data can include depth information for each and every pixel of a single 2D image, depth information for subsets or groups of pixels (e.g., superpixels), depth information for only one or more portions of a 2D image, and the like. In some implementations, the 2D images can also be associated with additional known or derived spatial information that can be used facilitate aligning the 2D image data to one another in the 3D coordinate space, including but not limited to, the relative capture position and the relative capture orientation of the respective 2D images relative to the 3D coordinate space.

In one or more embodiments, the alignment process can involve determining position information (e.g., relative to a 3D coordinate space) and visual feature information for respective points in received 2D images relative to one another a common 3D coordinate space. In this regard, the 2D images, derived 3D data respectively associated with the 2D images, visual feature data mapped to the derived 3D data geometry, and other sensor data and auxiliary data (if available), (e.g., auxiliary data described with reference to FIG. 30) can then be used as inputs to an algorithm that determines potential alignments between the different 2D images via coordinate transformations. For example, in some implementations, 3D position information for respective pixels or features derived for a single 2D image can correspond to a point cloud comprising a set of points in 3D space. The alignment process can involve iteratively aligning different point clouds from neighboring and overlapping images captured from different positions and orientations relative to an object or environment to generate a global alignment between the respective point clouds using correspondences in derived position information for the respective points. Visual feature information including correspondences in color data, texture data, luminosity data, etc. for respective points or pixels included in the point clouds can also be used (along with other sensor data if available) to generate the aligned data. The model generation component 118 can further evaluate the potential alignments for their quality, and once an alignment of sufficiently high relative or absolute quality is achieved, the 2D images may be aligned together. Through repeated alignments of new 2D images (as well as potential improvements to alignments of existing data sets), a global alignment of all or most of the input 2D images into a single coordinate frame may be achieved.

The 3D model generation component 118 can further employ the alignment between the 2D image data and/or the respective features in the image data (e.g., the alignment data of the 3D model and alignment data 128) to generate one or more reconstructed 3D models of the object or environment included in the captured 2D image data (e.g., 3D model data of the 3D model and alignment data 128). For example, the 3D model generation component 118 can also employ sets of aligned 2D image data and/or associated 3D data to generate various representations of a 3D model of the environment or object from different perspectives or views of a virtual camera position outside or within the 3D model. In an aspect, these representations can include one or more of the captured 2D images and/or image data from one or more of the 2D images.

The format and appearance of the 3D models can vary. In some embodiments, the 3D models can include photorealistic 3D representations of an object or environment. The 3D model generation component 118 can further remove objects photographed (e.g., walls, furniture, fixtures, etc.) from the 3D model, integrate new 2D and 3D graphical objects on or within the 3D model in spatially aligned positions relative to the 3D model, change the appearance of visual features of the 3D model (e.g., color, texture, etc.), and the like. The 3D model generation component 118 can also generate reconstructed views of the 3D models from different perspectives of the 3D model, generate 2D versions/representations of the 3D model, and the like. For example, the 3D model generation component 118 can generate a 3D model or representation of the 3D model of an environment corresponding to a floorplan model of the environment, a dollhouse model of the environment (e.g., in implementations in which the environment comprises an interior of an architectural space, such as house), and the like.

In various embodiments, a floorplan model can be a simplified representation of surfaces (e.g., walls, floors, ceilings, etc.), portals (e.g., door openings) and/or window openings associated with an interior environment. A floorplan model can contain locations of boundary edges for each given surface, portal (e.g., door opening), and/or window opening. A floorplan model can also include one or more objects. Alternatively, a floorplan can be generated without objects (e.g., objects can be omitted from a floorplan). In some implementations, a floorplan model can include one or more dimensions associated with surfaces (e.g., walls, floors, ceilings, etc.), portals (e.g., door openings) and/or window openings. In an aspect, dimensions under a certain size can be omitted from a floorplan. Planes included in a floorplan can be extended a certain distance (e.g., to intersect past a molding).

In various embodiments, a floorplan model generated by the 3D model generation component 118 can be a schematic floorplan of an architectural structure (e.g., house), a schematic floorplan of an interior space of an architectural structure (e.g., a house), etc. For example, the 3D model generation component 118 can generated a floorplan model of an architectural structure by employing identified walls associated with the derived 3D data 116 derived from 2D images captured of the architectural structure. In some implementations, the 3D model generation component 118 can employ common architectural notation to illustrate architectural features of an architectural structure (e.g., doors, windows, fireplaces, length of walls, other features of a building, etc.). In another example, a floorplan model can comprise a series of lines in 3D space which represent intersections of walls and/or floors, outlines of doorways and/or windows, edges of steps, outlines of other objects of interest (e.g., mirrors, paintings, fireplaces, etc.). A floorplan model can also comprise measurements for walls and/or other common annotations which appear in architectural floorplans.

A floorplan model generated by the 3D model generation component 118 can be a 3D floorplan model or a 2D floorplan model. A 3D floorplan model can comprise edges of each floor, wall, and ceiling as lines. Lines for floors, walls and ceilings can be dimensioned (e.g., annotated) with an associated size. In one or more embodiments, a 3D floorplan model can be navigated via a viewer on a remote device in 3D. In an aspect, subsections of the 3D floorplan model (e.g., rooms) can be associated with a textual data (e.g., a name). Measurement data (e.g., square footage, etc.) associated with surfaces can also be determined based on the derived 3D data corresponding to the respective surfaces and associated with the respective surfaces. These measurements can be displayed in association with viewing and/or navigation of the 3D floorplan model. Calculation of area (e.g., square footage) can be determined for any identified surface or portion of a 3D model with a known boundary, for example, by summing areas of polygons comprising the identified surface or the portion of the 3D model. Displays of individual items (e.g., dimensions) and/or classes of items can be toggled in a floorplan via a viewer on a remote device (e.g., via a user interface on a remote client device). A 2D floorplan model can include surfaces (e.g., walls, floors, ceilings, etc.), portals (e.g., door openings) and/or window openings associated with derived 3D data 116 used to generate a 3D model and projected to a flat 2D surface. In yet another aspect, a floorplan can be viewed at a plurality of different heights with respect to vertical surfaces (e.g., walls) via a viewer on a remote device.

In various embodiments, the 3D models and the various representations of the 3D models capable of being generated by the 3D model generation component 118 (e.g., different views of the 3D model, a floorplan model in 2D or 3D, etc.), and/or associated aligned 2D and 3D data can be rendered at a user device 130 via a display 132. For example, in some implementations, the 3D model generation component 118 and/or the user device 130 can generate a graphical user interface (GUI) including a 3D reconstructed model (e.g. a depth map, a 3D mesh, a 3D point cloud, a 3D colored point cloud, etc.) generated by the 3D model generation component 118.

In some embodiments, the 3D model generation component 118 can be configured to generate such reconstructed 3D models in real-time or substantially real-time as the 2D image data is received and the derived 3D data 116 for the 2D image data is generated. Accordingly, a user viewing the rendered 3D model be provided with live or substantially live feedback during the entire alignment process regarding the progression of the 3D model as new 2D image data 102 is received and aligned. In this regard, in some implementations in which the user is facilitating or controlling capture of the 2D image data 102 used to create a 3D model, system 100 can facilitate providing the user with real-time or live feedback over the course of the capture process regarding the progression of the 3D model generated based on the captured and aligned 2D image data (and derived 3D data). For example, in some embodiments, using one or more cameras (or one or more camera lenses) provided on the user device 130 or a separate camera, a user can control capturing 2D images of an environment at various positions and/or orientations relative to the environment. A capture process that involves capturing 2D image data of an environment at various nearby locations in the environment to generate a 3D model of the environment is referred to herein as a "scan." According to this example, as new images are captured, they can be provided to the computing device 104, and 3D data can be derived for the respective images and used to align them to generate a 3D model of the environment. The 3D model can further be rendered at the user device 130 and updated in real-time based on new image data as it is received over the course of capture of the 2D image data. With these embodiments, system 100 can thus provide visual feedback during the capture process regarding the 2D image data that has been captured and aligned based on derived 3D data for the 2D image data, as well as the quality of the alignment and the resulting 3D model generated therefrom. In this regard, based on viewing aligned image data, a user can monitor what has thus far been captured and aligned, look for potential alignment errors, assess scan quality, plan what areas to scan next, determine where and how to position the one or more cameras used to capture the 2D image data 102, and to otherwise complete the scan. Additional details regarding a graphical user interface that facilitates reviewing and aiding the capture process is described in U.S. Pat. No. 9,324,190 filed on Feb. 23, 2013 and entitled "CAPTURING AND ALIGNING MULTIPLE 3-DIMENSIONAL SCENES," the entirety of which is incorporated herein by reference.

Figure 2:
FIG. 2 presents an example illustration of a reconstructed environment that can be generated based on 3D data derived from 2D image data in accordance with various aspects and embodiments described herein.
Figure 3:
FIG. 3 presents another example reconstructed environment that can be generated based on 3D data derived from 2D image data in accordance with various aspects and embodiments described herein.
Figure 4:
FIG. 4 presents another example reconstructed environment that can be generated based on 3D data derived from 2D image data in accordance with various aspects and embodiments described herein.

FIGS. 2-4 present example illustrations of reconstructed 3D models of architectural environments that can be generated by the 3D model generation component 118 based on 3D data derived from 2D image data in accordance with various aspects and embodiments described herein. In the embodiments shown, the 3D models are rendered at a user device (e.g., user device 130) that is a tablet PC. It should be appreciated that type of user device at which the 3D models can be displayed can vary. In some implementations, 2D image data of the corresponding environments represented in the 3D models from which depth data was derived (e.g., via 3D derivation component 110) to generate the 3D models was captured using one or more cameras (or one or more camera lenses) of the tablet PC. In another implementation, the 2D images used to generate the respective 3D models could have been captured by one or more cameras (or one or more camera lenses) of another device. Repetitive description of like elements employed in respective embodiments is omitted for sake of brevity.

FIG. 2 provides a visualization of an example 3D model 200 of a living room in association with generation of the 3D model by the 3D model generation component 118. In this regard, the 3D model 200 as depicted is currently under construction and includes missing image data. In various embodiments, 3D model 200 can be presented to a user at the client device as the model is being constructed by the 3D model generation component 118. In this regard, as new images of the living room are captured, received and aligned with previously aligned image data based on depth data derived for the respective images (e.g., by the 3D depth derivation component 110), the 3D model 200 can be dynamically updated.

FIG. 3 provides a visualization of an example 3D floorplan model 300 that can be generated by the 3D model generation component 118 based on image data captured of the environment. For example, in one implementation, 2D image data of the portion of the house depicted in the 3D floorplan model was captured by a camera held and operated by a user as the user walked from room to room and took pictures of the house from different perspectives within the rooms (e.g., while standing on the floor). Based on the captured image data, the 3D model generation component 118 can use depth data derived from the respective images to generate the 3D floorplan model 300 which provides an entirely new (not included in the 2D image data), reconstructed top-town perspective of the environment.

FIG. 4 provides a visualization of an example 3D dollhouse view representation 400 of a model that can be generated by the 3D model generation component 118 based on image data captured of the environment. For example, in a same manner as that described above with respect to FIG. 3, in one implementation, 2D image data of the portion of the house depicted in the dollhouse view of the 3D could have been captured by a camera held and operated by a user as the user walked from room to room and took pictures of the house from different perspectives within the rooms (e.g., while standing on the floor). Based on the captured image data, the 3D model generation component 118 can use depth data derived from the respective images to generate a 3D model (e.g., a mesh) of the environment, by aligning the respective images to one another relative to a common 3D coordinate space using depth data respectively derived for the images. According to this implementation, the 3D model can be viewed from various perspectives, including the dollhouse view as shown. In this regard, based on input indicating the particular dollhouse view perspective of the 3D model is desired, the 3D model generation component 118 can generate the 3D dollhouse view representation 400 based on the 3D model and associated aligned image data.

With reference again to FIG. 1, in some embodiments the computing device 104 can further include navigation component 126. The navigation component 126 can facilitate viewing, navigating, and interacting with the 3D model. The navigation component 126 can facilitate navigating a 3D model after the 3D model has been generated and/or in association with generation of the 3D model by the 3D model generation component 118. For example, in some implementations, a 3D model generated by the 3D model generation component 118, as well as the 2D images used to create the 3D model and the 3D information associated the 3D model can be stored in memory 122 (or another accessible memory device), and accessed by the user device (e.g., via a network using a browser, via a thin client application, etc.). In association with accessing the 3D model, the user device 130 can display (e.g. via display 132) an initial representation of the 3D model from a predefined initial perspective of a virtual camera relative to the 3D model. The user device 130 can further receive user input (e.g., via a mouse, touch-screen, keyboard, gesture detection, gaze detection, etc.) indicating or requesting movement of the virtual camera through or around the 3D model to view different parts of the 3D model and/or to view different parts of the 3D space model from different perspectives and navigational modes (e.g. walking mode, dollhouse mode, feature view mode, and floor plan mode). The navigation component 126 can facilitate navigating the 3D model by receiving and interpreting the user gesture input and selecting or generating representations of the 3D model from new perspectives of the virtual camera relative to the 3D space model determined based on the user input. The representations can include 2D images associated with the 3D model as well as novel views of the 3D model derived from a combination of 2D image data and 3D mesh data. The 3D model generation component 118 can further generate and provide the corresponding representations of the 3D model for rendering at the user device 130 via the display 132.

The navigation component 126 can provide various navigation tools that allow a user to provide input that facilitates viewing different parts or perspectives of the 3D model and interacting with the different parts of the 3D model. These navigation tools can include but are not limited to: selecting a location on the representation of the 3D model for viewing (e.g., which can include a point, an area, an object, a room, a surface, etc.), selecting a location on the representation of the 3D model for positioning a virtual camera (e.g., including a waypoint), selecting an orientation for the virtual camera, selecting a field of view for the virtual camera, selecting a tag icon, moving a position of the virtual camera forward, backward, left, right, up or down), moving an orientation of the virtual camera (e.g., pan up, pan down, pan left, pan right), and selecting different viewing modes/contexts (described below). The various types of navigational tools described above allow a user to provide input indicating how to move a virtual camera relative to the 3D model to view the 3D model from a desired perspective. The navigation component 126 can further interpret received navigational input indicating a desired perspective for viewing the 3D model to facilitate determining representations of the 3D model for rendering based on the navigation input.

In various implementations, in association with generating a 3D model of an environment, the 3D model generation component 118 can determine positions of objects, barriers, flat planes, and the like. For example, based on aligned 3D data derived for respective images captured of the environment, the 3D model generation component 116 can identify barriers, walls, objects (e.g., countertops, furniture, etc.), or other 3D features included in the aligned 3D data. In some implementations, the 3D data derivation component 110 can identify or partially identify features, objects, etc. included in the 2D images and associate information with the derived 3D data for the respective features, objects, etc., identifying them and/or defining a boundary of the object or feature. In an aspect, objects can be defined as solid objects such that they cannot be passed through when rendered (e.g., during navigation, transitioning between modes and the like). Defining objects as solid can facilitate aspects of navigation of a model. For example, a user can navigate through a 3D model of an interior living space. The living space can include walls, furniture, and other objects. As a user navigates through the model, the navigation component 126 can be prevent the user (e.g., with respect to the particular representations that can be provided to the from passing through a wall or other object and movement may also be constrained according to one or more configurable constraints (e.g., viewpoint kept at a specified height above a surface of the model or a defined floor). In an aspect, the constraints can be based at least in part on a mode (e.g., walking mode) or type of a model. It is noted that, in other embodiments, objects can be defined as not solid objects such that objects can be passed through (e.g., during navigation, transitioning between modes and the like).

In one or more implementations, the navigation component 126 can provide different viewing modes or viewing contexts, including but not limited to, a walking mode, a dollhouse/orbit mode, a floor plan mode, and a feature view. Walking mode can refer to a mode for navigating and viewing a 3D model from viewpoints within the 3D model. The viewpoints can be based on a camera position, a point within a 3D model, a camera orientation, and the like. In an aspect, the walking mode can provide views of a 3D model that simulate a user walking through or otherwise traveling through the 3D model (e.g., a real-world scene). The user can rotate and move freely to view the scene from different angles, vantage points, heights, or perspectives. For example, the walking mode can provide perspectives of a 3D model from a virtual camera that corresponds to the eyes of a virtual user as the virtual user walks around the space of the 3D model (e.g., at a defined distance relative to a floor surface of the 3D model). In an aspect, during walking mode, the user may be constrained to have a camera viewpoint at a particular height above the model surface except when crouching or in the air (e.g., jumping, falling off an edge etc.). In an aspect, collision checking, or a navigation mesh can be applied such that users are restricted from passing through objects (e.g., furniture, walls, etc.). Walking mode can also consist of moving between waypoints, where the waypoints are associated with known positions of captured 2D imagery associated with the 3D model. For example, in association with navigating a 3D model in walking mode, a user can click or select a point or area in a 3D model for viewing and the navigation component 126 can determine a waypoint that is associated with a capture position of a 2D image associated with the point or area that provides an optimal view of the point or area.

The dollhouse/orbit mode represents a mode wherein a user perceives the model such that the user is outside or above the model and can freely rotate a model about a central point as well as move the central point around the model (e.g., such as with respect to dollhouse view representation 400). For example, the dollhouse/orbit mode can provide perspectives of a 3D model wherein a virtual camera is configured to view an internal environment from a position removed from the internal environment in a manner that resembles looking into a dollhouse (e.g., with one or more walls removed) at various pitches relative to a floor of the model. Multiple types of motion may be possible in dollhouse/orbit mode. For example, a viewpoint may be pitched up or down, rotated left or right around a vertical axis, zoomed in or out, or moved horizontally. The pitch, rotation-around-a-vertical-axis, and zoom motions may be relative to a central point, such as defined by an (X, Y, Z) coordinate. A vertical axis of rotation may pass through the central point. In the case of pitch and rotation-around-a-vertical-axis, those motions may maintain a constant distance to the central point. Thus, the pitch and rotation around-a-vertical-axis motions of the viewpoint may be thought of as vertical and horizontal travel, respectively, on the surface of a sphere centered on the central point. Zoom may be thought of as travel along the ray defined as passing through the viewpoint to the central point. The point on the 3D model with or without back-face culling or other ceiling removal techniques that is rendered in the center of the display may be used as the central point. Alternately, this central point may be defined by the point of a horizontal plane that is at the center of the display. This horizontal plane may be invisible, and its height may be defined by a global height of the floor of the 3D model. Alternately, a local floor height may be determined, and the intersection of the ray cast from the camera to the center of the display with the surface of the local floor height may be used to determine the central point.

The floor plan mode presents views of a 3D model that is orthogonal or substantially orthogonal to a floor of the 3D model (e.g., looking down at the model from directly above, such with respect to 3D floorplan model 300). The floor plan mode can represent a mode wherein the user perceives the model such that the user is outside or above the model. For example, a user can view all or a portion of a 3D model from an aerial vantage point. The 3D model can be moved or rotated about an axis. As an example, floor plan mode can correspond to a top down view, wherein the model is rendered such that a user looks directly down onto a model or at a fixed angle down onto the model (e.g., approximately ninety degrees above a floor or bottom plane of a model). In some implementations, a representation of a 3D model generated in floor plan mode can appear 2D or substantially 2D. The set of motion or navigation controls and mappings in floor plan mode may be a subset of those for dollhouse/orbit mode or total available controls of other models. For example, the controls for floor plan mode may be identical to those described in the context of orbital mode with the exception that the pitch is at a fix number of degrees downward. Rotation about a central point along a vertical axis is still possible as is zooming in and out toward and away from that point and moving the central point. The model may, however, only be viewed directly from above as a result of the fixing a pitch.

The feature view can provide perspectives of the 3D model from a narrower field of view than the dollhouse/orbit view context (e.g., a close-up view of a particular item or object of the 3D model). In particular, the feature view allows a user to navigate within and around the details of a scene. For example, with the feature view, a user can view different perspective of a single object included in the internal environment represented by a 3D model. In various embodiments, selection of a tag icon included in a 3D model or representation of the 3D model can result in generation of a feature view of the point, area or object associated with the tag icon (as described in greater detail infra).

The navigation component 126 can provide a mechanism for navigating within and between these different modes or perspectives of a 3D model based on discrete user gestures in either a virtual 3D space or screen-relative 2D coordinates. In some implementations, the navigation component 126 can provide navigational tools that allow a user to move a virtual camera relative to a 3D model using the various viewing modes described herein. For example, the navigation component 408 can provide and implement navigation controls that allow a user to change the position and orientation of the virtual camera relative to the 3D model as well as change the field of view of the virtual camera. In some implementations, the navigation component 126 can determine a desired position, orientation and/or field of view for the virtual camera relative to the 3D model based on received user navigational input relative to the 3D model or a visualization of the 3D model (including 2D images and mixed 2D/3D representations of the 3D model).

With reference back to FIG. 1, in accordance with one or more embodiments, the computing device 104 can correspond to a server device that facilitates various services associated with deriving 3D data from 2D images, including 3D model generation based on the 2D images and navigation of the 3D model for example. In some implementations of these embodiments, the computing device 104 and the user device 130 can be configured to operate in client/server relationship, wherein the computing device 104 provides the user device 130 access to 3D modeling and navigation services via a network accessible platform (e.g. a website, a thin client application, etc.) using a browser or the like. However, system 100 is not limited to this architectural configuration. For example, in some embodiments, one or more features, functionalities and associated components of the computing device 104 can be provided at the user device 130, and vice versa. In another embodiment, one or more features and functionalities of the computing device 104 can be provided at a capture device (not shown) used to capture the 2D image data. For example, in some implementations, the 3D-from-2D processing module 106, or at least some of the components of the 3D-from-2D processing module 106 can be provided at the capture device. According to this example, the capture device can be configured to derive the depth data (e.g., the derived 3D data 116) from the captured images and provide the images and associated depth data to the computing device 104 for further processing by the 3D model generation component 118 and optionally the navigation component. Still in another example embodiment, the one or more cameras (or one or more camera lenses) used to capture the 2D image data, the 3D-from-2D processing module, the 3D model generation component 118, the navigation component 126 and the display 132 at which the 3D model and representation of the 3D model are displayed can all be provided on a same device. Various architectural configurations of different systems and devices that can provide one or more features and functionalizes of system 100 (and additional systems described herein), are described infra with reference to FIGS. 14-25.

In this regard, the various components and devices of system 100 and additional systems described herein can be connected either directly or via one or more networks. Such network(s) can include wired and wireless networks, including but not limited to, a cellular network, a wide area network (WAN, e.g. the Internet), a local area network (LAN), or a personal area network (PAN). For example, the computing device 104 and the user device 130 can communicate with one another using virtually any desired wired or wireless technology, including, for example, cellular, WAN, Wi-Fi, Wi-Max, WLAN, Bluethooth™, near field communication, etc. In an aspect, one or more components of system 100 and additional systems described herein are configured to interact via disparate networks.

Figure 5:
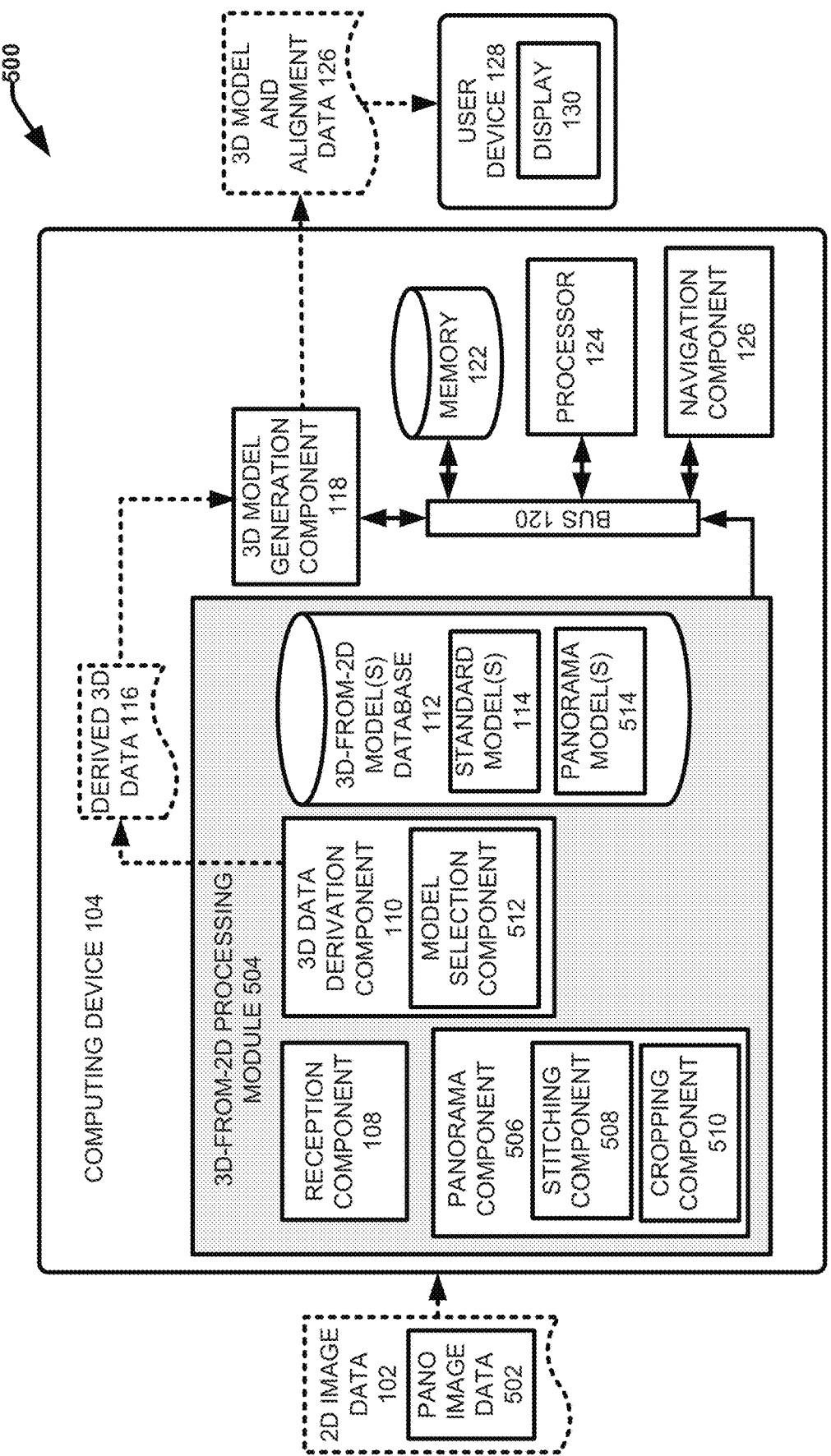
FIG. 5 presents another example system that facilitates deriving 3D data from 2D image data and generating reconstructed 3D models based on the 3D data and the 2D image data in accordance with various aspects and embodiments described herein.

FIG. 5 presents another example system 500 that facilitates deriving 3D data from 2D image data and generating reconstructed 3D models based on the 3D data and the 2D image data in accordance with various aspects and embodiments described herein. System 500 includes same or similar features as system 100 with the addition of panorama image data (e.g., pano-image data 502) as input. System 500 further includes an upgraded 3D-from-2D processing module 504 that varies from 3D-from-2D processing module 106 with respect to the addition of panorama component 506, model selection component 512, and one or more 2D-from-3D panorama models 514, (hereinafter panorama models 514) to the 2D-from-3D model database 112. Repetitive description of like elements employed in respective embodiments is omitted for sake of brevity.

System 500 is particularly configured to receive and process 2D image data having relatively wide fields-of-view, referred to herein a panoramic image data and identified in system 100 as pano-image data 502. The term panoramic image or panoramic image data is used herein to refer to a 2D image of an environment that has a relatively wide field-of-view compared to standard 2D images, which generally have a comparatively narrow field-of-view between about 50° and 75°. On the contrary, a panoramic image can have a field-of-view that spans up to 360° in the horizontal direction (e.g., a cylindrical panoramic image), or in both a horizontal and vertical direction (e.g., a spherical panoramic image). In this regard, in some contexts, the term panoramic image as used herein can refer to an image having a field-of-view that is equal to or substantially equal to 360° horizontally and/or vertically. In other contexts, the term panoramic image as used herein can refer to an image having a field of view less than 360° but greater than a minimum threshold, such as 120°, 150°, 180° (e.g., provided by a fisheye lens), or 250° for example.

Using panorama images as input to one or more 2D-from-3D models to derive 3D data therefrom produces significantly better results than using standard 2D images as input (e.g., with fields-of-view less than 75°). In accordance with these embodiments, system 500 can include one or more panoramic 3D-from-2D models that have been specifically trained to derive 3D data from panoramic images, referred to herein and depicted in system 500 as panorama models 514. The 3D data derivation component 110 can further include model selection component 512 to select one or more appropriate models included in the 3D-from-2D model database 112 to use to derive 3D data from a received 2D image based on one or more parameters associated with the input data, including whether the input data comprises a 2D image with a field-of-view exceeding a defined threshold so as to classify it as a panoramic image (e.g., 120°, 150°, 180°, 250°, 350°, 359° etc.). In this regard, based on reception of pano-image data 502 (e.g., an image with a field-of-view greater than a minimum threshold), and/or generation of a panoramic image by the stitching component 508 (as discussed infra), the model selection component 512 can be configured to select the one or more panorama models 514 for application by the 3D data derivation component 110 to determine the derived 3D data 116 for the pano-image data 502.

The one or more panorama models 514 can employ a neural network model that has been trained on panoramic images with 3D ground truth data associated therewith. For example, in various implementations, the one or more panorama models 514 can be generated based on 2D panoramic image data with associated 3D data (referred to herein as 2D/3D panoramic data) that was captured by a 2D/3D capture device in association with capture of the 2D panoramic image data. The 2D/3D panoramic capture device can incorporate one or more cameras (or one or more camera lenses) that provide a field-of-view up to a 360°, as well as one or more depth sensors that provide a filed-of-view up to 360°, thereby providing for capture of an entire panoramic image and panoramic depth data associated therewith to be captured simultaneously and merged into a 2D/3D panoramic image. The depth sensors can include one or more 3D capture devices that use at least some hardware to capture depth information. For example, the depth sensors can include but are not limited to LiDAR sensors/device, laser rangefinder sensors/devices, time-of-flight sensors/devices, structured light sensors/devices, lightfield-camera sensors/device, active stereo depth derivation sensors/devices, etc.). In other embodiments, the panoramic 2D/3D training used to develop the one or more panorama models 514 can include panoramic image data and associated 3D data generated by a capture device assembly that incorporates one or more color cameras and one or more 3D sensors attached to a rotating stage, or otherwise a device configured to rotate about an axis during the capture process (e.g., using synchronized rotation signals). During rotation, multiple images and depth readings are captured which can be merged into a single panoramic 2D/3D image. In some implementations, by rotating the stage, images with mutually overlapping fields-of-view but different viewpoints are obtained, and 3D information can be derived from them using stereo algorithms. The 2D/3D panoramic training data can also be associated with information identifying a capture position and a capture orientation of the 2D/3D panoramic image, which can be generated by the 2D/3D capture device and/or derived in association with the capture processes. Additional details regarding a graphical user interface that facilitates reviewing and aiding the capture process is described in U.S. patent application Ser. No. 15/417,162 filed on Jan. 26, 2017 and entitled "CAPTURING AND ALIGNING PANORAMIC IMAGE AND DEPTH DATA," the entirety of which is incorporated herein by reference.

In various embodiments, the one or more panorama models 514 can employ an optimized neural network architecture that has been specifically trained based on the 2D/3D panoramic image training data discussed above, to evaluate and process panoramic image to derive 3D data therefrom. In various embodiments, unlike various existing 3D-from-2D models (e.g., the standard models 114), the one or more panorama models 514 can employ a neural network that is configured to process the panoramic image data using convolutional layers that wrap around the panoramic image as projected onto a flat (2D) plane. For example, an image projection can refer to mapping of a flat image onto a curved surface, or vice versa. In this regard, the geometry of a panoramic image is different from that of a normal (camera) picture in the aspect that all points along a horizontal (scan) line are equidistant from the camera's focal point. This, in effect, creates a cylindrical or spherical image that only appears correctly when viewed from the exact center of the cylinder. When the image is "unrolled" on a flat surface, such as a computer monitor, the image has heavy distortions. Such an "unrolled" or flat version of a panoramic image is sometimes referred to as an equirectangular projection or equirectangular image.

In this regard, in some implementations, the one or more panorama models 514 can be configured to receive pano-image data 502 that is in the form of an equirectangular projection or has otherwise been projected onto a 2D plane. In other implementations, the panorama component 504 can be configured to project received the spherical or cylindrical panoramic image onto a 2D plane to generate the projected panoramic image in equirectangular form. In order to account for the inherent distortion in the received panoramic image data in association with deriving depth information therefrom, the one or more panorama models can employ a neural network with convolutional layers that wrap around based on the image projection to account for edge effects. In particular, convolutional layers in a neural network typically pad their inputs with zeros when their receptive field would otherwise extend outside the valid data region. To correctly handle an equirectangular image, convolutional layers with a receptive field extending off one horizontal edge of the valid data region would instead draw inputs from data at the opposite horizontal edge of the region rather than setting those inputs to zero.

In some implementations, weighting based on the image projection can be performed during training of the neural network model to enhance the accuracy of depth prediction of the trained model. In particular the angular area represented by a pixel near the top or bottom of an equirectangular image (the poles) is smaller than the angular area represented by a pixel near the equator. To avoid training a network that makes good predictions near the poles at the expense of making poor predictions near the equator, the per-pixel training loss propagated through the network during training is proportional to the angular area represented by that pixel based on the image projection. As a result, the one or more panorama models 514 can be configured to apply weighted 3D-from-2D parameters that are based on the angular area represented by that pixel, wherein the weight attributed to 3D predictions determined for respective pixels decreases as the angular area decreases.

In one or more implementations, the one or more panorama models 514 can further be configured to compensate for image distortions by re-projecting the panoramic image during each convolutional layer. In particular, instead of each convolutional layer drawing inputs from a square region of the previous layer (e.g., a 3×3 region), the inputs can instead be sampled from locations in the previous layer that correspond to a particular angular receptive field based on the projection. For example, with an equirectangular projection, the inputs to a convolutional layer might be from a square region (3×3) for an element near the equator, while near the poles those same nine inputs would be sampled from a region that is wider than it is tall, corresponding to the horizontal stretching near the poles in an equirectangular projection. In this regard, the output of a preceding convolutional layer can be interpolated and then used as input to the next subsequent or downstream layer.

In various embodiments, the panorama component 506 can facilitate processing panoramic images to facilitate deriving 3D data therefrom by the 3D data derivation component 110 using the one or more panorama models 514. In the embodiment shown, the panorama component 506 can include stitching component 508 and cropping component 510.

In some implementations, the received pano-image data 502 can be directly input to the one or more panorama models 514 based on being classified as a panoramic image (e.g., having a field-of-view exceeding a defined threshold). For example, a received pano-image data 502 can include 360° panoramic images captured as single image captures using a capture device that employs a cone-shaped mirror. In other example, the received pano-image data 502 can include an image with a 180° field-of-view captured as a single image capture using a fisheye lens for example. Still in other implementations, a 2D panoramic image can be formed via combination of two or more 2D images whose collective fields-of-view span up to about 360° which were stitched together (by another device) prior to reception by the reception component 108.

In other implementations, the panorama component 506 can include a stitching component 508 that can be configured to generate a panoramic image for input to the one or more panorama models 514 based on reception of two or more images with neighboring perspectives of an environment. For example, in some implementations, the two or more images can be captured in association with rotation of a camera about an axis to capture two or more images whose collective fields of view equate to a 360° or another wide field-of-view range (e.g., greater than 120°). In another example, the two or more images can include images respectively captured by two or more cameras positioned relative to an environment and one another such that the combined fields-of-view of the respective image captures equals up to 360°, such as two fisheye cameras each with 180° fields-of-view positioned in opposite directions. In another example, a single device can include two or more cameras with partially overlapping fields of view configured to capture two or more images whose collective fields of view span up to 360°. With these embodiments, the stitching component 508 can be configured to stitch the respective images together to generate a single panoramic image for use as input to the one or more panorama models 514 to generate the derived 3D data 116 therefrom.

In this regard, the stitching component 508 can be configured to align or "stitch together" respective 2D images providing different perspectives of a same environment to generate a panoramic 2D image of the environment. For example, the stitching component 508 can also employ known or derived (e.g., using techniques described herein)

information regarding the capture positions and orientations of the respective 2D images to align and order the respective 2D images relative to one another, and then merge or combine the respective images to generate a single panoramic image. By combining two or more 2D images into a single, larger field-of-view image before input to a 3D-from-2D prediction neural network model, the accuracy of the depth results is enhanced as compared to providing the inputs separately and combining the depth outputs afterwards (e.g., combining in association with generating a 3D model or for another application). In other words, stitching the input images in 2D can give better results than stitching the predicted depth outputs in 3D.

Thus, in some embodiments, a wider field-of-view image generated by the stitching component 508 can be processed using one or more standard models 114 or panorama models 514 to obtain a single set of depth data for the wider field-of-view image as opposed to processing each image separately to obtain separate sets of depth data for each image. In this regard, the single set of depth can be associated with enhanced accuracy relative to the separate sets of depth data. Further, the 3D model generation component 118 can use the wider field-of-view image and its associated single set of depth data in association with generating a 3D model by aligning the wider field-of-view images and its associated depth data with other images and depth data capture for the environment at different capture locations. The resulting alignment generated using the wider field-of-view image and associated depth data will have greater accuracy relative an alignment generated using separate images and associated separate sets of depth data.

In some embodiments, prior to stitching two or more images together to generate a panoramic image, depth information can be derived for the respective images by the 3D data derivation component 110 using one or more standard models 114. The stitching component 508 can further employ this initial derived depth information for the respective images (e.g., pixels in the respective images, features in the respective images, etc.) to facilitate aligning the respective 2D images to one another in association with generating a single 2D panoramic image of the environment. In this regard, initial 3D data can be derived for the individual 2D images prior to stitching using one or more standard 3D-from-2D models. This initial depth data can be used to align the respective images to one another in association with combining the images to generate a single panoramic image. Once generated, the panoramic image can be re-processed by the 3D data derivation component 110 using the one or more panorama models 514 to derive more precise 3D data for the panoramic image.

In some implementations, in association with combining two or more images together to generate a panoramic image, the stitching component 508 can project the respective images onto a common 3D coordinate space based on the initial derived depth information and calibrated capture positions/orientations of the respective images to the 3D coordinate space. In particular, the stitching component 508 can be configured to project two or more neighboring images (for stitching together as a panorama) and the corresponding initial derived 3D depth data to a common spatial 3D coordinate space to facilitate accurately aligning respective images in association with generating a single panoramic image. For example, in one embodiment, the stitching component 508 can merge the respective image data and initial derived 3D for the respective images onto a discretized sinusoidal projection (or another type of projection). The stitching component 508 can transform each 3D point included in the initially derived 3D data into the coordinate space of the sinusoidal map and assign it to a discretized cell. The stitching component 508 can further average multiple points mapped to the same cell to reduce sensor noise while detecting and removing outlier readings from the average calculation.

In some implementations, the stitching component 508 can further generate panoramic 3D images (e.g., point clouds, depth maps, etc.) based on the projected points relative to the 3D coordinate space. For example, the stitching component 508 can employ the initial depth data to create a sinusoidal depth map or a point cloud comprising 3D points projected onto a common 3D spatial coordinate plane. The stitching component 508 can further apply pixel color data to the depth map or point cloud by projecting the color data from the respective 2D images onto the depth map or point cloud. This can involve casting rays out from the color cameras along each captured pixel towards the interesting portion of the depth map or point cloud to colorize the depth map or point cloud. The stitching component 508 can further perform reverse-projecting of color data from colored point clouds or depth maps to create a single 2D panoramic image. For example, by reverse-projecting color data from a colored point cloud or 3D depth map onto an intersecting point or area of a 2D panorama, the stitching component 508 can fill in any possible small holes in the panorama with neighboring color data, thereby unifying exposure data across the boundaries between the respective 2D images (if necessary). The stitching component 508 can further perform blending and/or graph cuts at the edges to remove seams. The resulting panoramic image can then be re-processed by the 3D data derivation component 110 to determine more precise 3D data for the panoramic image using one or more panorama models 514.

In some embodiments, panoramic image data captured for an environment can be used to generate optimized derived 3D data (e.g., derived by the 3D data derivation component 110 using 3D-from-2D) for a smaller or cropped portion of the panoramic image. For example, in the embodiments described above, the 3D data derivation component 110 can use the one or more panorama models 514 to process a panoramic image (e.g., in equiangular projection form), to generate depth data for the entire panoramic image, such as depth data for each and every pixel, depth data for groups pixels (e.g., superpixels, defined features, objects, etc.) that collectively cover the span of the entire panoramic image, and the like. However, in various applications, depth data for an entire panoramic image may not be desired or necessary. For example, depth data for a wide field-of-view of an environment may not be necessary in various contexts associated with using 3D-from-2D to optimize placement of digital objects in an AR application (e.g., which may only require depth for an object in line of sight or depth data of a region of an environment or object in the immediate view of the observer). (AR applications of the disclosed techniques for deriving 3D-from-2D are described infra with reference to FIG. 30). In another example, depth data for a wide field-of-view may not be necessary in association with using derived 3D data to generate live relative 3D position data for autonomous navigation and collision avoidance by intelligent machines (e.g., drones, self-driving vehicles, robots, etc.). For instance, accurate live depth data for object avoidance may only be needed for a forward trajectory path of the vehicle for instance.

In some embodiments in which depth data is desired for a smaller field-of-view of an environment relative to an entire panoramic view of the environment, a panoramic image of the environment can still be used to generate optimized derived 3D data for the desired cropped portion of the image. For example, the 3D data derivation component 110 can apply one or more panorama models 514 to a panoramic image of an environment to derive depth data for the panoramic image. The cropping component 510 can then crop the panoramic image with the derived 3D data associated therewith, to select a desired portion of the image. For example, the cropping component 510 can select a portion of the panoramic image corresponding to a narrower field-of-view. In another example, the cropping component 510 can crop the panoramic image to select a specific segmented object in the panoramic image (e.g., a person, a face, a tree, a building, etc.). Techniques for determining the desired portion of the panoramic image for cropping can vary based on the application of the resulting 3D data. For example, in some implementations, user input can be received that identifies or indicates the desired portion for cropping. In another implementation in which the derived 3D data is used for live object tracking for example, the cropping component 510 can receive information identifying a desired object being tracked, information defining or characterizing the object, etc., and the automatically crop the panoramic image to extract the corresponding object. In another example, the cropping component 510 can be configured to crop the panoramic image according to a default setting (e.g., to select a portion of the image having a low degree of distortion effects). The cropping component 510 can further identify and correlate corresponding derived 3D data associated with the cropped portion of the panoramic image and associate the corresponding portion of the derived 3D data with the cropped portion of the panoramic image.

With these embodiments, by deriving depth data for an entire panoramic image using the one or more panorama models 514, and then using only a portion of the derived depth data associated with a desired cropped portion of the panoramic image, the accuracy of the derived depth data associated with the cropped portion of the panoramic image can be optimized relative to cropping the panoramic image first and then deriving depth data for the smaller field-of-view portion of the panoramic image using one or more standard 2D-from-3D models 114 or alternative depth derivation techniques.

Figure 6:
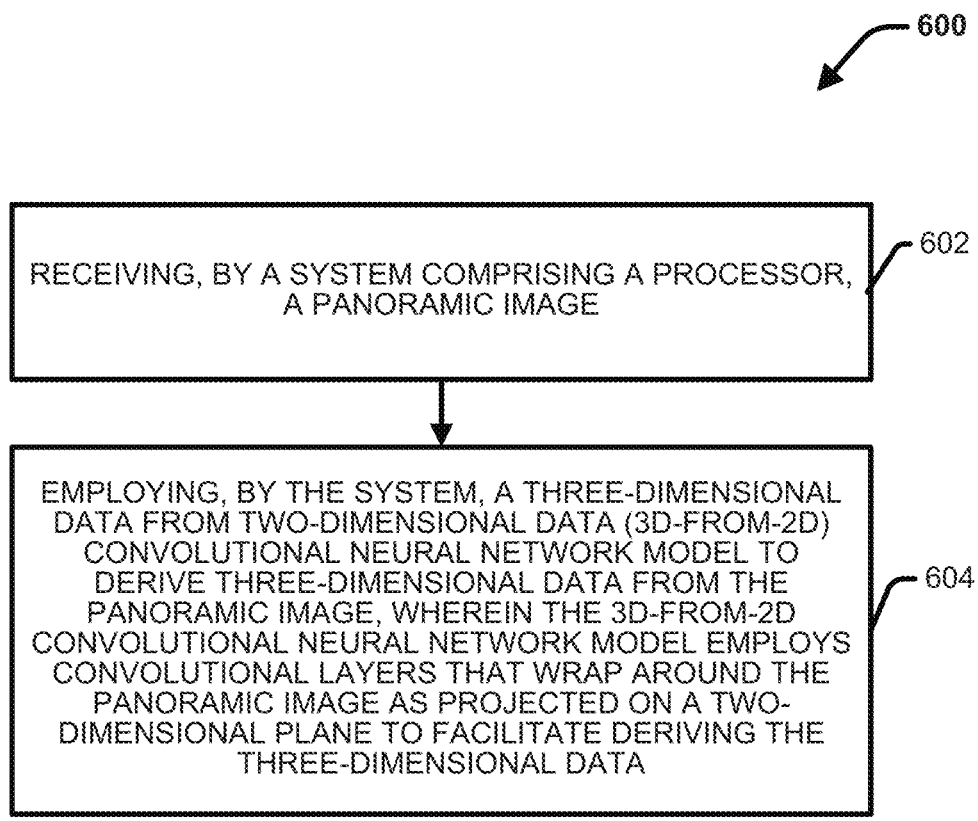
FIG. 6 presents an example computer-implemented method for deriving 3D data from panoramic 2D image data in accordance with various aspects and embodiments described herein.

FIG. 6 presents an example computer-implemented method 600 for deriving 3D data from panoramic 2D image data in accordance with various aspects and embodiments described herein. Repetitive description of like elements employed in respective embodiments is omitted for sake of brevity.

At 602, a system comprising a processor (e.g., system 500) can receive a panoramic image. At 604, the system employs a 3D-from-2D convolutional neural network model to derive 3D data from the panoramic image, wherein the 3D-from-2D convolutional neural network model employs convolutional layers that wrap around the panoramic image as projected on a 2D plane to facilitate deriving the three-dimensional data. In accordance with method 600, the convolutional layers minimize or eliminate edge effects associated with deriving the 3D data based on wrapping around the panoramic image as projected on the 2D plane. In some implementations, the panoramic image can be received as projected on the two-dimensional plane. In other implementations, the panoramic image can be received as a spherical or cylindrical panoramic image, and the system can project (e.g., using the panorama component 506) the spherical or cylindrical panoramic image on the 2D plane prior to the employing the 3D-from-2D convolutional neural network model to derive the 3D data.

In one or more implementations, the 3D-from-2D convolutional neural network accounts for weighted values applied to respective pixels based on their projected angular area during training. In this regard, the 3D-from-2D neural network model can include a model that was trained based on weighted values applied to respective pixels of projected panoramic images in association with deriving depth data for the respective pixels, wherein the weighted values varied based on an angular area of the respective pixels. For example, during training, the weighted values were decreased as the angular area of the respective pixels decreased. In addition, in some implementations, downstream convolutional layers of the convolutional layers that follow a preceding layer are configured to re-project a portion of the panoramic image processed by the preceding layer in association with deriving depth data for the panoramic image, resulting in generation of a re-projected version of the panoramic image for each of the downstream convolutional layers. In this regard, the downstream convolutional layers are further configured to employ input data from the preceding layer by extracting the input data from the re-projected version of the panoramic image. For example, in one implementation, the input data can be exacted from the re-projected version of the panoramic image based on locations in the portion of the of the panoramic image that correspond to a defined angular receptive field based the re-projected version of the panoramic image.

Figure 7:
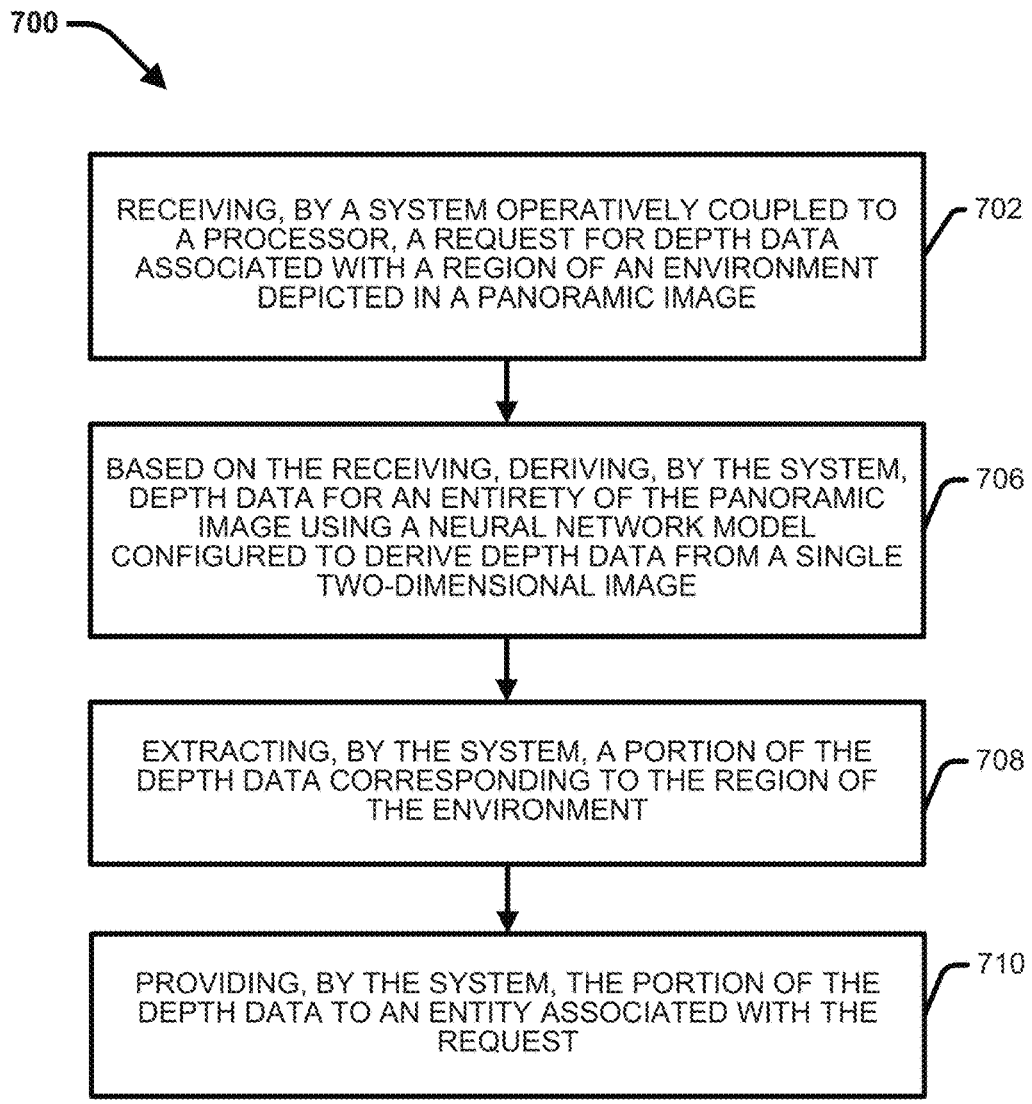
FIG. 7 presents an example computer-implemented method for deriving 3D data from panoramic 2D image data in accordance with various aspects and embodiments described herein.

FIG. 7 presents an example computer-implemented method for deriving 3D data from panoramic 2D image data in accordance with various aspects and embodiments described herein. Repetitive description of like elements employed in respective embodiments is omitted for sake of brevity.

At 702, a system operatively coupled to a processor (e.g., system 500), receives a request for depth data associated with a region of an environment depicted in a panoramic image. For example, in some implementations, the request can be received from a user device based on input provided by a user requesting a particular portion of the panoramic image for viewing in 3D, for using in association with a 3D imaging or modeling application, and the like. In another example, the request can be received from the 3D modeling application in association with a determination that depth data for that region is needed to facilitate an alignment process or to generate a 3D model. In another example, the request can be received from an AR application based on information indicating the region of the environment is within a current field of view of a user employing the AR application. In yet another example, the request can be received from an autonomous navigating vehicle based on information indicating the region of the environment is within a current field-of-view of the vehicle (e.g., to facilitate collision avoidance with objects in front of the vehicle). Still in another example, the request can be received from an object tracking device based on information indicating an object being tracked by the device is located within the region of the environment.

At 704, based on the receiving the request, the system can derive depth data for an entirety of the panoramic image using a neural network model configured to derive depth data from a single two-dimensional image (e.g., via 3D data derivation component 110 using one or more panorama models 514). At 704, the system extracts a portion of the depth data corresponding to the region of the environment (e.g., via cropping component 510), and at 708, the system provides the portion of the depth data to an entity (e.g., the device, system, user device, application, etc. from which the request was received) associated with the request (e.g., via panorama component 505, the computing device 104, etc.).

Figure 8:
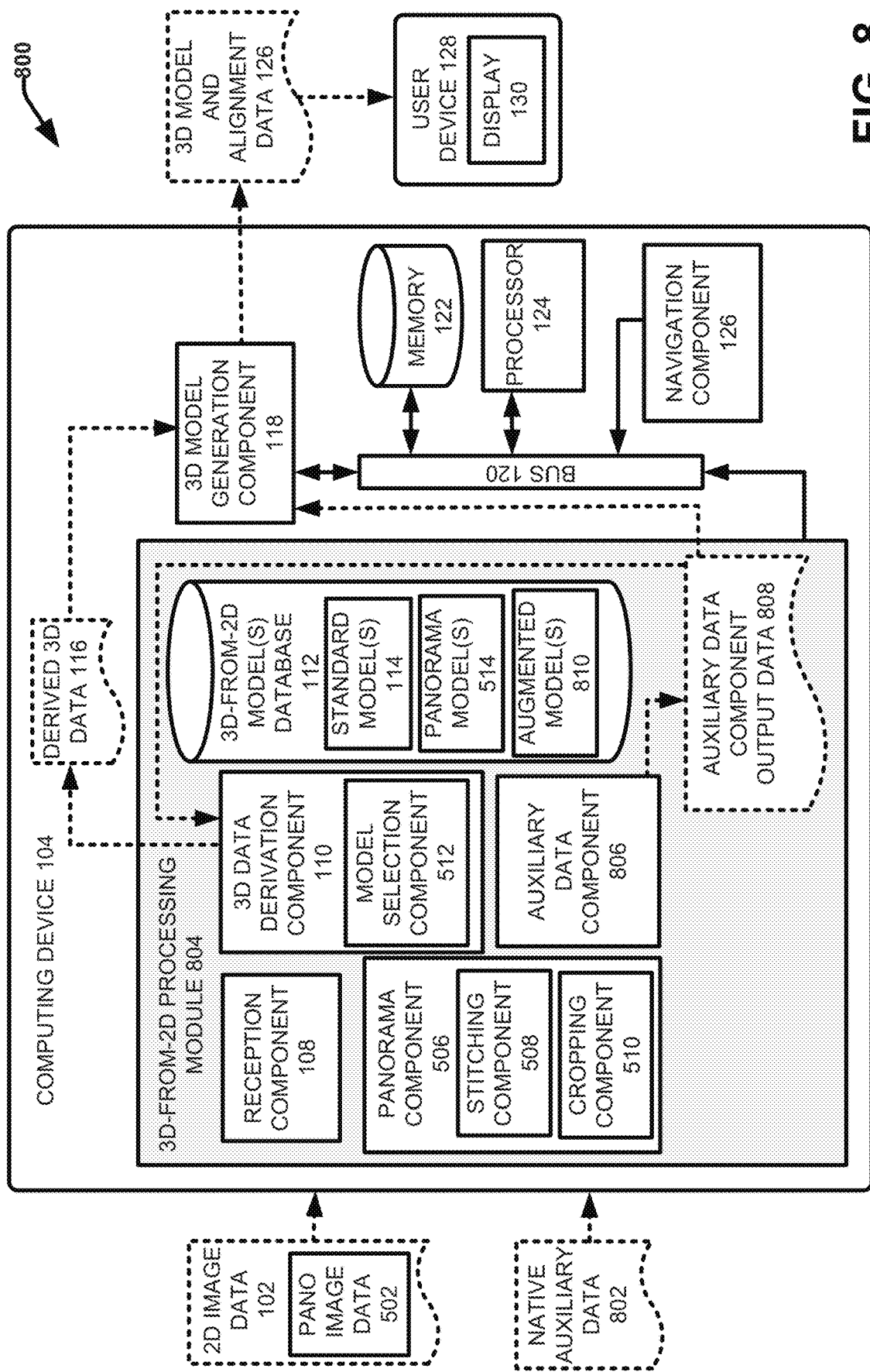
FIG. 8 presents another example system that facilitates deriving 3D data from 2D image data and generating reconstructed 3D models based on the 3D data and the 2D image data in accordance with various aspects and embodiments described herein.

FIG. 8 presents another example system 800 that facilitates deriving 3D data from 2D image data and generating reconstructed 3D models based on the 3D data the 2D image data in accordance with various aspects and embodiments described herein. System 800 includes same or similar features as system 500 with the addition of native auxiliary data 802 as input. System 800 further includes an upgraded 3D-from-2D processing module 804 that varies from 3D-from-2D processing module 504 with the addition of auxiliary data component 806, auxiliary data component output data 808, and one or more augmented 3D-from-2D data models that are configured to process 2D image data plus auxiliary data to provide more precise derived 3D data relative to that provided by one or more standard models 114. These augmented 3D-from-2D models are referred to referred to herein and depicted in system 800 as augmented models 810. Repetitive description of like elements employed in respective embodiments is omitted for sake of brevity.

Systems 100 and 500 are generally directed to using only a single 2D image, including panoramic images and narrower field of view images, as input to one or more 3D-from-2D models (e.g., one or more standard models and/or one or more panorama models 514) to derive 3D data (derived 3D data 116) therefrom. System 800 introduces usage of various types of auxiliary input data that can be associated with a 2D image to facilitate improving the accuracy of 3D-from-2D predictions. For example, such auxiliary input data can include information regarding capture position and orientation of the 2D image, information regarding capture parameters of the capture device that generated the 2D image (e.g., focal length, resolution, lens distortion, lighting, other image metadata, etc.), actual depth data associated with the 2D image captured by a 3D sensor (e.g., 3D capture hardware), depth data derived for a 2D image using stereo image processing, and the like.

In the embodiment shown, the auxiliary input data that can be used as additional input to facilitate enhancing the accuracy of 3D-from-2D predictions can be received in association with one or more 2D images as native auxiliary data 802. In this regard, the auxiliary data is characterized as "native" to indicate that it some embodiments, it can include raw sensory data and other types of raw auxiliary data that can be processed by the auxiliary data component 806 to generate structured auxiliary data that can then be used as input to one or more augmented models 810. With these embodiments, as describe in greater detail with reference to FIG. 9, the auxiliary data component output data 808 can include structured auxiliary data generated by the auxiliary data component 806 based on the native auxiliary data 802. For example, (as described in greater detail with reference to FIG. 9), in one implementation, the native auxiliary data 802 can include motion data captured by an inertial measurement unit (IMU) in association with a scan of an environment that involves capturing several images at different capture locations. According to this example, the auxiliary data component 806 can determine capture position and orientation information for the respective 2D images based on the IMU motion data. The determined capture position and orientation information can be considered structured auxiliary data which can then be associated with the respective 2D images and used as input to one or more augmented models 810.

In other embodiments, the native auxiliary data 802 can include a variety of auxiliary data that can be directly used as input to one or more 3D-from-2D models (e.g., actual ground truth data provided by the capture device, actual capture position and orientation information, etc.). With these implementations, the auxiliary data component 806 can ensure accurate correlation of the native auxiliary data 802 with a specific 2D image and/or convert the native 2D image data into a structured, machine-readable format (if necessary) for input to the one or more augmented models 810 with the 2D image. The auxiliary data component output data 808 can thus include the native auxiliary data 802 as associated with a 2D image in native form and/or in a structured format.

In accordance with either of these embodiments, the one or more augmented models 810 can include one or more augmented 3D-from-2D models that employ one or more neural networks that have been specifically trained to derived 3D data from a 2D image in conjunction with one or more auxiliary data parameters associated with the 2D image. As a result, the derived 3D data 116 generated by an augmented model can be more accurate than 3D data capable of being determined by one or more standard models 114. The one or more augmented models 110 can also include one or more augmented panorama models. In this regard, an augmented panorama model can employ one or more features and functionalities as the panorama models 514 discussed herein, yet further be configured to evaluate auxiliary data associated with a panoramic image or otherwise an image classified as having a wide filed-of-view. In some implementations, the derived 3D data 116 generated by an augmented panorama model can be more accurate than that capable of being determined by one or more panorama models 514.

In some implementations, the augmented models 810 can include a plurality of different 3D-from-2D models, each configured to process a different set or subset of auxiliary data parameters in association with a 2D image. With these implementations, the model selection component 512 can be configured to select an applicable augmented model from the plurality of augmented models 810 for applying to a 2D image based on the auxiliary data associated with the 2D image. For example, based on the type of auxiliary data associated with a 2D image (e.g., included in the native auxiliary data 802 and/or determined by the auxiliary data component 806 based on the native auxiliary data 802), the model selection component 512 can be configured to select an appropriate augmented model from the plurality of augmented models 810 for application to the input data set including the 2D image and the associated auxiliary data, to derived the 3D data for the image. In other implementations, the augmented models 810 can include a universal model configured to process a 2D image plus one or more defined auxiliary data parameters. With these implementations, the 3D-from-2D processing module 804 can be configured to receive and/or determine the one or more defined auxiliary parameters for the respective 2D images that are processed by the 3D data derivation component 110 using an augmented model. Otherwise, if a 2D image is not associated with auxiliary data (either it was not received or could not be determined by the auxiliary data component 806) or associated with insufficient or incomplete auxiliary, the 3D data derivation component 110 can employ one or more standard models 114 to derive the 3D data for the 2D image.

Figure 9:
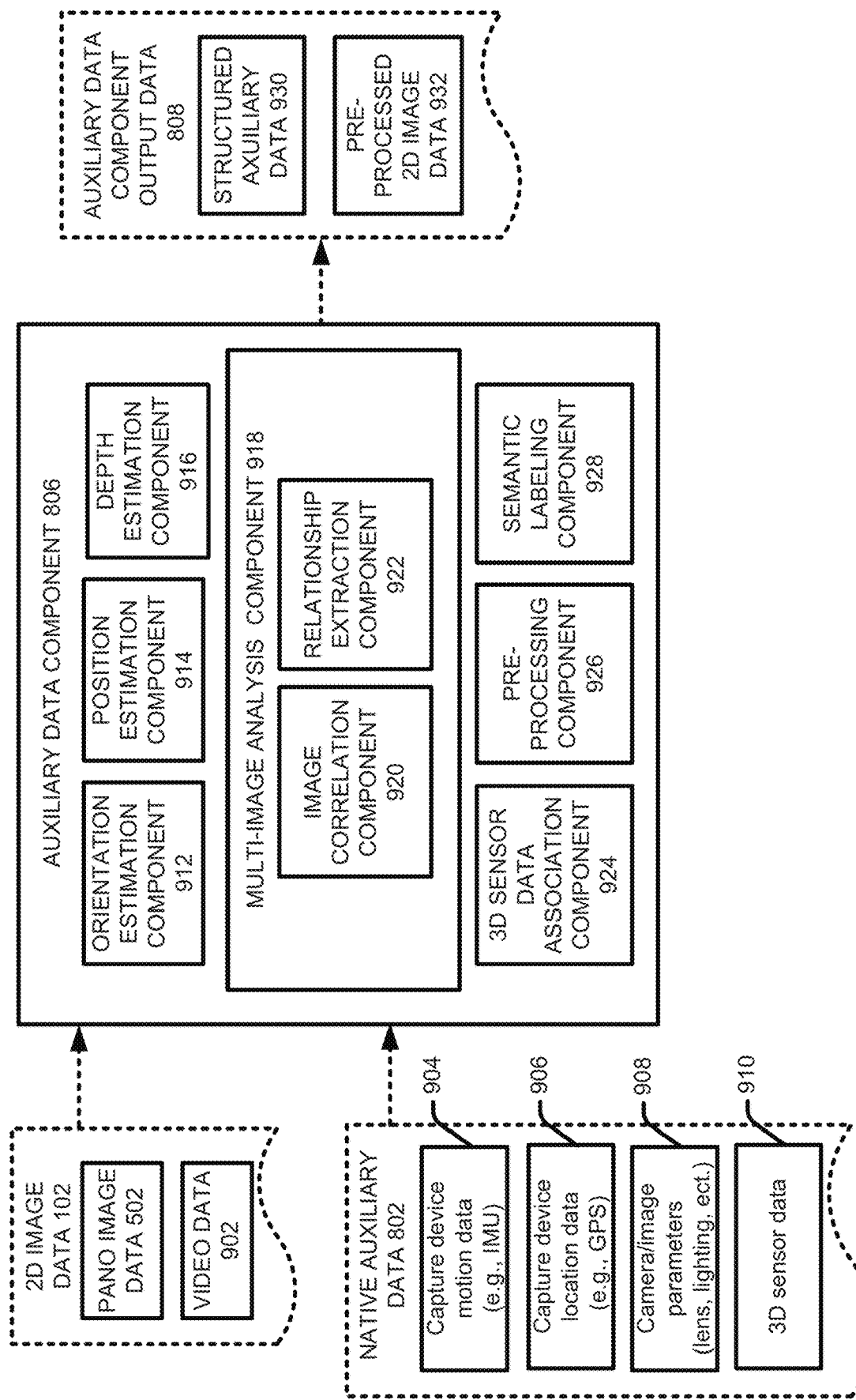
FIG. 9 presents an example auxiliary data component that facilitates employing auxiliary data related to captured 2D image data to facilitate deriving 3D data from the captured 2D image data and generating reconstructed 3D models based on the 3D data and the captured 2D image data in accordance with various aspects and embodiments described herein.

In various additional embodiments, discussed in greater detail infra with reference to FIG. 9, the native auxiliary data 802 can include auxiliary data associated with a 2D image that can be used by the auxiliary data component 806 to pre-process a 2D image prior to input into one or more 3D-from-2D models to generate the derived 3D data 116 for the image. This pre-processing of 2D images prior to application of one or more 3D-from-2D models thereto to derive 3D data therefrom, can transform the image to a uniform representation so that the neural network results are not degraded by differences between the training images and real-world images. With these embodiments, the one or more augmented models 810 can include an augmented 3D-from-2D model has been specifically configured to derive depth data for pre-processed 2D images using training data that was pre-processed in accordance with the techniques described infra. Thus, in some implementations, after received 2D image has been pre-processed, the model selection component 512 can select the particular augmented model configured to evaluate pre-processed 2D images for usage by the 3D data derivation component to generate the derived 3D data 116 for the pre-processed 2D image. In other implementations, the pre-processed 2D image can be used as input to one or more standard models 114 yet provide more accurate results due to the consistency of the input data. The auxiliary data component 806 can also pre-process panoramic images prior to input into one or more panorama models 514 to further enhance the accuracy of the results.

In the embodiment shown, the auxiliary data component output data 808 can also be provided to and employed by the 3D model generation component 118 to facilitate generating 3D models. For example, the auxiliary data can be used by the 3D model generation component 118 to facilitate aligning images, (and with their associated derived 3D data 116), captured at different capture positions and/or orientations relative to one another in a three-dimensional coordinate space. In this regard, in various embodiments, some or all of auxiliary data component output data 808 may not be used as input to a 3D-from-2D prediction model in association with a 2D image to enhance the accuracy of the derived 3D data. On the contrary, the auxiliary data component output data 808 associated with a 2D image can be employed by the 3D model generation component 118 to facilitate generating 3D models based on the 2D image and derived 3D data 116 determined for the 2D image. In this regard, combination of the auxiliary data, 2D images, and derived 3D data 116 for the 2D images, can be used by the 3D model generation component 118 to facilitate generating immersive 3D environments of a scene, and other forms of 3D (and in some implementations 2D) reconstructions.

For example, in one implementation, the auxiliary data component output data 808 (or the native auxiliary data 802) can include depth sensor measurements for a 2D image captured by one or more depth sensors. With this example, the depth sensor measurements can be combined with the derived 3D data for the 2D image to fill in the gaps where the derived 3D data is lacking, or vice versa. In another example, the auxiliary data can include position information identifying a capture location of a 2D image. With this example, the position information may not be used as input to a 3D-from-2D model to facilitate the depth prediction, but alternatively used by the 3D model generation component 118 to facilitate aligning the 2D image and associated derived 3D data 116 with other 2D images and associated derived 3D data sets.

FIG. 9 presents a more detailed representation of the native auxiliary data 802, the auxiliary data component 806, and the auxiliary data component output data 808, in accordance with various aspects and embodiments described herein. Repetitive description of like elements employed in respective embodiments is omitted for sake of brevity.

The native auxiliary data 802 can include various types of auxiliary data associated with a 2D image and/or the process for capturing the 2D image that can be used to facilitate improving the accuracy of 3D-from-2D predictions and/or by the 3D modeling component 118 to improve the quality of 3D models. For example, the native auxiliary data 802 can include but is not limited to, capture device motion data 904, capture device location data 906, camera/image parameters 908, and 3D sensor data 910. The capture device motion data 904 can include information regarding movement of a camera in association with capture of a plurality of images of an object or environment. For example, in some implementations, the capture device motion data 904 can include data captured by an IMU, accelerometer or the like that is physical coupled to the camera that is used to capture the images. For example, the IMU measurements can include data captured in association with movement of the camera to different locations in an environment while the camera is capturing images (or not, such as movement in between captures), rotation of the camera about a fixed axis, movement of the camera in the vertical and horizontal directions and the like. In some implementations, the IMU measurements can be correlated via a timestamp or the like to respective images captured by the camera in association with movement of the camera during the capture process. For example, in an implementation in which the camera is used to capture many images of an environment as the camera operator moves the camera to throughout the environment to different positions to capture different areas and perspective so the environment, each image that is captured can be associated with a timestamp that indicates its relative time of capture to the other images, as well as motion data reflective of movement of the camera during and/or between captures.

The capture device location data 906 can include information that identifies or indicates a capture location of a 2D image. For example, in some implementations, the capture device location data can include global positioning system (GPS) coordinates associated with a 2D image. In other implementations, the capture device location data 906 can include position information indicating a relative position of the capture device (e.g., the camera and/or a 3D sensor) to its environment, such as a relative or calibrated position of the capture device to an object in the environment, another camera in the environment, another device in the environment, or the like. In some implementations, this type of location data can be determined by the capture device (e.g., the camera and/or a device operatively coupled to the camera comprising positioning hardware and/or software) in association with capture of an image and received with the image.

The camera/image parameters 908 can include information regarding operating parameters and/or settings of the one or more cameras (or one or more camera lenses) used to capture the 2D image data 102, as well as contextual information associated with the capture conditions. For example, various camera operating parameters used to capture the images can vary based on the capabilities of the camera, the default or user selected camera settings employed, the lighting in which the image was captured and the like. In this regard, the camera/image parameters 908 can include camera settings and capture context information associated with a 2D image (e.g., as metadata or otherwise associated with the received 2D image), including but not limited to: focal length, aperture, field-of-view, shutter speed, lens distortion, lighting (exposure, gamma, tone mapping, black level), color space (white balance), ISO, and/or other parameters that can vary from image to image.

The 3D sensor data 910 can include any type of 3D associated data with 2D images included in the received 2D image data 102 that was captured by a 3D sensor or 3D capture hardware. This can include 3D data or depth data captured using one or more, structured light sensor devices, LiDAR devices, laser rangefinder devices, time-of-flight sensor devices, lightfield-cameras, active-stereo devices, and the like. For example, in some embodiments, the received 2D image data 102 can include 2D images captured by a 2D/3D capture device or 2D/3D capture device assembly that includes one or more 3D sensors in addition to one or more 2D cameras (e.g., RGB cameras). In various implementations, the 2D/3D capture device can be configured to capture a 2D image using the one or more cameras (or one or more camera lenses) and associated depth data for the 2D image using the one or more 3D sensors simultaneously (e.g., at or near the same time), or in a manner in which they can be correlated after capture if not simultaneously. The level of sophistication (e.g., complexity, hardware cost, etc.) of the such a 2D/3D capture device/assembly, can vary. For example, in some implementations, to reduce cost, the 2D/3D capture device can include one or more cameras (or one or more camera lenses) and limited range/field-of-view 3D sensor configured to capture partial 3D data for a 2D image. One version of such a 2D/3D capture device can include a 2D/3D capture device that produces spherical color images plus depth data. For example, the 2D/3D capture can include one more color cameras capable of capturing image data with a field-of-view that spans up to 360° vertically and horizontally (e.g., a spherical panoramic image), plus a structured light sensor that is configured to capture depth data for the middle part of the vertical field-of-view (e.g., near the equator).

Although the native auxiliary data 802 is depicted as a separate entity from the 2D image data 102, this depiction is merely for exemplary purposes to indicate that the native auxiliary data is new addition (optional) to one or more embodiments of the disclosed systems. In this regard, it should be appreciated that 2D image data 102 can be received with native auxiliary data 802 associated therewith as single data object/file, as metadata, or the like. For example, the 2D image data 102 can include 2D images with 3D sensor depth data captured for the 2D images associated therewith, metadata describing the camera/image parameters, and the like.

The auxiliary data component 806 can include various computer-executable components that facilitate processing the native auxiliary data 802 and/or received 2D image data 102 to generate structured auxiliary data 930 and/or pre-processed 2D image data 932. In the embodiment shown, these components include orientation estimation component 912, position estimation component 914, depth estimation component 916, multi-image analysis component 918, 3D sensor data association component 924, pre-processing component 926, and semantic labeling component 928.

The orientation estimation component 912 can be configured to determine or estimate the capture orientation or pitch of a 2D image and/or a relative orientation/pitch of the 2D to a common 3D coordinate space. For example, in some embodiments, the orientation estimation component 912 can determine an orientation of a received 2D image based on IMU or accelerometer measurements associated with the 2D image (as provided by the capture device motion data 904). The determined orientation or pitch information can be characterized as structured auxiliary data 930 and associated with the 2D image. The orientation information determined for a 2D image can be used as input to one or more augmented 3D-from-2D models (e.g., one or more augmented models 810) along with the 2D image to generate derived 3D data 116 for the 2D image, used by the model generation component 118 to facilitate the alignment process in association with 3D model generation, and/or stored in memory (e.g., memory 122 or an external memory) for additional applications.

The position estimation component 914 can be configured to determine or estimate the capture position of a 2D image and/or the relative positions of the 2D image relative to a common 3D coordinate space. The determined capture position information can also be characterized as structured auxiliary data 930 and associated with the 2D image. This position information can also be used as input to one or more augmented 3D-from-2D models (e.g., one or more augmented models 810) along with the 2D image to generate derived 3D data 116 for the 2D image, used by the model generation component 118 to facilitate the alignment process in association with 3D model generation, and/or stored in memory (e.g., memory 122 or an external memory) for additional applications.

The position estimation component 914 can employ various techniques to determine the capture position (i.e., capture location) of a 2D image based on the type of auxiliary data available. For example, in some implementations, the capture device location data 906 can identify or indicate the capture location of a received 2D image (e.g., GPS coordinates of the capture device). In other implementations, the position estimation component 914 can employ capture device motion data 904 to determine the capture position of a 2D image using inertial position tracking analysis. In other embodiments, the native auxiliary data 802 can include sensory data captured in association with capture of one or more 2D images that can be used to facilitate determining the capture positions of the 2D images. For example, the sensory data can include 3D data captured by stationary sensors, ultrasonic systems, lasers scanners, etc., that can be used to facilitate determining a location of the capture device that captured the one or more 2D images using visual odometry techniques, line of sight for mapping and localization, time-of-flight mapping and localization, and the like.

In some embodiments, the orientation estimation component 912 and/or the position estimation component 914 can employ one or more related images included in the 2D image data 102 to facilitate determining the capture orientation and/or of a 2D image. For example, related 2D images can include neighboring images, images with partially overlapping fields-of-view, images with slightly different capture positions and/or capture orientations, stereo-image pairs, images providing different perspectives of a same object or environment captured at significantly different capture locations (e.g., beyond a threshold distance so as to not constitute a stereo-image pair, such as greater than the inter-ocular distance, which is about 6.5 centimeters), and the like. The source of the related 2D images included in the 2D image data 102 and the relationship between the related 2D images can vary. For example, in some implementations, the 2D image data 102 can include video data 902 comprising sequential frames of video captured in association with movement of the video camera. Related 2D images can also include frames of video captured by a video camera with a fixed position/orientation yet captured at different points in time as one or more characteristics of the environment change at the different points in time. In another example, similar to the sequential frames of video captured by a video camera, an entity (e.g., a user, a robot, an autonomous navigating vehicle, etc.) can capture several 2D images of an environment using a camera in association with movement of the entity about the environment. For example, using a standalone digital camera, a smartphone, or similar device with a camera, a user can walk around an environment and take 2D images at several points nearby along the way, capturing different perspectives of the environment. In another example implementation, related 2D images can include 2D images from nearby or overlapping perspectives captured by a single camera in association rotation of the camera about a fixed axis. In another implementation, related 2D images can include two or more images respectively captured by two or more cameras with partially overlapping fields-of-view or different perspective of an environment (e.g., captured by different cameras at or near the same time). With this implementation the related 2D images can include images that form a stereo-image pair. The related 2D images can also include images captured by two or more different cameras that are not arranged as a stereo pair.

In some embodiments, the orientation estimation component 912 and/or the position estimation component 914 can employ visual odometry and/or simultaneous localization and mapping (SLAM) to determine or estimate the capture orientation/position of a 2D image based on a sequence of related images captured in association with movement of the camera. Visual odometry can be used to determine an estimation of a camera capture orientation and position based on sequence of images using feature matching (matching features over a number of frames), feature tracking (matching features in adjacent frames) and optical flow techniques (based on the intensity of all pixels or specific regions in sequential images). In some embodiments, the orientation estimation component 912 and/or the position estimation component 914 can employ capture device motion data 904, capture device location data 906, and/or 3D sensor data 910 in association with evaluating a sequence of images using visual odometry and/or SLAM to determine the capture position/orientation of a 2D image. SLAM techniques employ algorithms that are configured to algorithms simultaneously localize (e.g., determine the position and orientation of) a capture device (e.g., a 2D image capture device or 3D capture device) with respect to its surroundings, while at the same time mapping the structure of that environment. SLAM algorithms can involve tracking sets of points through a sequence of images using these tracks to triangulate the 3D positions of the points, while simultaneously using the point locations to determine the relative position/orientation of the capture device that captured them. In this regard, in addition to determining the position/orientation of the capture device, SLAM algorithms can also be used to estimate depth information for features included in one or more images of the sequence of images.

In some embodiments, the sequence of related data images can include images captured in association with scan of an environment that involves capturing several images at different capture locations. In another example, the sequence of related images can comprise video data 902 captured in association with a 2D image of an object or environment during movement of the capture device in association with a scan of the object or environment (wherein the scan involves capturing a plurality of images of the object or environment from different capture positions and/or orientations). For example, in some implementations, the video data 902 can include video data captured in addition to (e.g., by a separate camera) one or more 2D images over the course of a scan. This video data 902 can also be used by the orientation estimation component 912 and/or the position estimation component 914 to determine the capture orientation/position of the one or more 2D images captured during the scan using visual odometry and/or SLAM techniques. In some implementations, the video data 902 can include a primary image that can be processed by system 800 or the like, to derive 3D data therefrom using one or more 3D-from-2D techniques described herein (e.g., using one or more standard models 114, panorama models 514, augmented models 810, and the like). According to this example, one or more of these frames can be used as a primary input image from which 3D data is derived using one or more of the 3D-from-2D techniques described herein. In addition, the neighboring images can be used by the orientation estimation component 912 and/or the position estimation component 914 to facilitate determining the capture orientation/position of the primary input frame using visual odometry and/or SLAM.

The depth estimation component 916 can also evaluate related images to estimate depth data for one or more of the related images. For example, in some embodiments, the depth estimation component 916 can employ SLAM to estimate depth data based on a sequence of images. The depth estimation component 916 can also employ related photogrammetry techniques to determine depth information for a 2D images based on one or more related images. In some implementations, the depth estimation component 916 can also employ capture device motion data 904 and one or more structure-from-motion techniques to facilitate estimating depth data for a 2D image.

In some embodiments, the depth estimation component 916 can also be configured to employ one or more passive stereo processing techniques to derive depth data from pairs of images classified as stereo-image pairs (e.g., pairs of images offset by a stereo-image pair distance, such as the inter-ocular distance which is about 6.5 centimeters). For example, passive stereo involves comparison of two stereo images displaced horizontally from one another and providing two different views of a scene. By comparing these two images, the relative depth information can be obtained in the form of a disparity map which encodes the difference in horizontal coordinates of corresponding image points. The values in this disparity map are inversely proportional to the scene depth at the corresponding pixel location. In this regard, given a pair of stereo image, acquired from slightly different viewpoints, the depth estimation component 916 can employ a passive stereo matching function that identifies and extracts corresponding points in both images. Knowing these correspondences, the capture positions of the images and the scene structure, the 3D world coordinates of each image point can be reconstructed by triangulation. The disparity, where the depth data is encoded, represents the distance between x-coordinates or a pair of correspondent points in left and right images.

In various implementations, the stereo-image pairs can comprise images offset by a stereo image pair distance (e.g., an inter-ocular distance which is about 6.5 centimeters) along a horizontal axis (e.g., corresponding to left and right images similar to pairs of images viewed by left and right eyes). In other implementations, the stereo-image pairs can comprise pairs of images offset by a stereo-image distance along a vertical axis. For example, in some embodiments, the received 2D image can comprise pairs of panoramic images with fields-of-view spanning 360° (or up to 360°)

that were captured from different vertical positions relative to a same vertical axis, wherein the different vertical positions are offset by a stereo-image pair distance. In some implementations, the respective vertical offset stereo-images can be captured by a camera configured to move to the different vertical positions to capture the respective images. In other implementations, the respective vertical offset stereo-images can be captured by two different cameras (or camera lenses) located at the different vertical positions.

In some implementations, the depth estimation component 916 can also employ one or more active stereo processing to derive depth data for pairs of stereo-images captured in association with projected light (e.g., structured light, a laser, etc.), in accordance with various active stereo capture techniques. For example, active stereo processing employs light emission (e.g. via a laser, a structured light device, or the like) in association with capture of stereo images to facilitate stereo matching. The word "active" signifies that energy is projected into the environment. In an active stereo vision system, a light projection unit or a laser unit projects a light or light pattern at a time (or multiple sheets of light simultaneously) onto the scene in association with capture of stereo images. The light patterns detected in the captured stereo images can be employed to facilitate extracting depth information for features included in the respective images. For example, the depth derivation component can perform active stereo analysis by finding correspondences between visual features included in respective images based in part on correspondences between light appearing in the respective images and known positions of the light/laser beams relative to the image capture positions.

The passive and/or active stereo derived depth data can be associated with one or both images in the stereo-pair. The depth data determined by the depth estimation component 916 for a 2D image based on analysis of one or more related images (e.g., using SLAM, photogrammetry, structure-from-motion, stereo processing, etc.) can also be characterized as structured auxiliary data 930. This depth data can also be used as input to one or more augmented 3D-from-2D models (e.g., one or more augmented models 810) along with the 2D image to generate derived 3D data 116 for the 2D image, used by the model generation component 118 to facilitate the alignment process in association with 3D model generation, and/or stored in memory (e.g., memory 122 or an external memory) for additional applications.

In other embodiments, the depth estimation component 916 can evaluate stereo image pairs to determine data about the photometric match quality between the images at various depths (a more intermediate result), rather than determining depth data from a passive stereo algorithm. In this regard, the depth estimation component 916 can determine auxiliary data for one or both images included in a stereo pair by determining match quality data regarding quality of a photometric match between the respective images at various depths. This photometric match quality data can be used as auxiliary data for either of the 2D images in the stereo pair to as input to an augmented 3D-from-2D model to facilitate deriving depth data for either of the 2D images.

The multi-image analysis component 918 can facilitate identifying, correlating and/or defining relationships between two or more related images. In the embodiment shown, the multi-image analysis component 918 can include image correlation component 920, and relationship extraction component 922

The image correlation component 920 can be configured to identify and/or classify related images included in received 2D image data 102. The image correlation component 920 can employ various techniques to identify and/or classify two or more images as being related images. In some embodiments, related images and information defining relationships between the related images employed by the auxiliary data component 806 can predefined. In this regard, the auxiliary data component 806 can identify and extract the one or more related images included in the 2D image data 102 based on the predefined information associated therewith. For example, images can be received with information classifying them as stereo-image pairs. In another example, a capture device can be configured to provide two or more images captured in association with rotation about a fixed axis. In accordance with this example, the images can be received with information noting this capture scenario and identifying their relative capture positions and orientations to one another. The image correlation component 920 can further be configured to automatically classify images captured under this capture scenario as related. In another example, the image correlation component 920 can be configured to automatically classify a set of images captured by a same camera in association with a scan over a defined window of time as being related. Similarly, the image correlation component 920 can be configured to automatically classify respective frames of video included in a same video clip having less than a defined duration and/or associated with a defined range of movement based on the capture device motion data 904 (e.g., movement in a particular direction less than a threshold distance or degree of rotation) as being related.

In other embodiments, the image correlation component 920 can be configured to identify related images included in the 2D image data 102 based on their respective capture positions (which may be provided with the received images and/or determined at least in part by the position estimation component 914), and their respective capture orientations (which may be provided with the received images and/or determined at least in part by the orientation estimation component 912). For example, the image correlation component 920 can be configured to classify two or more images as being related based on having a capture position and/or capture orientation that differs by a defined distance and/or degree of rotation. For instance, the image correlation component 920 can identify and classify two images as being related based on having a same capture position yet a different capture orientation that differs by a defined degree of rotation. Likewise, the image correlation component 920 can identify and classify two images as being related based on having a same capture orientation yet different capture positions that differs by a defined distance or distance range. According to this example, the image correlation component 920 can also identify and classify pairs of images as stereo-pairs.

The image correlation component 920 can also identify related images based on capture times and/or motion data regarding relative changes in motion between two or more images. For example, the image correlation component 920 can identify related images based on having respective capture times within a defined time window, having respective capture times separated by a maximum duration of time, and the like. In other implementations, the image correlation component 920 can use one or more image analysis techniques to identify correspondences in visual feature included in two or more images to identify related images. The image correlation component 920 can further identify/classify related images based on a degree of correspondence in the visual features relative to a defined threshold. The image correlation component 920 can also use depth data associated with the respective images if provided (e.g., as 3D sensor data 910), to determine spatial relationship between relative positions of corresponding visual features and employ these spatial relationships to identify/classify related images.

The relationship extraction component 922 can be configured to determine and/or associate relationship information with related images that defines information about the relationship between the related images. For example, the relationship extraction component 922 can determine information regarding elapsed time between capture of two or more potentially related images, relative capture positions of two or more potentially related images (which may be provided with the received images and/or determined at least in part by the position estimation component 914), relative capture orientations of two or more potentially related images (which may be provided with the received images and/or determined at least in part by the orientation estimation component 912), information regarding correspondences between visual and/or spatial feature of related images, and the like. The relationship extraction component 922 can further generate and associate relationship information with two or more related images defining the relationships between them (e.g., relative positions, orientation, capture times, visual/spatial correspondences, etc.).

In some embodiments, as described above, related images can be employed one or more components of the auxiliary data component 806, (e.g., the orientation estimation component 912, the position estimation component 914, and/or the depth estimation component 916), to generate structured auxiliary data 930 for one or images included in a set (of two or more) related images. For example, as described above, in various embodiments, the 2D image data 102 can include video data 902 and/or 2D images captured in association with a scan that provides sequential images (e.g., frames of video and/or still images) with neighboring (yet different) perspective of an environment. With these embodiments, the related sequential images can be used by the position estimation component 914 and/or the orientation estimation component 912 to determine capture position/orientation information or a single 2D image using visual odometry and/or SLAM techniques. Similarly, the depth estimation component 916 can employ related images to derive depth data using stereo processing, SLAM, structure-from-motion, and/or photogrammetry techniques.

In other embodiments, related images can be used as input to one or more 3D-from-2D models (e.g., included in the 3D-from-2D model database 112) to facilitate deriving depth data (e.g., by the depth data derivation component 110) for one or more images included in a set (of two or more) related images. With these embodiments, the one or more augmented models 810 can include an augmented 3D-from-2D neural network model configured do receive and process two or more input images (e.g., as opposed to the standard models 114 for example which are only configured to evaluate single images at time). This augmented 3D-from-2D neural network model can be configured to evaluate the relationships between related images (e.g., using deep learning techniques) to facilitate deriving depth data for one or more images of the related images (e.g., wherein the related images can comprise a group of two or more related images). For example, in some implementations, one image included in the group of related images can be selected as a primary image for which the derived 3D data 116 is determined, and the one or more other images related in the group can be used by the neural network model to facilitate deriving the 3D data for the primary image. In other implementations, the augmented 3D-from-2D model can be configured to derive depth data for multiple input images at a time. For example, the augmented 3D-from-2D model can determine depth information for all or some of the related input images. In association with using related images as input to the augmented 3D-from-2D neural network model, relationship information describing the relationships between the respective images (e.g., determined and/or associated with the respective images by the relationship extraction component 922) can be provided with the respective images as input and evaluated by the augmented 3D-from-2D neural network model.

The 3D sensor data association component 924 can be configured to identify and associate any received 3D sensor data 910 for an image with the 2D image to facilitate using the 3D sensor data 910 as input to one or more augmented models 810. In this regard, the 3D sensor data association component 924 can ensure 3D data received in association with a 2D image associated with the 2D image in a consistent, structured machine-readable format prior to input to the neural network. In some implementations, the 3D sensor data association component 924 can process the 3D sensor data 910 to ensure that it is accurately correlated to the respective pixels, superpixels, etc., of the image for which it was captured. For example, in implementations in which partial 3D sensor data is received for a 2D image (e.g., for the middle part of a spherical image near the equator as opposed to the entire field-of-view of the spherical image), the 3D sensor data association component 924 can ensure the partial 3D data is accurately mapped to the region of the 2D image for which it was captured. In some implementations, the sensor data association component 924 can calibrate 3D depth data received with a 2D image with a capture location and/or a corresponding location in a common 3D coordinate space so that additional or optimized depth data determined using an augmented 3D-from-2D model for the image can be based on or calibrated to a same reference point. The 3D sensor data 910 associated with a 2D image (e.g., in a standardized format and/or with calibration information in some implementations) can also be used as input to one or more augmented 3D-from-2D models (e.g., one or more augmented models 810) along with the 2D image to generate derived 3D data 116 for the 2D image, used by the model generation component 118 to facilitate the alignment process in association with 3D model generation, and/or stored in memory (e.g., memory 122 or an external memory) for additional applications.

The pre-processing component 926 can be configured to pre-process images prior to input to a 3D-from-2D neural network model (e.g., included in the 3D-from-2D model database 112) based on camera/image parameters 908 associated with the respective images to transform the images to a uniform representation format so that the neural network results are not degraded by differences between the training images and the real-world images. In this regard, the pre-processing component 926 can alter one or more characteristics of a 2D image to transform the 2D image into altered version of the 2D image that conforms to a standard representation format defined for the 2D images to be processed by specific neural network model. The neural network model can thus include an augmented neural network model that has been trained to evaluate images that conform to the standard representation format. For example, the pre-processing component 926 can correct or modify image defects to account for lens distortion, lighting variations (exposure, gamma, tone mapping, black level), color space (white balance) variations, and/or other image defects. In this regard, the pre-processing component 926 can synthetically level the respective images to account for differences between camera/image parameters.

In various embodiments, the pre-processing component 926 can determine whether and how to alter a 2D image based on camera/image parameters associated with the image (e.g., received as metadata with the image). For example, the pre-processing component 926 can identify variances between one or more camera/image parameters associated with a received 2D image and one or more defined camera/image parameters of the standard representation format. The pre-processing component 926 can further alter (e.g., edit, modify, etc.) one or more characteristics of the 2D image based on the variances. In some implementations, the one or more characteristics can include visual characteristics and the pre-processing component 926 can alter the one or more visual characteristics. The pre-processing component 926 can also alter an orientation of the image, a size of the image, a shape of the image, a level of magnification of the image, and the like.

In some embodiments, the pre-processing component 926 can also use position and/or orientation information about the relative positions and/or orientations from which the input images were captured to rotate the input images prior to input to an augmented neural network model so that the direction of motion between them is horizontal. With these embodiments, the augmented neural network model (e.g., included in the one or more augmented models 810) can be trained predict depth data (e.g., the derived 3D data 116) using horizontal parallax cues. The images that are pre-processed by the pre-processing component 926 can be characterized as pre-processed 2D image data 932 and used as input to one or more augmented 3D-from-2D models that have been specifically trained to evaluate such pre-processed images (e.g., one or more augmented models 810). In some implementations, the pre-processed images can also be used as input to one or more standard models 114 and/or panorama models 514 to improve the accuracy of the results of those models. The pre-processed 2D image data 932 can also be stored in memory (e.g., memory 122 or an external memory) for additional applications.

The semantic labeling component 928 can be configured to process 2D image data 102 to determine semantic labels for features included in the image data. For example, the semantic labeling component 928 can be configured to employ one or more machine learning object recognition techniques to automatically identify defined objects and features included in the 2D images (e.g., walls, floors, ceilings, windows, doors, furniture, people, buildings, etc.). The semantic labeling component 928 can further assign labels to the recognized objects identifying the object. In some implementations, the semantic labeling component 928 can also perform semantic segmentation and further identify and defined boundaries of recognized objects in the 2D images. The semantic labels/boundaries associated with features included in a 2D image can be characterized as structured auxiliary data 930 and used to facilitate deriving depth data for the 2D images. In this regard, the semantic label/segmentation information associated with a 2D image can also be used as input to one or more augmented 3D-from-2D models (e.g., one or more augmented models 810) along with the 2D image to generate derived 3D data 116 for the 2D image, used by the model generation component 118 to facilitate the alignment process in association with 3D model generation, and/or stored in memory (e.g., memory 122 or an external memory) for additional applications.

Figure 10:
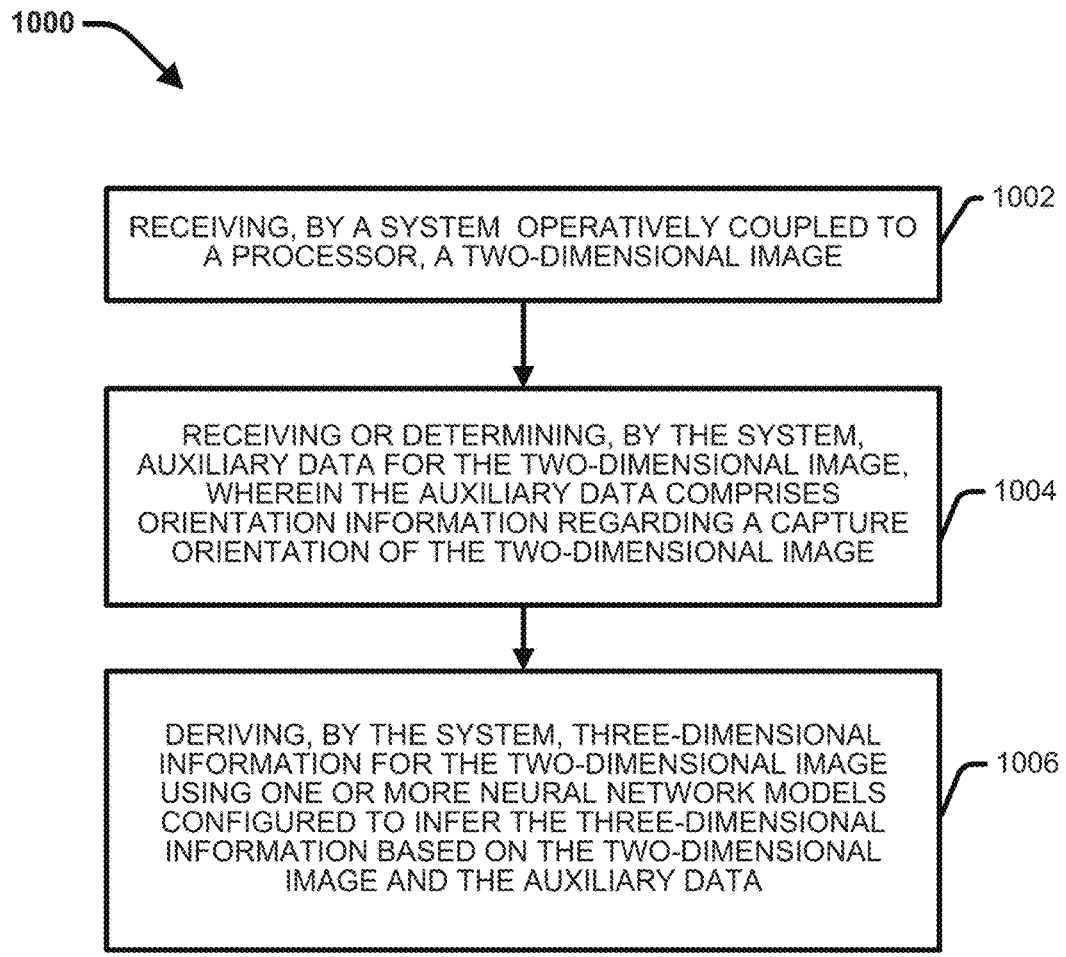
FIG. 10 presents an example computer-implemented method for employing auxiliary data related to captured 2D image data to facilitate deriving 3D data from the captured 2D image data in accordance with various aspects and embodiments described herein.

FIG. 10 presents an example computer-implemented method 1000 for employing auxiliary data related to captured 2D image data to facilitate deriving 3D data from the captured 2D image data in accordance with various aspects and embodiments described herein. Repetitive description of like elements employed in respective embodiments is omitted for sake of brevity.

At 1002, a system operatively coupled to a processor (e.g., system 800), receives a 2D image. At 1004, the system receives (e.g., via reception component 111) or determines (e.g., via auxiliary data component 806) auxiliary data for 2D image, wherein the auxiliary data comprises orientation information regarding a capture orientation of the two-dimensional images. At 1006, the system derives 3D information for the 2D image using one or more neural network models (e.g., one or more augmented models 810) configured to infer the three-dimensional information based on the two-dimensional image and the auxiliary data (e.g., using 3D data derivation component 110).

FIG. 11 presents another example computer-implemented method 1100 for employing auxiliary data related to captured 2D image data to facilitate deriving 3D data from the captured 2D image data in accordance with various aspects and embodiments described herein. Repetitive description of like elements employed in respective embodiments is omitted for sake of brevity.

At 1102, a system operatively coupled to a processor (e.g., system 800), receives a 2D images captured of an object or environment, wherein the 2D images are related based on providing different perspectives of the object or environment. At 1104, the system derives depth information for at least one 2D image of the related 2D images based on the related 2D dimensional images using one or more neural network models (e.g., the one or more augmented models 810) and the related 2D images as input to the one or more neural network models (e.g., via the 3D data derivation component 110). For example, the one or more neural network models can include a neural network model configured to evaluate/process more than one 2D image and use information regarding relationships between the respective 2D images to facilitate deriving depth data for some or all of the input images.

Figure 12:
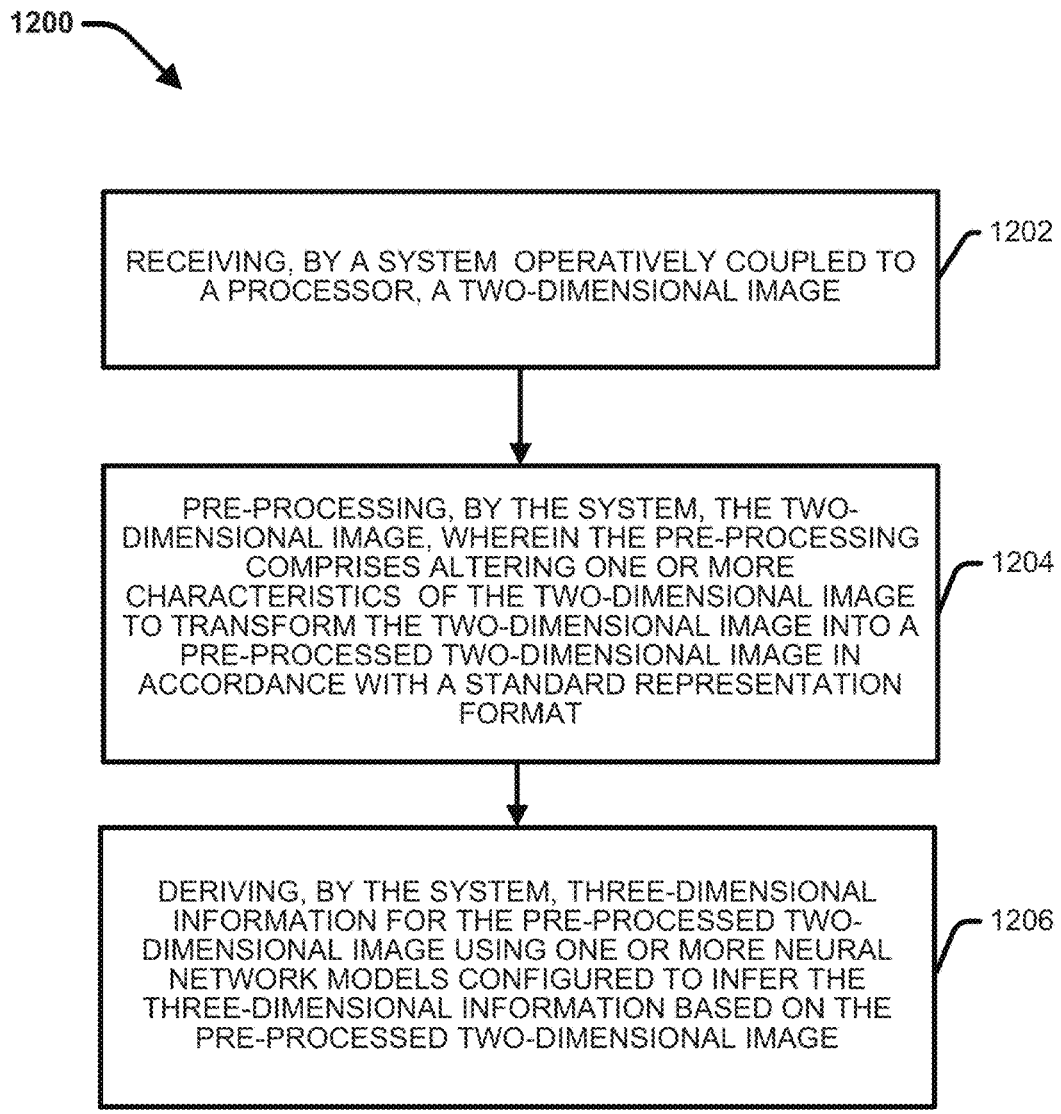
FIG. 12 presents an example computer-implemented method for employing auxiliary data related to captured 2D image data to facilitate deriving 3D data from the captured 2D image data in accordance with various aspects and embodiments described herein.

FIG. 12 presents another example computer-implemented method 1000 for employing auxiliary data related to captured 2D image data to facilitate deriving 3D data from the captured 2D image data in accordance with various aspects and embodiments described herein. Repetitive description of like elements employed in respective embodiments is omitted for sake of brevity.

At 1202, a system operatively coupled to a processor (e.g., system 800), receives a 2D image. At 1204, the system pre-processes the 2D, wherein the pre-processing comprises altering one or more characteristics of the two-dimensional image to transform the image into a pre-processed image in accordance with a standard representation format (e.g., via pre-processing component 926. At 1206, the system, derives 3D information for the pre-processed 2D image using one or more neural network models configured to infer the 3D information based on the pre-processed 2D image (e.g., using 3D data derivation component 110).

Figure 13:
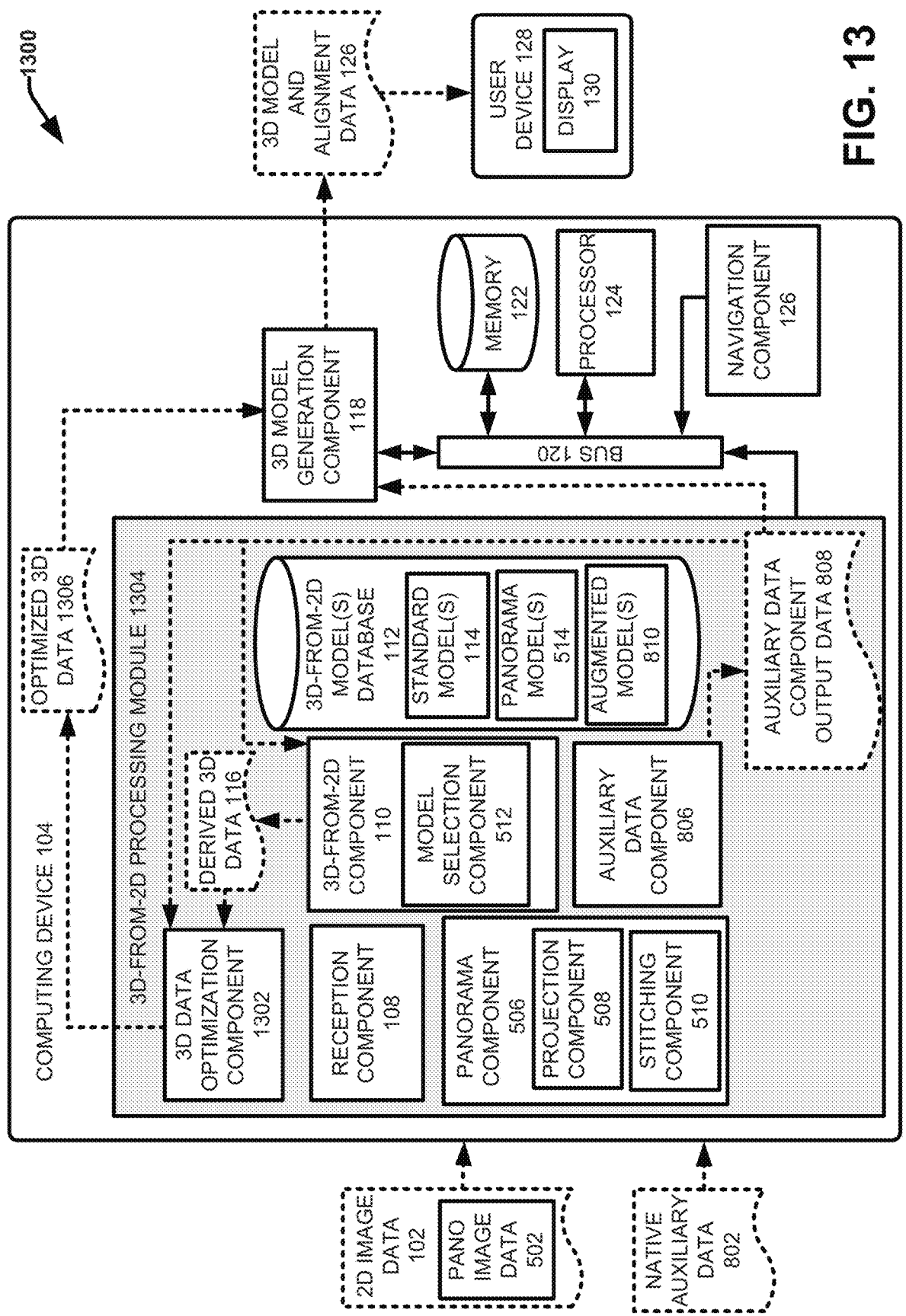
FIG. 13 presents another example system that facilitates deriving 3D data from 2D image data and generating reconstructed 3D models based on the 3D data and the 2D image data in accordance with various aspects and embodiments described herein.

FIG. 13 presents another example system 1300 that facilitates deriving 3D data from 2D image data and generating reconstructed 3D models based on the 3D data and the 2D image data in accordance with various aspects and embodiments described herein. System 1300 includes same or similar features as system 800 with the addition of optimized 3D data 1306. System 1300 further includes an upgraded 3D-from-2D processing module 1304 that varies from 3D-from-2D processing module 804 with the addition of 3D data optimization component 1302, which can be configured to generate the optimized 3D data 1306. Repetitive description of like elements employed in respective embodiments is omitted for sake of brevity.

With reference to FIGS. 9 and 13, in various embodiments, the auxiliary data component output data 808 can include structured auxiliary data 930 that comprises some depth data associated with a 2D image. For example, in some implementations the depth data can include 3D sensor data captured in association with capture of a 2D image and associated with the 2D image. In other implementations, the depth data can include one or more depth measurements determined for a 2D image by the depth estimation component 916 (e.g., determined using SLAM, structure-from-motion, photogrammetry, etc.). In some embodiments, this depth data, (hereinafter referred to as "initial" depth data), can be used as input in association with a 2D image to one or more augmented models 810 to facilitate generating derived 3D data 116 for the 2D image.

However, in other embodiments, in addition to and/or alternative to using this initial depth data as input to one or more 3D-from-2D models included in the 3D-from-2D model database 112, the initial depth data can be provided to the 3D data optimization component 1302. The 3D data optimization component 1302 can be configured to analyze 3D/depth data obtained from different sensor and/or depth derivation modalities, including the derived 3D depth data 116 and initial depth data values, to determine an optimized unified interpretation of the depth data, referred to herein and depicted in system 1300 as optimized 3D data 1306. In particular, the 3D data optimization component 1302 can analyze different types of depth data captured and/or determined for a 2D image using different types of depths sensor devices and/or depth derivation techniques (e.g., including different types of 3D sensor depth data, passive stereo processing, active stereo processing, SLAM processing, photogrammetry processing, structure-from-motion processing, and 3D-from-2D processing) to determine optimized 3D data for respective pixels, superpixels, features, etc. of the 2D image.

For example, in one implementation, the 3D data optimization component 1302 can be configured to combine the different depth data values associated with the same pixel, superpixel, feature, area/region, etc. of a 2D image. The 3D data optimization component 1302 can further employ a heuristic to evaluate the quality of depth data respectively generated using the different modalities to determine a unified interpretation of the depth data for the pixel, superpixel, feature, area/region, etc. In another example, the 3D data optimization component 1302 can employ average depth measurement values for respective pixels, superpixels, features, areas/regions etc., of a 2D image that averages the corresponding depth measurement values reflected in the initial depth data and the derived 3D data 116. In some embodiments, the 3D data optimization component 1302 can map depth measurements determined using different means, including the derived 3D data 116, depth data received from a 3D sensor, depth data determined using stereo processing, depth data determined using SLAM, depth data determined using photogrammetry, etc., to respective pixels, superpixels, features, etc. of an image. The 3D data optimization component 1302 can further combine the respective depth values to determine an optimal depth value for the respective pixels, superpixels, etc. that weights the different measurement values based on a defined weighting scheme. For example, the weighting scheme can employ known strengths and weaknesses of the respective depth data sources to determine a degree of accuracy associated with each of the applicable sources and merge the depth data from each of the applicable sources in a principled way to determine optimized depth information. In another implementation, the initial depth data can include partial depth data for a portion of a 2D image. In one implementation, the 3D data optimization component 1302 can be configured to use the initial depth data for the portion of the image with which it is associated and fill in the missing depth data for the remaining portion of the 2D image using the derived 3D data 116 determined for the remaining portion of the image.

Systems 100, 500, 800, and 1300 discussed above respectively depict an architecture wherein 2D image data, and optionally auxiliary data associated with the 2D image data, is received and processed by a universal computing device (e.g., computing device 104) to generate derived depth data for the 2D images, generate 3D reconstructed models and/or facilitate navigation of the 3D reconstructed models. For example, the universal computing device can be or correspond to a server device, a client device, a virtual machine, a cloud computing device, etc. Systems 100, 500, 800, and 1300 further include a user device 130 configured to receive and display the reconstructed models, and in some implementations, interface with the navigation component 126 to facilitate navigating the 3D models as rendered at the user device 130. However, systems 100, 500, 800, and 1300 are not limited to this architectural configuration. For example, in some embodiments, one or more features, functionalities and associated components of the computing device 104 can be provided at the user device 130, and vice versa. In another embodiment, one or more features and functionalities of the computing device 104 can be provided at a capture device used to capture the 2D image data. Still in another example embodiment, the one or more cameras (or one or more camera lenses) used to capture the 2D image data, the 3D-from-2D processing module, the 3D model generation component 118, the navigation component 126 and the display 132 at which the 3D model and representation of the 3D model are displayed can all be provided on a same device.

FIGS. 14-25 present various example devices and/or systems that provide different architectural configurations that can provide one or more features and functionalities of systems 100, 500, 800, and/or 1300 (and additional systems described herein). In particular, the various example devices and/or systems shown in FIGS. 14-25 respectively facilitate capturing 2D images of an object or environment (e.g., 2D image data 102) and deriving depth data from the 2D images using one or more 3D-from-2D techniques in accordance with various aspects and embodiments described herein.

In this regard, the respective devices and/or systems presented in FIGS. 14-25 can include at least one or more cameras 1404 configured to capture 2D images, and a 3D-from-2D processing module 1406 configured to derive 3D data from the 2D images (e.g., one or more of the 2D images). The 3D-from-2D processing module 1406 can correspond to 3D-from-2D processing module 106, 3D-from-2D processing module 504, 3D-from-2D processing module 804, 3D-from-2D processing module 1304, or a combination thereof. In this regard, 3D-from-2D processing module 1406 is used to collectively represent a 3D-from-2D processing module that provides can one or more features and functionalities (e.g., components) of any of the 3D-from-2D processing modules described herein.

The one or more cameras 1404 can include for example, RGB cameras, HDR cameras, video cameras, and the like. In some embodiments, the one or more cameras 1404 can include one or more cameras capable of generating panoramic images (e.g., pano-image data 502). The one or more cameras 1404 can also include a video camera capable of capturing video (e.g., video data 902), in accordance with some embodiments. In some implementations, the one or more cameras 1404 can include a camera that provides a relatively standard field-of-view (e.g., around 75°). In other implementations, the one or more cameras can include a cameras that provide a relatively wide field-of-view (e.g., from around 120° up to 360°), such a fisheye camera, a capture device that employs a cone-shaped mirror (e.g., capable of capturing 360° panorama from a single image capture), a camera capable of generating a spherical color panoramic image (e.g., a RICOH THETA™ camera), and the like.

In some embodiments, the devices and/or systems presented in FIGS. 14-25 can employ a single camera (or single camera lens) to capture 2D input images. With these embodiments, the one or more cameras 1404 can represent a single camera (or camera lens). In accordance with some of these embodiments, the single camera and/or the device housing the camera can be configured to rotate about an axis to generate images at different capture orientations relative to the environment, wherein the collective fields of view of the images spans up to 360° horizontally. For example, in one implementation, the camera and/or the device housing the camera can be mounted on a rotatable mount that can rotate 360° while the camera captures two or more images at different rotation points whose collective fields of view span 360°. In another example implementation, rather than using a rotatable mount, the camera and/or the device housing the camera can be configured to rotate 360° when placed on a flat surface using an internal mechanical driving mechanism of the camera and/or the device housing the camera, such as a wheel or vibrational force. In another implementation, the one or more cameras 1404 employed by the devices and/or systems presented in FIGS. 14-25 can correspond to single panoramic camera (or camera capable or rotation to generate a panoramic image) that employs an actuation mechanism allowing the camera to move up and/or down relative to a same vertical axis. With this implementation, the single camera can capture two or more panoramic images that span different vertical fields-of-view but provide same or similar horizontal fields-of-view. In some embodiments, these two or more panoramic images can be combined (e.g., by the stitching component 508 or at the capture device) to generate a single panoramic image with a wider vertical field-of-view than either image alone. In other embodiments, the single camera can capture two panoramic images with a vertical stereo offset such that the two panoramic images form a stereo image pair. With these embodiments, the stereo panoramic images can be used directly as input to a 3D-from-2D neural network model, and/or processed by the depth estimation component 916 to derive depth data for one or both images using passive stereo processing. This additional depth data can be used as auxiliary input data to a 3D-from-2D neural network model (e.g., an augmented model 810).

In other embodiments, the devices and/or systems presented in FIGS. 14-25 can employ two or more cameras (or two more camera lenses) to capture 2D input images. With these embodiments, the one or more cameras 1404 can represent two or more cameras (or camera lenses). In some of these embodiments, the two or more cameras can be arranged in relative positions to one another on or within a same housing such that their collective fields of view span up to 360°. In some implementations of these embodiments, pairs of cameras (or pairs of lenses) can be used capable of generating stereo-image pairs (e.g., with slightly offset yet partially overlapping fields of view). For example, the capture device (e.g., the device the comprises the one or more cameras 1404 used to capture the 2D input images) can comprise two cameras with horizontal stereo offset fields-of-view capable of capturing stereo image pairs. In another example, the capture device can comprise two cameras with vertical stereo offset fields-of-view capable of capturing vertical stereo image pairs. In accordance with either of these examples, each of the cameras can have fields-of-view that span up to 360. In this regard, in one embodiment, a capture device can employ two panoramic cameras with vertical stereo offsets capable of capturing pairs of panoramic images that form stereo pairs (with vertical stereo offsets). With these implementations in which stereo image pairs can be captured, the 3D-from-2D processing module 1406 can be or include 3D-from-2D processing module 804 or 1304, and the auxiliary data component 806 can derive initial depth data for respective images included in the stereo image-pair using stereo processing (e.g., via depth estimation component 916). As discussed above with reference to FIGS. 9 and 13, the initial depth data can be used as input to an augmented model 3D-from-2D model (selected from the one or more augmented data models 806) to facilitate deriving 3D data for either of the stereo images included in the pair, used by the 3D data optimization component 1302 to facilitate generating optimized 3D data 1306, and/or used by the 3D model generation component 118 to facilitate generating a 3D model of an object or environment captured in the respective images.

The devices and/or systems described in FIGS. 14-25 can include machine-executable components embodied within machine(s), e.g. embodied in one or more computer readable mediums (or media) associated with one or more machines. Such components, when executed by the one or more machines, e.g. computer(s), computing device(s), virtual machine(s), etc. can cause the machine(s) to perform the operations described. In this regard, although not shown, the devices and/or systems described in FIGS. 14-25 can include or be operatively coupled to at least one memory and at least one processor. The at least one memory can further store the computer-executable instructions/components that when executed by the at least one processor facilitate performance of operations defined by the computer-executable instructions/components. Examples of said memory and process and other computing device hardware and software components that can included in the devices and/or systems described are provided with reference to FIG. 35. Repetitive description of like elements employed in respective embodiments is omitted for sake of brevity.

Figure 14:
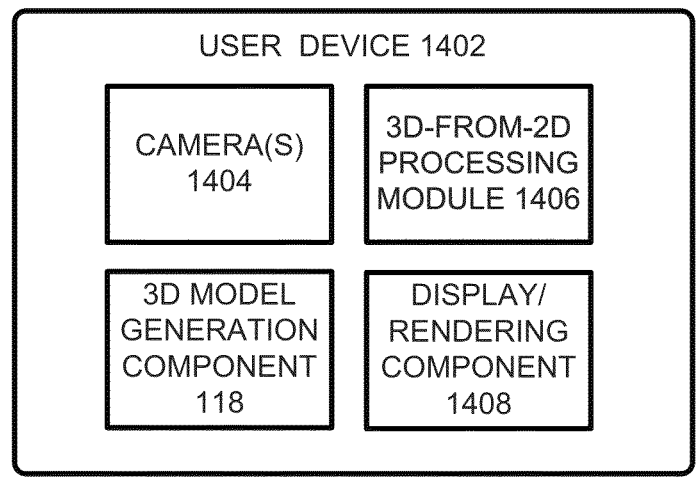
FIGS. 14-25 present example devices and/or systems that facilitate capturing 2D images of an object or environment and deriving 3D/depth data from the images using one or more 3D-from-2D techniques in accordance with various aspects and embodiments described herein.

With reference to FIG. 14, presented is an example user device 1402 that facilitates capturing 2D images and deriving 3D data from the 2D images in accordance with various aspects and embodiments described herein. In this regard, the user device 1402 can include one or more cameras 1404 to capture the 2D images and/or video, and 3D-from-2D processing module 1406 to derive the 3D data from the 2D images, discussed above. The user device 1402 can also include 3D model generation component 118 to generate reconstructed 3D models based on the 3D data and the 2D image data, and a display/rendering to facilitate presenting the 3D reconstructed models at the user device 1402 (e.g., via a device display). For example, the display/rendering component 1408 can include suitable hardware and/or software that facilitates accessing or otherwise receiving 3D models and/or representation of the 3D models (e.g., including 3D floorplan models, 2D floorplan models, dollhouse view representations of the 3D models, etc.), and displaying them via a display of the user device (e.g., a display 132). In some embodiments, user device 1402 can be or correspond to user device 130. For example, the user device 1402 can be or include but is not limited to: a desktop computer, a laptop computer, a mobile phone, a smartphone, a tablet PC, a PDA, a standalone digital camera, an HUD device, a virtual reality VR headset, an AR headset or device, or another type of wearable computing device.

In other embodiments, the user device 1402 may not include the 3D model generation component 118 and/or the display/rendering component 1408. With these embodiments, the user device 1402 can simply be configured to capture 2D images (e.g., 2D image data 102) via the one more cameras 1404, and derive depth data (e.g., the derived 3D data 116) for the 2D images. The user device 1402 can further store the 2D images and their associated derived depth data (e.g., in memory of the user device 1402, not shown), and/or provide the 2D images and their associated derived depth data to another device for usage by the other device (e.g., to generate a 3D model, or for another usage context).

Figure 15:
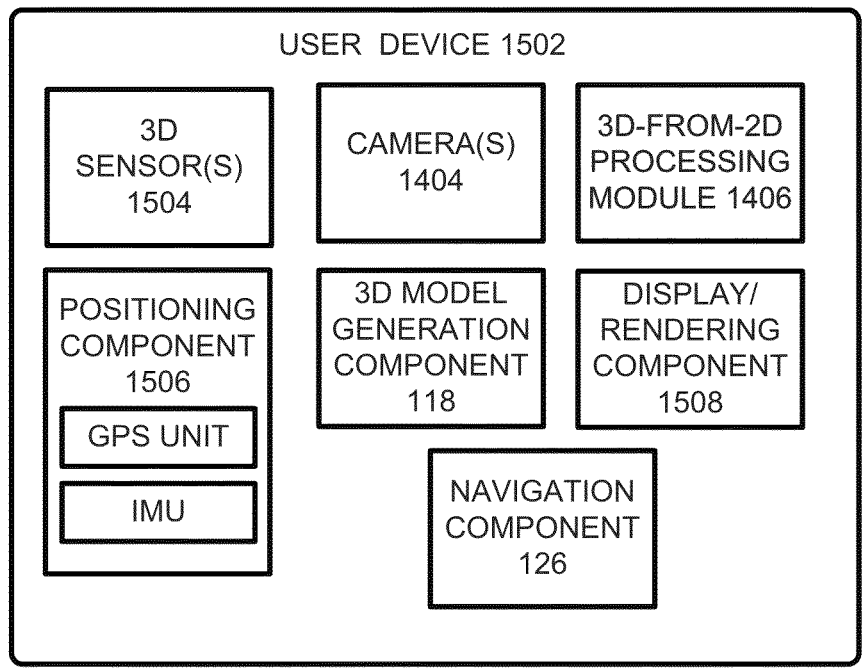

FIG. 15 presents another example user device 1502 that facilitates capturing 2D images and deriving 3D data from the 2D images in accordance with various aspects and embodiments described herein. In this regard, user device 1502 can include same or similar features and functionalities as user device 1402. User device 1502 differs from user device 1402 with respect to the addition of one or more 3D sensors 1504 and positioning component 1506. In some embodiments, the user device 1502 may not include the positioning component 1506, but include the one or more 3D sensors, or vice versa. The user device 150 can further (optionally) include navigation component 126 to provide on-board navigation of 3D models generated by the 3D model navigation component 118 (in implementations in which the user device 1502 includes the 3D model generation comment 118).

With reference to FIGS. 9 and 15, the one or more 3D sensors 1504 can include one or more 3D sensors or 3D capture devices configured to capture 3D/depth data in association with capture of 2D images. For example, the one or more 3D sensors 1504 can be configured to capture the one or more of the various types of 3D sensor data 910 discussed with reference to FIG. 9. In this regard, the one or more 3D sensors 1504 can include but not limited to: a structured light sensor/device, a LiDAR sensor/device, a laser rangefinder sensor/device, a time-of-flight sensor/device, a lightfield-camera sensor/device, an active-stereo sensor/device and the like. In one embodiment, the one or more cameras 1404 of user device 1502 can include a camera that produces spherical color image data and the one or more 3D sensors 1504 can include a structured light sensor (or another 3D sensor) configured to capture depth data for a portion of the spherical color image (e.g., the middle part of the vertical FOV or otherwise near the equator. With this embodiment the 3D-from-2D processing module 1406 can be configured to employ a 3D-from-2D neural network model (e.g., an augmented model 810) trained to take both the spherical color image data and the partial depth inputs and predict depth for the full sphere.

Similarly, the positioning component 1506 can include hardware and/or software configured to capture the capture device motion data 904 and/or the capture device location data 906. For example, in the embodiment shown, the positioning component 1506 can include an IMU configured to generate the capture device motion data 904 in association with capture of one or more images via the one or more cameras 1404. The positioning component 1506 can also include a GPS unit configured to provide GPS coordinate information in association with capture of images by the one or more cameras. In some embodiments, the positioning component 1506 can correlate motion data and location data of the user device 1502 with respective images captured via the one or more cameras 1404.

In various embodiments, user device 1502 can provide one or more features and functionalities of system 800 or 1300. In particular, via the inclusion of one or more 3D sensors 1504, the user device 1502 can generate auxiliary data at least in the form of initial 3D depth sensor data associated with 2D images captured by the one or more cameras 1404. This initial depth data can be used by the 3D-from-2D processing module 1406 and/or the 3D model generation component 118 as described with reference to FIGS. 8 and 13. The user device 1502 can also capture and provide the 3D-from-2D processing module with additional auxiliary data, including capture device motion data 904 and capture device location data 906.

Figure 16:
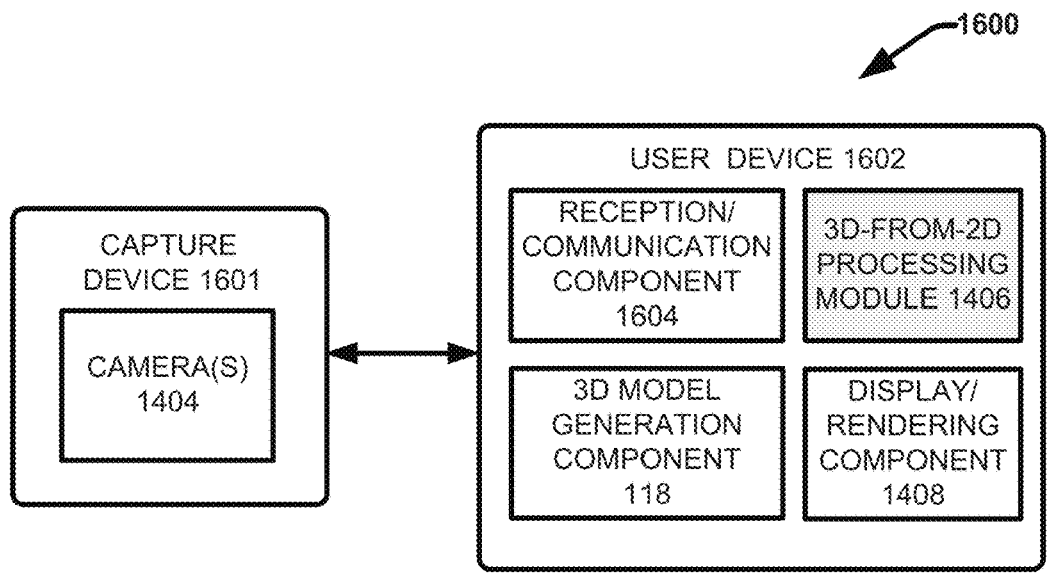

FIG. 16 presents an example system 1600 that facilitates capturing 2D image data, deriving 3D data from the 2D image data in accordance with various aspects and embodiments described herein. System 1600 include a capture device 1601 and a user device 1602. In accordance with this embodiment, a separate capture device 1601 can include the one or more cameras 1404 to capture 2D images (and/or video) of an object or environment. For example, the capture device 1601 can include a camera with one or more lenses provided within a housing configured to be held (e.g., a standalone handheld camera, a standalone digital camera, a phone or smartphone including one or more cameras, a tablet PC including one or more cameras, etc.), mounted on a tripod, located on or within a robotics device, located one or within a vehicle including an autonomous driving vehicle, positioned at a fixed position relative to an environment (e.g., mounted to a wall or fixture), or another suitable configuration. The capture device 1601 can further provide the captured 2D images to the user device 1602 for further processing by the 3D-from-2D processing module, and/or the 3D model generation component 118 located at the user device 1602. In this regard, the capture device 1601 can include suitable hardware and software to facilitate communication with the user device 1602 and vice versa. In implementations in which the user device 1602 includes the 3D model generation component 118, the user device can also include the display/rendering component 1408 to provide for receiving and displaying a 3D model (and/or a representation of the 3D model) at the user device.

In accordance with this embodiment, the user device 1602 can include reception/communication component 1604 to facilitate communicating with the capture device 1601 and receiving 2D images captured by the capture device (e.g., via the one or more cameras). For example, the reception/communication component can facilitate wired and/or wireless communication between the user device 1602 and the capture device 1601, as well as wired and/or wireless communication between the user device 1602 and one or more additional device (e.g., a server device, as discussed infra). For example, the reception/communication component 1604 can be or include various hardware and software devices associated with establishing and/or conducting wireless communication between the user device 1602 and an external device. For example, reception/communication component 1604 can control operation of a transmitter-receiver or transceiver (not shown) of the user device to receive information from the capture device 1601 (e.g., 2D image data), provide information to the capture device 1601, and the like. The reception/communication component 1604 can facilitate wireless communication between the user device and an external device (e.g., capture device 1601 and/or another device) using a variety of wireless telemetry communication protocols. For example, the reception/communication component 1604 can communicate with an external device using communication protocols including but not limited to: a NFC based protocol, a BLUETOOTH® technology-based protocol, a ZigBee® based protocol, a Wi-Fi protocol, an RF based communication protocol, an IP based communication protocol, a cellular communication protocol, a UWB technology-based protocol, or other forms of communication including both proprietary and non-proprietary communication protocols.

Figure 17:
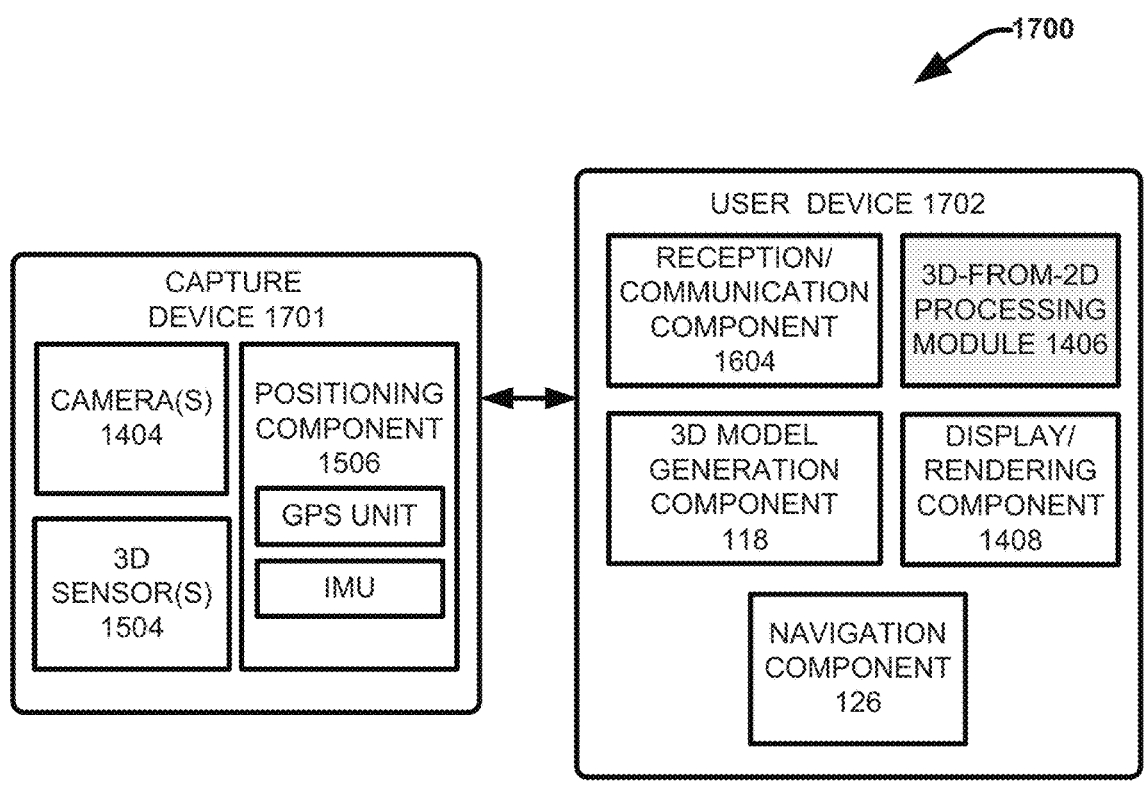

FIG. 17 presents another example system 1700 that facilitates capturing 2D image data, deriving 3D data from the 2D image data in accordance with various aspects and embodiments described herein. Similar to system 1600, system 1700 includes a capture device 1701 including one or more cameras 1404 configured to capture 2D images (and/or video), and a user device 1702 comprising a reception/communication component 1604, a 3D-from-2D processing module 1506, and (optionally) a 3D model generation component 118 and display/rendering component 1408. In this regard, system 1700 can provide same or similar features as system 1600.

System 1700 differs from system 1600 with the addition of one or more 3D sensors 1504 and positioning component 1506 to the capture device 1701. The user device 1702 can also include navigation component 126 to provide for on-board navigation of 3D models generated by the 3D model generation component 118. In accordance with this embodiment, the capture device 1701 can capture at least some initial depth data (e.g., 3D sensor data 910) for respective images captured by the one or more cameras 1404. The capture device 1701 can further provide the user device 1702 with the captured 2D images and the initial depth data associated therewith. For example, in one implementation, the one or more cameras 1404 can be configured to capture and/or generate a panoramic image of an environment having a relatively wide-field-of view (e.g., greater than 120°) that spans up to 360° in at least the horizontal direction. The one or more 3D sensors 1504 can further include a 3D sensor configured to capture depth data for a portion of the panoramic image, such that the 3D depth sensor has a smaller field-of-view of the environment relative to the panoramic 2D image. With these embodiments, the 3D-from-2D processing module 1406 of the user device 1702 can include the additional features and functionalities of systems 800 or 1300 related to usage of auxiliary data to enhance 3D-from-2D predictions and the like. In this regard, the 3D-from-2D processing module 1406 can employ the initial depth data to enhance 3D-from-2D predictions by using the initial depth data as input to one or more augmented models 810, and/or using the initial depth data in combination with derived 3D data 116 to generate optimized 3D data 1306. For example, in an implementation in which the initial depth data includes partial depth data for a panoramic image, the 3D-from-2D processing module 1406 can use one or more 3D-from-2D prediction models to derived depth data for the remaining portion of the panoramic image for which initial depth data was not captured. In some implementations, the capture device 1701 can also generate and provide the user device 1702 with capture device motion data 904 and/or capture device location data 906 in association with the 2D images.

Figure 18:
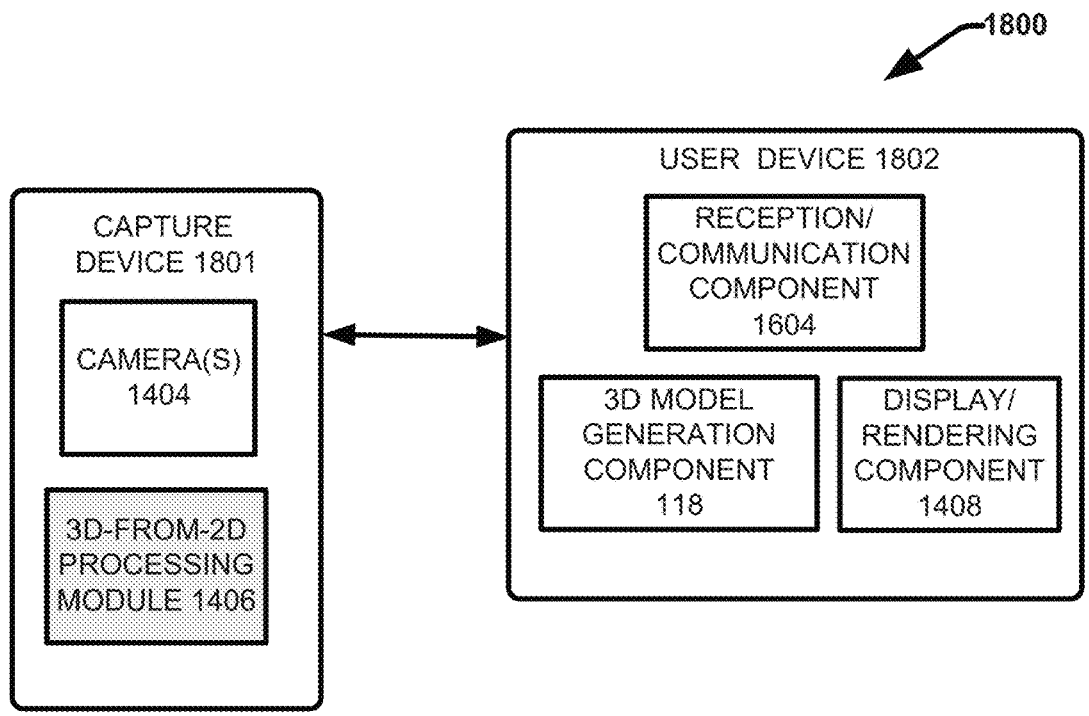

FIG. 18 presents another example system 1800 that facilitates capturing 2D image data, deriving 3D data from the 2D image data in accordance with various aspects and embodiments described herein. Similar to system 1600, system 1800 includes a capture device 1801 including one or more cameras 1404 configured to capture 2D images (and/or video), and a user device 1802 configured to communicate with the capture device 1801 (e.g., using reception/communication component 1604). System 1800 differs from system 1600 with respect to the location of the 3D-from-2D processing module 1406 being at the capture device 1801 as opposed to the user device 1802. In accordance with this embodiment, the capture device 1801 can be configured to capture 2D images (and/or video) of an object or environment and further derive depth data (e.g., derived 3D data 116) for one or more of the images using the 3D-from-2D processing module 1406. The capture device 1801 can further provide the images and their associated derived depth data to the user device for further processing. For example, in the embodiment shown, the user device 1802 can include 3D model generation component 118 to generate one or more 3D models (and/or representations of the 3D models) based on the received imaged data with the derived depth data associated therewith. The user device 1802 can further include display/rendering component 1408 to render the 3D models and/or representation of the 3D models at the user device 1802.

Figure 19:
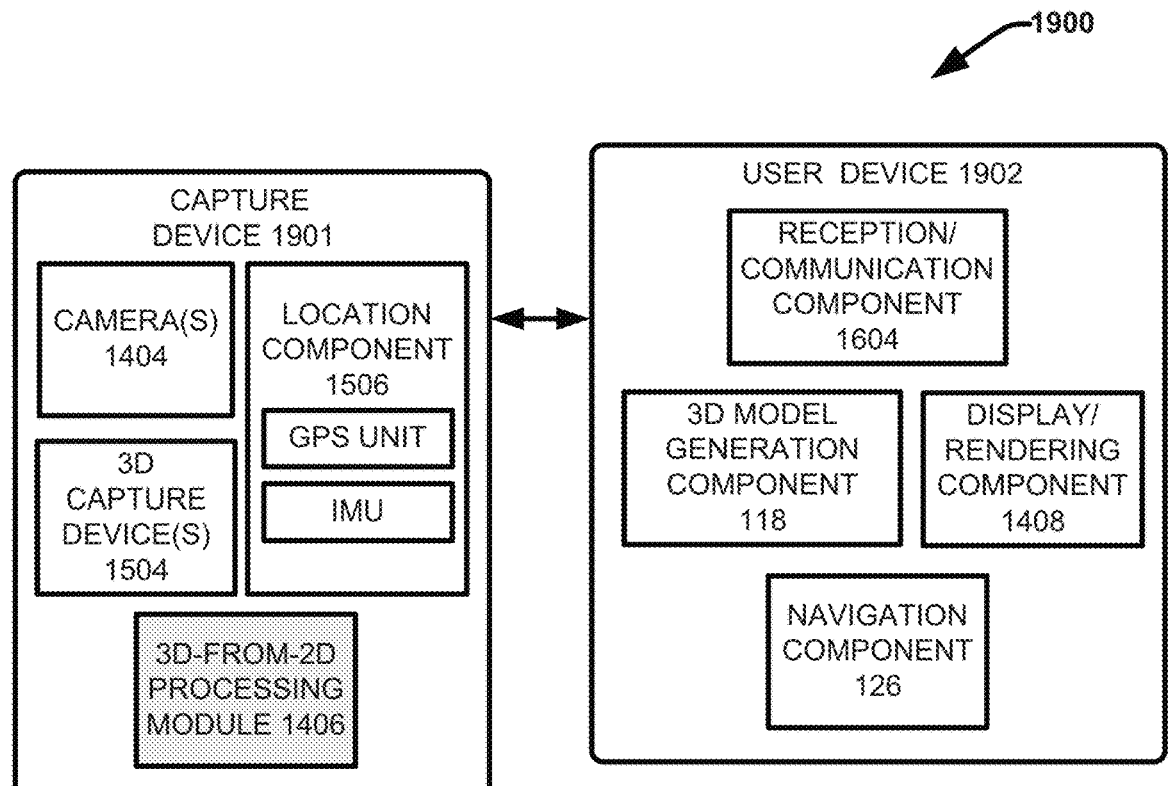

FIG. 19 presents another example system 1900 that facilitates capturing 2D image data, deriving 3D data from the 2D image data in accordance with various aspects and embodiments described herein. Similar to system 1700, system 1900 includes a capture device 1901 including one or more cameras 1404 configured to capture 2D images (and/or video), and a user device 1902 configured to communicate with the capture device (e.g., using reception/communication component 1604). Also similar to system 1700, the capture device 1901 can include one or more 3D sensors 1504, and positioning component 1506, and the user device 1902 can include 3D model generation component 118, display/rendering component 1408, and navigation component 126. System 1900 differs from system 1700 with respect to the location of the 3D-from-2D processing module 1406 being at the capture device 1901 as opposed to the user device 1902.

In accordance with this embodiment, the capture device 1901 can be configured to capture 2D images (and/or video) of an object or environment, as well as auxiliary data, including 3D sensor data 910, capture device motion data 904, and/or capture device location data 906. The capture device 1901 can further derive depth data (e.g., derived 3D data 116) for one or more of the captured 2D images using the 3D-from-2D processing module 1406, wherein the 3D-from-2D processing module corresponds to 3D-from-2D processing module 804 or 1304 (e.g., and configured to use the auxiliary data along with the 2D images to facilitate depth data derivation/optimization). The capture device 1901 can further provide the images and their associated derived depth data to the user device 1902 for further processing and usage by the navigation component 126. In some embodiments, the capture device 1901 can also provide the auxiliary data to the user device 1902 to facilitate the alignment process in association with generation of a 3D model based on the image data and its associated derived depth data, by the 3D model generation component 118.

Figure 20:
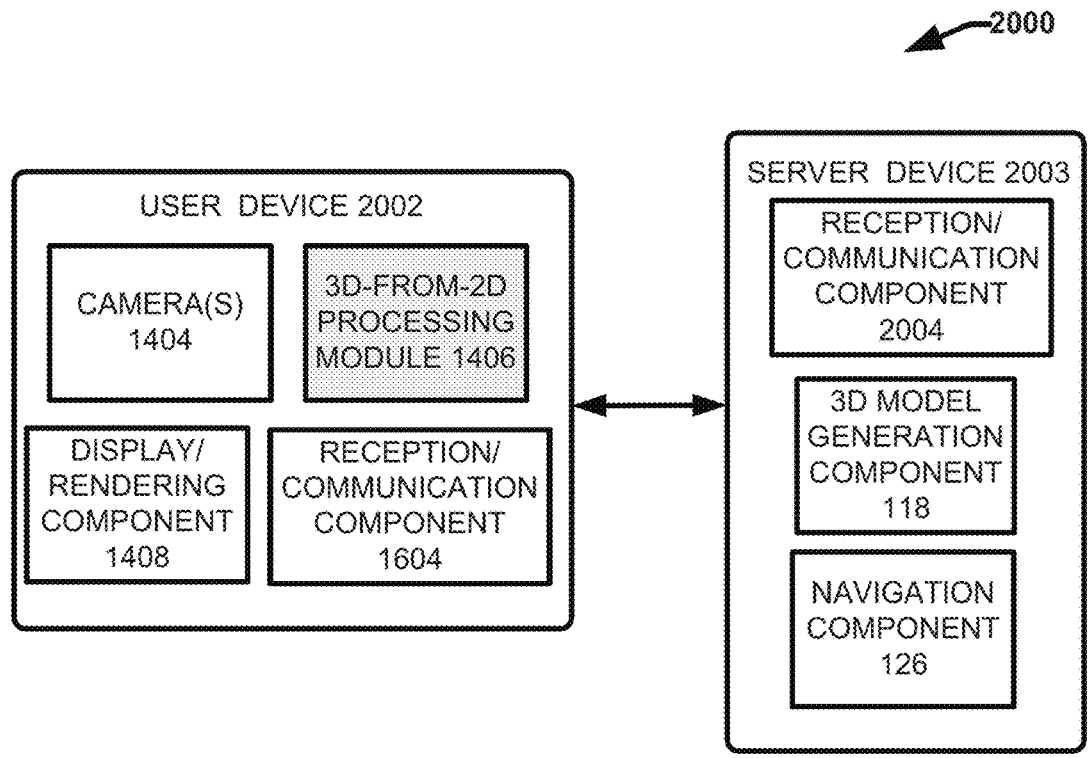

FIG. 20 presents another example system 2000 that facilitates capturing 2D image data, deriving 3D data from the 2D image data in accordance with various aspects and embodiments described herein. Unlike previous systems 1600, 1700, 1800 and 1900 which distributed various component between a capture device and a user device, system 2000 distributes components between a user device 2002 and a server device 2003. In the embodiment shown, the user device 2002 can include one or more cameras 1404, 3D-from-2D processing module 1406, display/rendering component 1408 and reception/communication component 1604. The server device 2003 can include 3D model generation component 118 and navigation component 126.

In accordance with this embodiment, the user device 2002 can operate as a capture device and capture at least 2D images (e.g., 2D image data 102) of an object or environment using one or more cameras 1404. For example, the user device 2002 can include a tablet PC, a smartphone, a standalone digital camera, an HUD device, and AR device, etc. with a single camera, a single camera with two lenses that can capture stereo-image pairs, a single camera with two lenses that can capture a 2D image with a wide-field of view, two or more cameras, etc. The user device 2002 can also include a device capable of capturing and/or generating (e.g., via stitching component 508 of the 3D-from-2D processing module 1406) a panoramic image (e.g., and image having a field-of-view greater than a minimum threshold and up to 360°). The user device 2002 can further execute the 3D-from-2D processing module 1406 to derive 3D/depth data for respective images captured via the one or more cameras 1404 in accordance with one or more of the various techniques described with reference to 3D-from-2D processing module 106, 3D-from-2D processing module 504, 3D-from-2D processing module 804, and 3D-from-2D processing module 1304.

The user device 2002 and the server device 2003 can be configured to operate in a server-client relationship, wherein the server device 2003 provides services and information to the user device 2002, including various 3D modeling services provided by the 3D model generation component 118 and navigation services provided by the navigation component 126 that facilitate navigating 3D models as displayed at the user device 2002. The respective devices can communicate with one another via one or more wireless communication networks (e.g., a cellular network, the Internet, etc.). For example, in the embodiment shown, the server device 2003 can also include a reception/communication component 2004 which can include suitable hardware and/or software to facilitate wireless communication with the user device 2002. In this regard, the reception/communication component 2004 can include same or similar features and functionalities as reception/communication component 1604. In some implementations, the server device 2003 can operate as web-server, application server, a cloud-based server, and the like to facilitate providing 3D modeling and navigation services to the user device 2002 via a website, web-application, thin client application, hybrid application or another suitable network accessible platform.

In one or more implementations, the user device 2002 can be configured to capture 2D images via the one or more cameras 1404, derive depth data for the 2D images and provide (e.g., communicate, send, transmit, etc.) the captured 2D images and their associated derived depth data to the server device 2003 for further processing by the 3D model generation component 118 and/or the navigation component 126. For example, using the 3D model generation component 118, the server device 2003 can generate a 3D model of an object or environment included in the received 2D images in accordance with the techniques described herein with reference to FIG. 1. The server device 2003 can further provide (e.g., communicate, send, transmit, stream, etc.) the 3D model (or a 2D model, such as a 2D floorplan model) back to the user device 2002 for rendering via a display at the user device 2002 (e.g., using display/rendering component 1408).

In some embodiments, the server device 2003 can generate and provide the user device 2002 with one or more intermediate versions of a 3D model based on the image data and associated depth data that has been received thus far over the course of a scan. These intermediate versions can include 3D reconstructions, 3D images, or 3D models. For example, over the course of a scan wherein the user device is positioned at different locations and/or orientations relative to an environment to capture different images with different perspectives of the environment, the reception/communication component 1604 can be configured to send the server device 2003 the respective images and associated derived 3D data as they captured (and processed by the 3D-from-2D processing module 1406 to derive the 3D data). In this regard, as described with reference to system 100 and exemplified with reference to the 3D model 200 shown in FIG. 2, the display/rendering component 1408 can receive and display the intermediate versions of the 3D model to facilities guiding the user during the capture process to determine where to aim the camera to capture addition image data the user would like to be reflected in the final version of the 3D model. For example, based on viewing an intermediate 3D reconstruction generated based on the 2D image data captured thus far, the entity (e.g., a user or a computing device) controlling the capture process can determine what portions or areas of the object or environment have not yet been captured and are excluded from the intermediate version. The entity can also identify areas of the object or environment associated with poor image data or incorrectly aligned image data. The entity can further position the one or more cameras 1404 to capture additional 2D images of the object or environment based on the missing or misaligned data. In some implementations, when the entity controlling the capture process is satisfied with the lasts presented intermediate 3D reconstruction or has otherwise determined that the collection of 2D images captured in association with the scan is complete, the user device 2002 can send a confirmation message to the server device 2003 confirming that the scan is complete. Based on reception of the confirmation message, the server device 2003 can generate the final version of the 3D model based on the complete set of 2D images (and associated 3D data).

Further, in some embodiments, after the 3D model is generated (or partially generated), the server device 2003 can facilitate navigating the 3D model as displayed at the user device using the features and functionalities of the navigation component 126. In various implementations, the intermediate 3D reconstructions discussed herein can represent a "rough draft" version of a final navigable 3D reconstruction. For example, the intermediate versions can have a lower image quality relative to the final version and/or be generated using a less precise alignment process relative to the final version. In some implementations, the intermediate versions may include static or 3D reconstructions that cannot be navigated, unlike like the final 3D representation.

Figure 21:
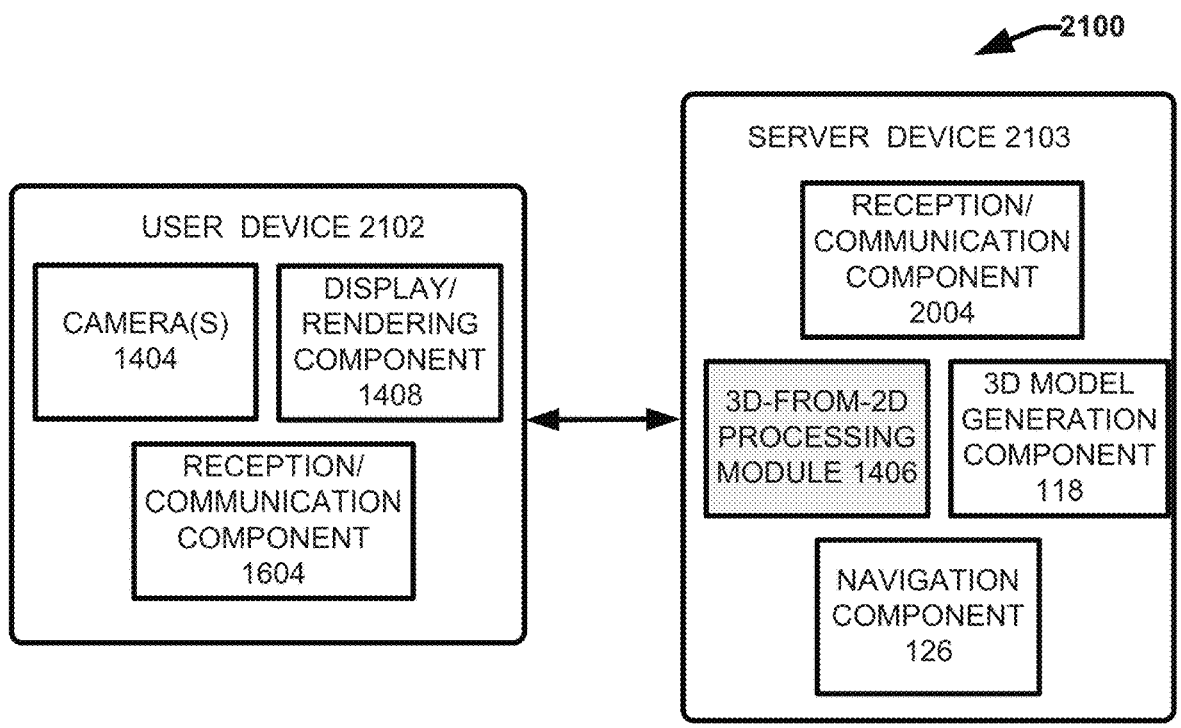

FIG. 21 presents another example system 2100 that facilitates capturing 2D image data, deriving 3D data from the 2D image data in accordance with various aspects and embodiments described herein. System 2100 can include same or similar features and functionalities as system 2000, with the exception of the location of the 3D-from-2D processing module 1406. In this regard, the 3D-from-2D processing module 1406 can be provided at the server device 2103 as opposed to the user device 2102. In accordance with system 2100, the user device 1202 can include one or more cameras 1404 configured to capture 2D images (and/or video). The user device 2102 can further provide the captured 2D images to the server device 2103 for further processing by the server device 2103 using the 3D-from-2D processing module 1406, the 3D model generation component 118 and/or the navigation component 126. In this regard, the intermediate versions can be generated and rendered with relatively little processing time, enabling a real-time (or substantially real-time) 3D reconstruction process that provides continually updated rough 3D version of a scene during the capture process.

In accordance with embodiments in which the 3D-from-2D processing module 1406 is provided at the server device (e.g., server device 2103 or another server device described herein), in a manner similar to the techniques discussed above, the server device 2103 can also generate and provide the user device 2102 with intermediate 3D reconstructions generated of an object or environment included in received 2D images (e.g., captured in association with a scan). However, unlike the techniques described with reference to FIG. 20, the server device 2103 can derive depth data for received 2D images instead of the user device 2102. For example, the user device 2102 can capture 2D images of an object or an environment using the one or more cameras 1404 and send (e.g., using the reception/communication component 1604) the 2D images to a server device 2103. Based on reception of the 2D images, the server device 2103 can employ the 3D-from-2D processing modules 1406 to derive 3D data for the 2D images and generate an intermediate 3D reconstruction of the object or environment using the 2D images and the 3D data. The server device 2103 can further send the user device 2102 the intermediate 3D reconstruction for rendering at the user device 2102 as a preview for facilitating the capture process.

Once the user device 2102 notifies the server device 2103 (e.g., using a completion confirmation message or the like), that the scan is complete, the server device 2103 can further perform additional (and in some implementations) more sophisticated processing techniques to generate a final 3D model of the environment. In some implementations, the additional processing can include using additional depth derivation and/or depth data optimization techniques (e.g., provided by the panorama component 506, the auxiliary data component 806, and/or the 3D data optimization component 1302) to generate more precise depth data for the 2D images for use by the 3D modeling generation component 118. For instance, in one example implementation, the server device 2103 can employ a first 2D-from-2D neural network model (e.g., a standard model 114) to derive first depth data for received 2D images and use this first depth data to generate the intermediate 3D reconstruction or reconstructions. Once a complete set of 2D image data has been received, the server device 2103 can then use the techniques provided by the panorama component 506, the auxiliary data component 806, and/or the 3D data optimization component 1302 to derived more precise depth data for the 2D images in the complete set. The server device 2103 can further employ this more precise depth data to generate a final 3D model of the object or environment using the 3D model generation component 118.

Figure 22:
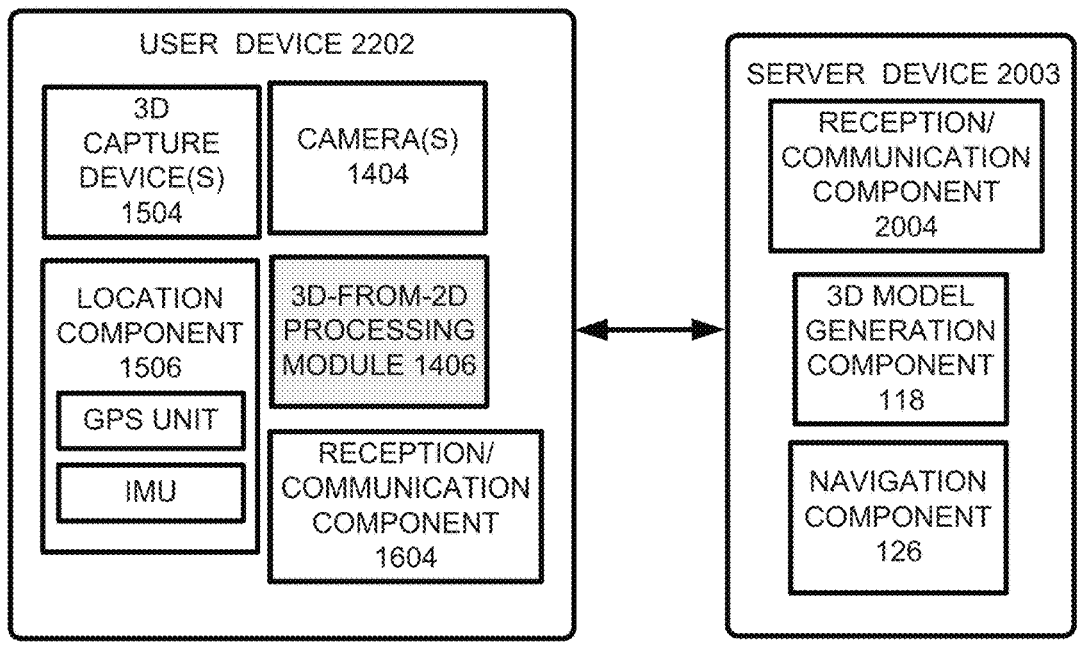

FIG. 22 presents another example system 2200 that facilitates capturing 2D image data, deriving 3D data from the 2D image data in accordance with various aspects and embodiments described herein. System 2200 can include same or similar features and functionalities as system 2000 with the addition of one or more 3D sensors 1504 and positioning component 1506 to the user device 2202. In accordance with system 2200, the user device can capture auxiliary data including 3D sensor data 910, capture device motion data 904 and/or capture device location data 906 associated with one or more 2D images captured via the one or more cameras. In some implementations, the 3D-from-2D processing module 1406 can be configured to employ the auxiliary data to facilitate generating 3D derived data 116 and/or optimized 3D data 1306 for the 2D images, in accordance with the features and functionalities of systems 800 and 1300. The user device 2202 can also determine, associate with respective images, and/or employ other types of auxiliary data discussed herein (e.g., camera/image parameters 908) to facilitate generating derived 3D data 116 by the 3D-from-2D processing module 1406 in accordance with the techniques described with reference to auxiliary data component 806 and 3D-from-2D processing module 804. The user device 2202 can further provide the 2D images along with their associated depth data (e.g., derived 3D data 116 or optimized 3D data 1306). In some implementations, the user device 2202 can also provide the auxiliary data to the server device 2003 to facilitate 3D model generation by the 3D model generation component 118 and/or navigation by the navigation component 126. In other implementations, rather than using the auxiliary data to facilitate 3D-from-2D depth derivation by the 3D-from-2D processing module 1406, the user device can alternatively provide the auxiliary data to the server device 2003 for use by the 3D model generation component 118 and/or the navigation component 126.

Figure 23:
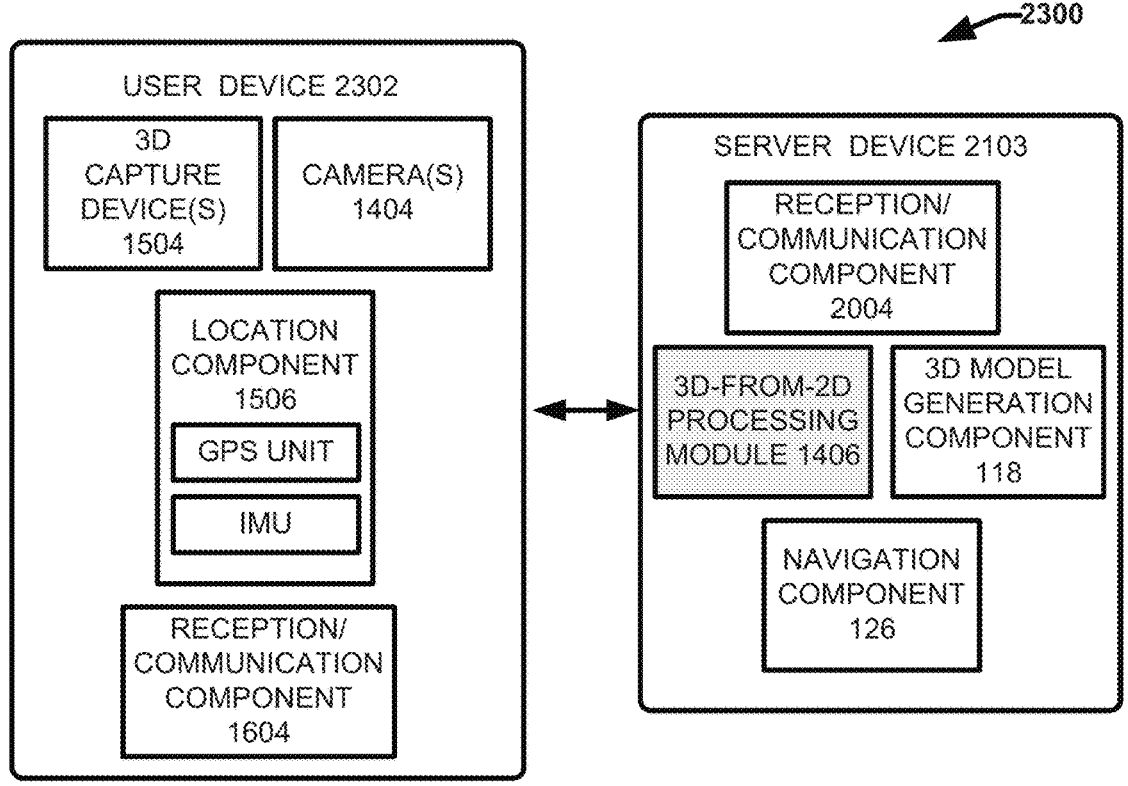

FIG. 23 presents another example system 2300 that facilitates capturing 2D image data, deriving 3D data from the 2D image data in accordance with various aspects and embodiments described herein. System 2300 can include same or similar features and functionalities as system 2200 with the exception of the location of the 3D-from-2D processing module. In accordance with system 2300, the server device 2103 can include the 3D-from-2D processing module 1406 (e.g., in a same or similar manner described with reference to system 2100). The user device 2303 can include the one or more 3D capture devices, one or more cameras 1404, positioning component 1506 and reception/communication component 1604. In accordance with this embodiment the user device 2302 can capture 2D images and associated auxiliary data and further send the images with the auxiliary data associated therewith to the service device for further processing by the 3D-from-2D processing module 1406, the 3D model generation component 118 and/or the navigation component 126.

Figure 24:
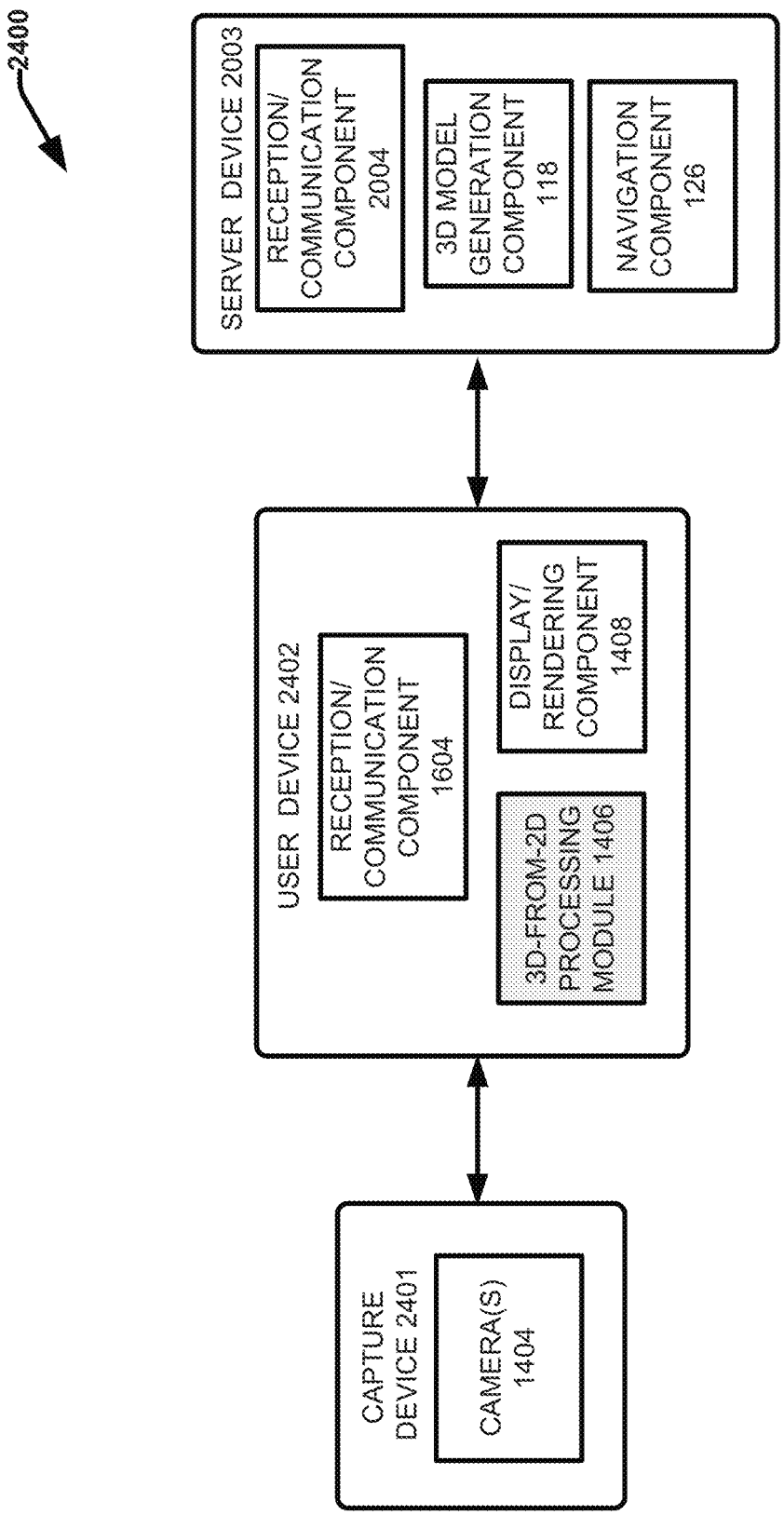

FIG. 24 presents another example system 2400 that facilitates capturing 2D image data, deriving 3D data from the 2D image data in accordance with various aspects and embodiments described herein. System 2400 can include same or similar features as previous systems disclosed herein. System 2400 however distributes various components of previous systems disclosed herein between a capture device 2401, a user device 2402, and a server device 2003 (previously described with reference to FIG. 20). With system

2400, a capture device 2401 can include the one or more cameras 1404 and used to capture 2D image data. For example, in one implementation, the capture device 2401 can be moved to different positions and orientations relative to an object or environment to capture different images of the object or environment from different perspectives. In some implementations, the different images can include one or more panoramic images (e.g., having a field-of-view of 360° horizontally or between 120° and 360° horizontally) generating using one or more techniques described herein. The capture device 2401 can further provide the captured images to the user device 2402, wherein based on reception of the images, the user device 2402 can employ 3D-from-2D processing module 1406 to derive 3D/depth data for the respective images using the various techniques described herein. In accordance with this embodiment, the user device 2402 can further (optionally) provide the 2D images with their associated 3D/depth data to the server device 2003 for further processing by the 3D model generation component 118 to generate a 3D model of the object or environment (e.g., by aligning the 2D images to one another using the derived depth data associated therewith). In some implementations, as discussed with reference to FIGS. 20 and 21, the server device 2003 can further provide the user device with one or more intermediate versions of the 3D model for rendering at the user device 2402 (e.g., using display/rendering component 1408). These intermediate versions of the 3D model can provide a preview of the alignment of the reconstructed space to facilitate directing or otherwise controlling an entity operating the capture device 2401 with the capture process (e.g., to know where to place the camera to obtain additional images). In this regard, once the user has captured as much image data of the object or environment that they want, the 3D model generation component can further optimize the alignment to create a refined 3D reconstruction of the environment. The final 3D reconstruction can be provided to the user device for viewing and navigating as an interactive space (as facilitated by the navigation component 126). In various implementations, the intermediate versions can represent a "rough draft" version of the final 3D reconstruction. For example, the intermediate version can have a lower image quality relative to the final version and/or be generated using a less precise alignment process relative to the final version. In some implementations, the intermediate versions may include static or 3D reconstructions that cannot be navigated, unlike like the final 3D representation.

Figure 25:
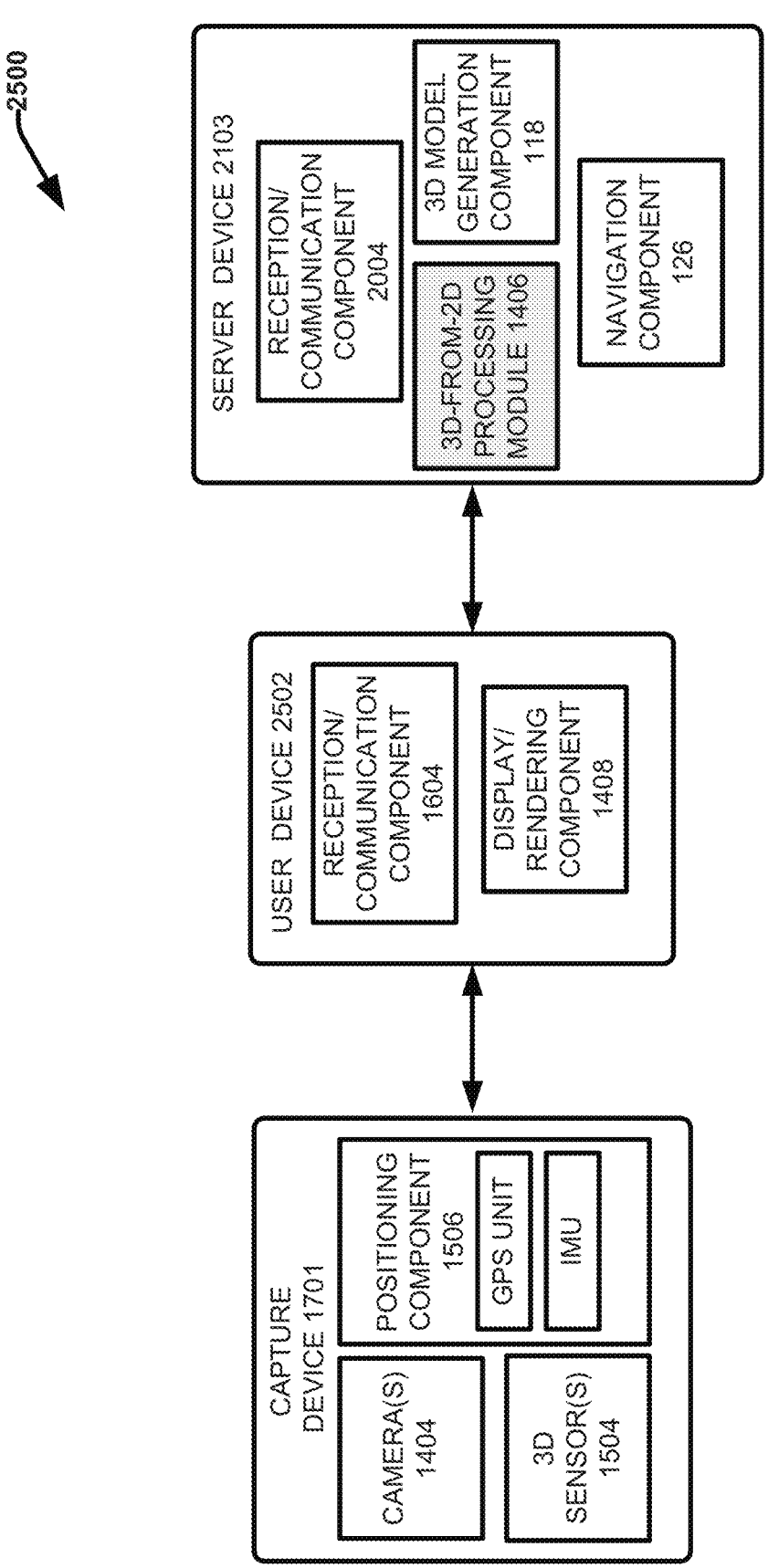

FIG. 25 presents another example system 2500 that facilitates capturing 2D image data, deriving 3D data from the 2D image data, generating reconstructed 3D models based on the 3D data and the 2D image data, and navigating the reconstructed 3D models, in accordance with various aspects and embodiments described herein. System 2500 can include same or similar features and functionalities as system 2400, with the modification of the location of the 3D-from-2D processing module 1406 at the server device 2103 (previously described with reference to FIG. 21), and the addition of the one or more 3D sensors 1504 and positioning component 1506 to the capture device 1701. In this regard, the user device 2502 can merely include reception/communication component 1604 to facilitate relaying information between the capture device 1701 and the server device 2103. For example, the user device 2502 can be configured to receive 2D images and/or associated native auxiliary data from the capture device 1701 and send the 2D images and/or associated native auxiliary data to the server device for processing by the 3D-from-2D processing module 1406 and optionally the 3D model generation component 118. The server device 2103 can further provide the user device 2502 with 3D models and/or representations of the 3D models generated based on the 2D images and/or the auxiliary data.

In another implementation of the embodiment, the server device 2103 can provide a cloud based, web-based, thin-client application based, etc., service wherein users can select and upload images already stored at the user device 2502 to the server device 2103. The server service 2103 can then automatically aligns the images in 3D and creates a 3D reconstruction using 3D-from-2D techniques described herein.

Figure 26:
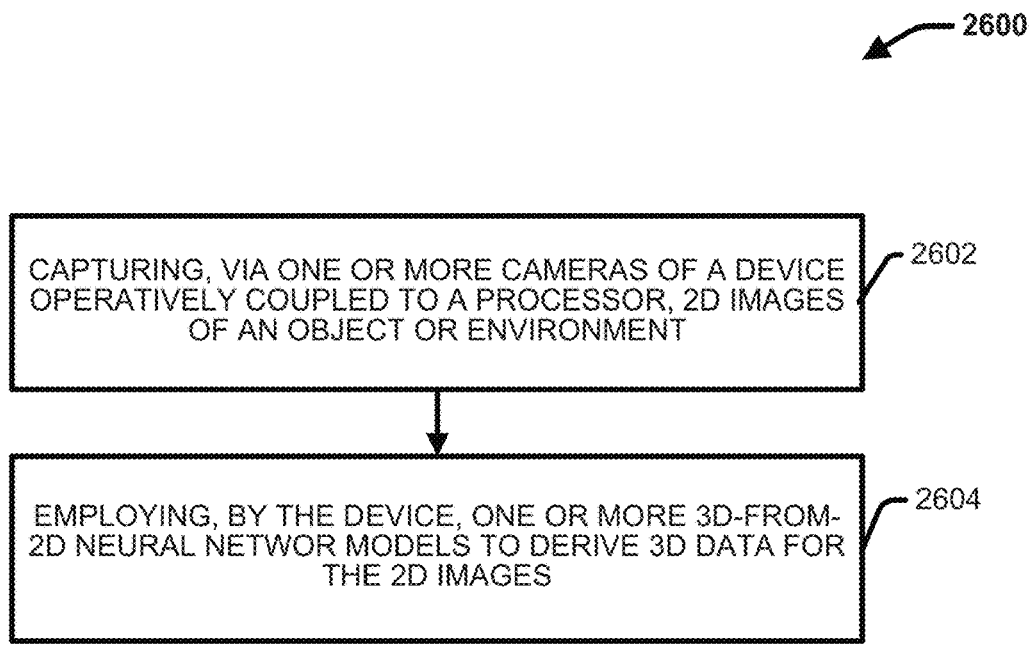
FIG. 26 presents an example computer-implemented method that facilitates capturing 2D image data and deriving 3D data from the 2D image data in accordance with various aspects and embodiments described herein.

FIG. 26 presents an example computer-implemented method 2600 that facilitates capturing 2D image data and deriving 3D data from the 2D image data in accordance with various aspects and embodiments described herein. Repetitive description of like elements employed in respective embodiments is omitted for sake of brevity.

At 2602, a device operatively coupled to a processor (e.g., one or more capture devices described with reference to FIGS. 14-25) captures 2D images of an object or environment (e.g., using one or more cameras 1404). At 2704, the device employs one or more 3D-from-2D neural network models to derive 3D data for the 2D images (e.g., using 3D-from-2D processing module 1406).

Figure 27:
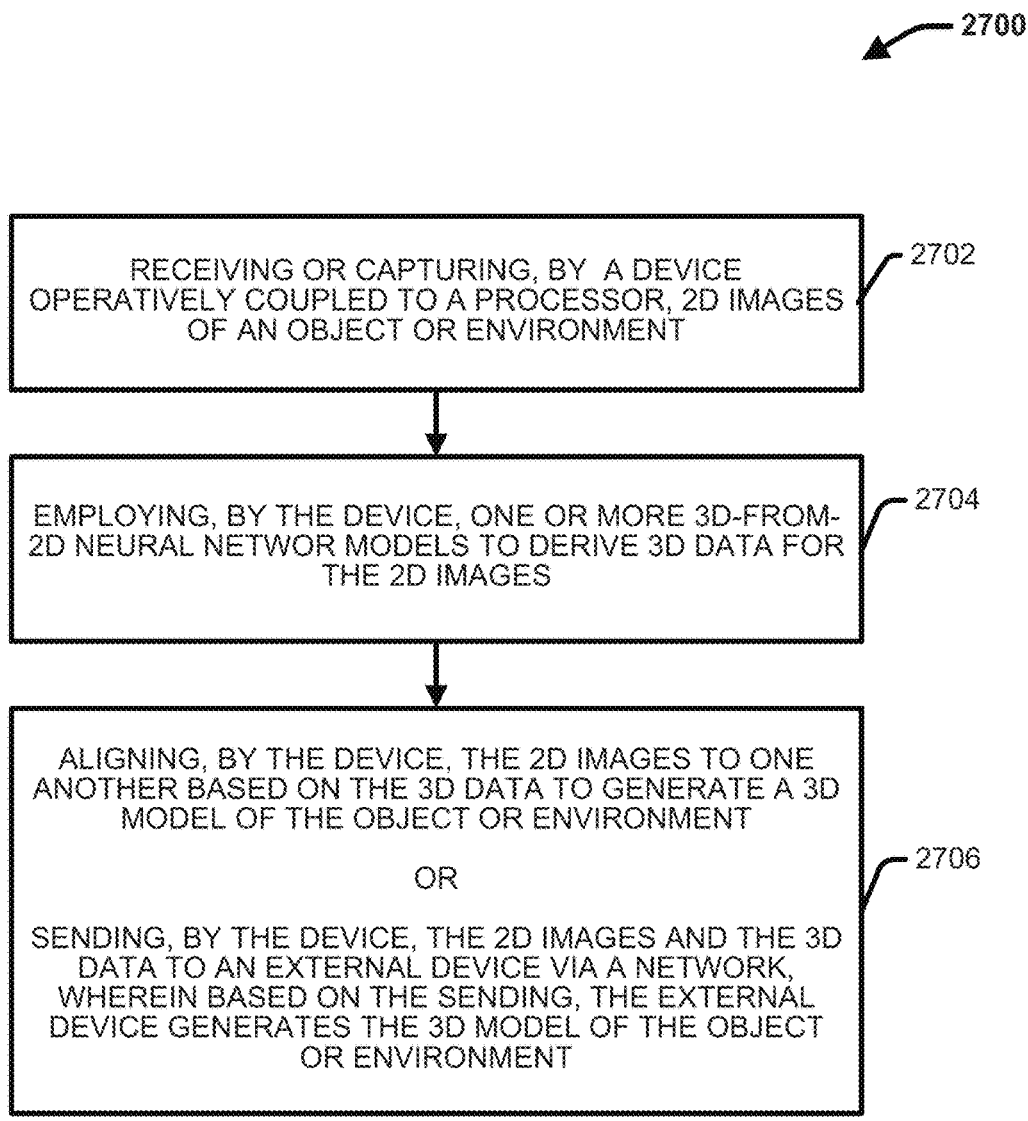
FIG. 27 presents another example computer-implemented method that facilitates capturing 2D image data and deriving 3D data from the 2D image data in accordance with various aspects and embodiments described herein. 2D image data, in accordance with various aspects and embodiments described herein.

FIG. 27 presents another example computer-implemented method 2700 that facilitates capturing 2D image data and deriving 3D data from the 2D image data in accordance with various aspects and embodiments described herein. Repetitive description of like elements employed in respective embodiments is omitted for sake of brevity.

At 2702, a device operatively coupled to a processor (e.g., one or more capture devices, user devices or server devices described with reference to FIGS. 14-25), receives or captures 2D images of an object or environment. At 2704, the device employs one or more 3D-from-2D neural network models to derive 3D data for the 2D images (e.g., using 3D-from-2D processing module 1406). At 2706, the device either aligns the 2D images based on the 3D data to generate a 3D model of the object or environment, or the device sends the 2D images and the 3D data to an external device via a network (e.g., one or more server devices described with reference to FIGS. 20-25), wherein based on the sending, the external device generates the 3D model of the object or environment.

Figure 28:
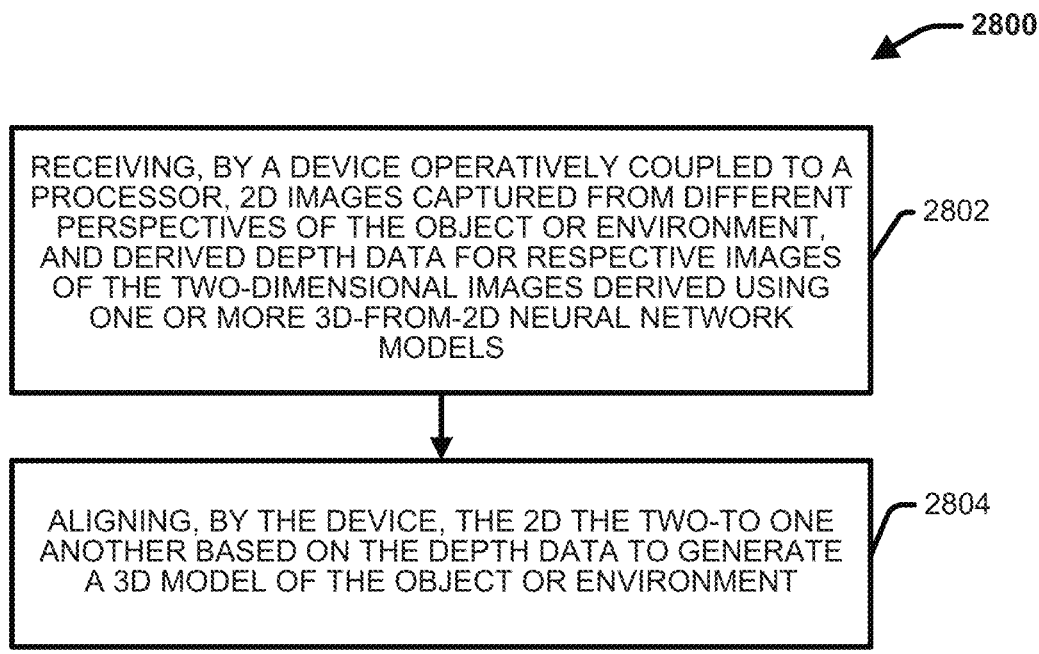
FIG. 28 presents another example computer-implemented method that facilitates capturing 2D image data and deriving 3D data from the 2D image data in accordance with various aspects and embodiments described herein.

FIG. 28 presents another example computer-implemented method 2800 that facilitates capturing 2D image data and deriving 3D data from the 2D image data in accordance with various aspects and embodiments described herein. Repetitive description of like elements employed in respective embodiments is omitted for sake of brevity.

At 2802, a device operatively coupled to a processor (e.g., one or more user devices or server devices described with reference to FIGS. 14-25), receives 2D images of an object or environment captured from different perspectives of the object or environment, wherein the device further receives derived depth data for respective images of the 2D images derived (e.g., using 3D data derivation component 110) using one or more 3D-from-2D neural network models. At 2804, the device aligns the 2D images to one another based on the depth data to generate a 3D of the object or environment (e.g., via 3D model generation component 118).

Figure 29:
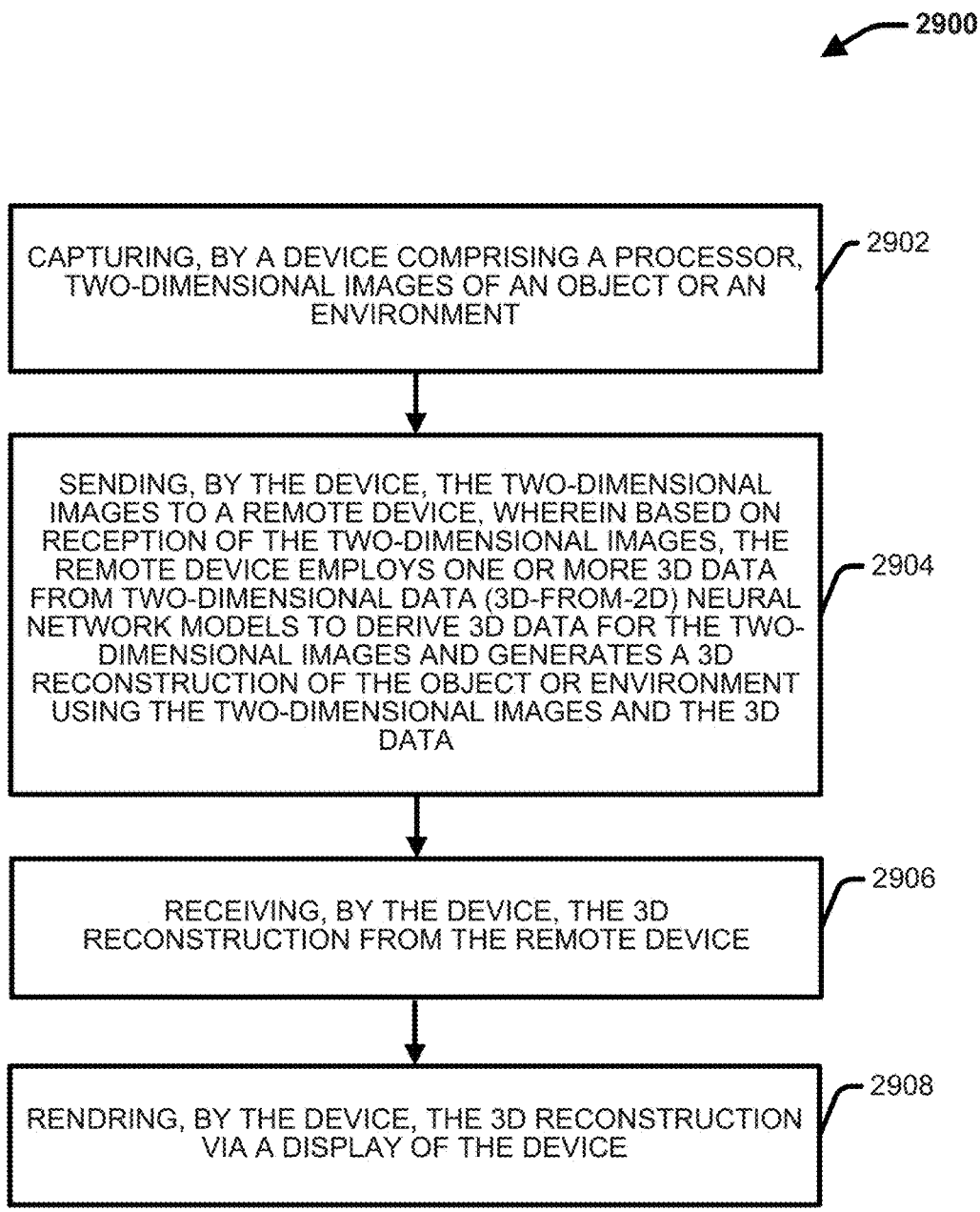
FIG. 29 presents another example computer-implemented method that facilitates capturing 2D image data and deriving 3D data from the 2D image data in accordance with various aspects and embodiments described herein.

FIG. 29 presents another example computer-implemented method 2900 that facilitates capturing 2D image data and deriving 3D data from the 2D image data in accordance with various aspects and embodiments described herein. Repetitive description of like elements employed in respective embodiments is omitted for sake of brevity.

At 2902, a device comprising a processor (e.g., user device 2102, user device 2302, user device 2502, and the like) captures 2D images of an object or an environment (e.g., using one or more cameras 1404). At 2904, the device sends the 2D images to a server device (e.g., server device 2103), wherein based on reception of the 2D images, the server device employs one or more 3D-from-2D neural network models to derive 3D data for the 2D images (e.g., using 2D-from-3D processing module 1406), and generates a 3D reconstruction of the object or environment using the 2D images and the 3D data (e.g., using 3D model generation component 118). At 2906, the device further receives the 3D reconstruction from the server device, and at 2908, the device renders the 3D reconstruction via a display of the device.

In one or more embodiments, the device can capture the 2D images from different perspectives of the object or environment in association with an image scan of the object or environment. With these embodiments, the device can further send a confirmation message to the remote device confirming the image scan is complete. In this regard, the 3D reconstruction can comprise a first or initial 3D reconstruction, and wherein based on reception of the confirmation message, the remote device can generate a second (or final) 3D reconstruction of the object or environment. For example, in some implementations, the second 3D reconstruction has a higher level of image quality relative to the first three-dimensional reconstruction. In another example, implementation, the second 3D reconstruction comprises a navigable model of the environment and wherein the first 3D reconstruction is not navigable. In another example implementation, the second 3D reconstruction was generated using a more precise alignment process relative to an alignment process used to generate the first 3D reconstruction.

Figure 30:
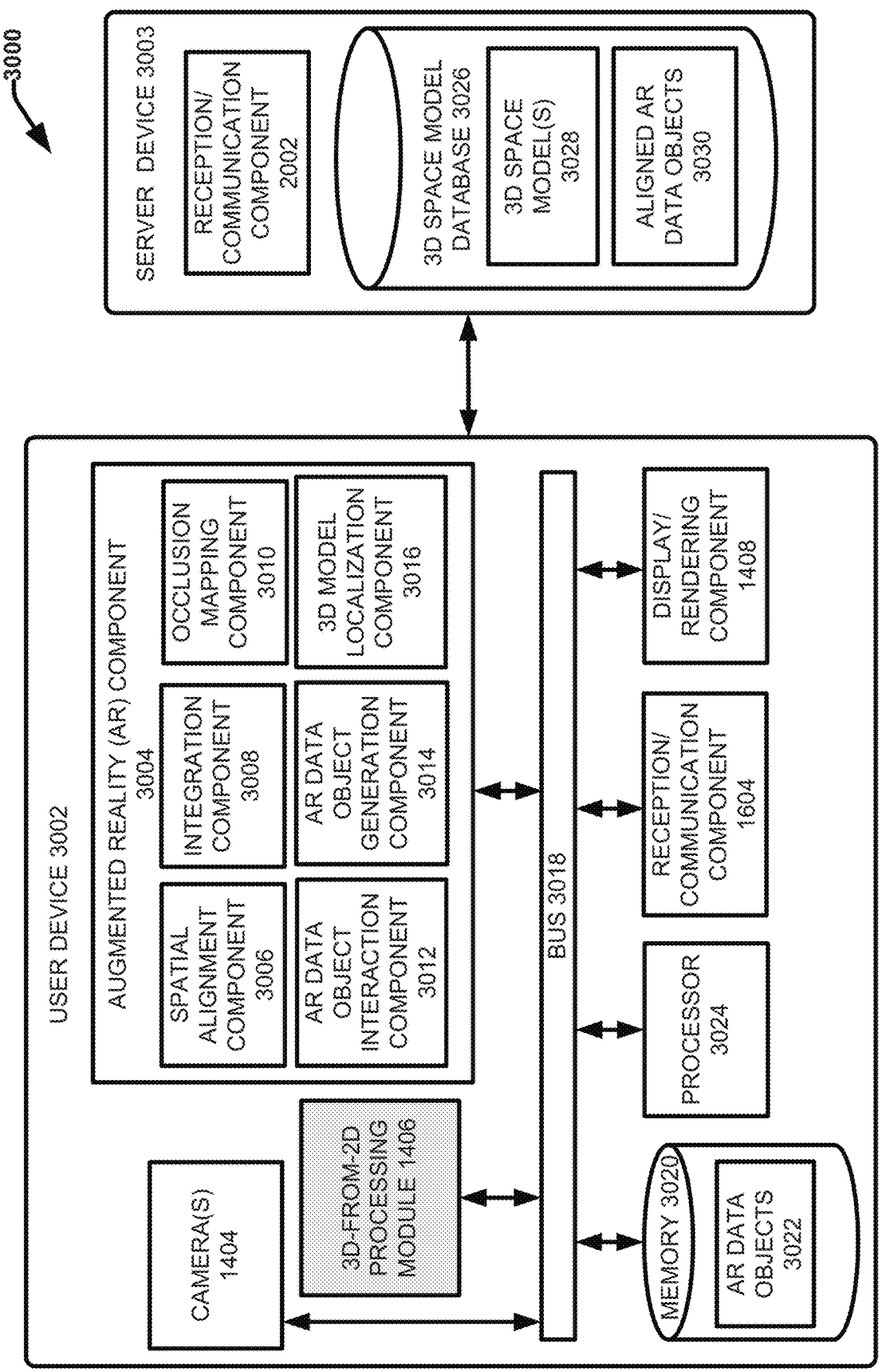
FIG. 30 presents an example system that facilitates using one or more 3D-from-2D techniques to in association with an augmented reality (AR) application in accordance with various aspects and embodiments described herein.

FIG. 30 presents an example system 3000 that facilitates using one or more 3D-from-2D techniques to in association with an augmented reality (AR) application in accordance with various aspects and embodiments described herein. System 3000 includes at least some same or similar features as previous systems disclosed herein (e.g., one or more cameras 1404, 3D-from-2D processing module 1406, reception/communication component 1604, and display/rendering component 1408). Repetitive description of like elements employed in respective embodiments is omitted for sake of brevity.

In the embodiment shown, system 100 includes a user device 3002 with one or more cameras 1404 configured to capture 2D image data (e.g., including panoramic images and video) and of an object or environment and 3D-from-2D processing module 1406 configured to derive depth data for one or more 2D images included in the 2D image data. As discussed supra, the 3D-from-2D processing module 1406 can be or correspond to 3D-from-2D processing module 106, 3D-from-2D processing module 504, 3D-from-2D processing module 804, or 3D-from-2D processing module 1304. Although not shown, in some embodiments, the user device can also include one or more 3D sensors 1504, positioning component 1506 and/or one or more additional hardware and/or software components that facilitate generating the native auxiliary data 802 to facilitate deriving the depth data for the captured images in accordance with the various techniques described herein with reference to FIGS. 8, 9 and 13. The user device further includes AR component 3004, reception/communication component 1604, and display/rendering component 1408. The user device 3002 can include various types of computing devices that include one or more cameras on or within a housing thereof configured to capture 2D image data of an environment and a display/rendering component 1408 that include hardware and/or software that facilitates rendering digital objects on or within a representation of an environment via a display of the user device 3002, as hologram, or the like. For example, in some embodiments, the user device 3002 can include an AR headset configured to be worn by a user and including a display (e.g., a transparent glass display) that is position in front of the user's eyes (e.g., glasses, goggles, an HUD, etc.). In another, embodiment the user device can be or include a mobile handheld device, such as a mobile phone or smartphone, a tablet PC, or a similar device. Still in other embodiments, the user device 3002 can include a device that can be positioned in a relatively fixed position relative to an environment, such as a laptop PC, a desktop PC or the. Like.

The user device 3002 can include or be operatively coupled to at least one memory 3020 and at least one processor 3024. The at least one memory 122 can further store computer-executable instructions (e.g., the 2D-from-3D processing module 1406, the AR component 3004, one or more software elements of the reception/communication component 1604, and/or one or more software elements of the display/rendering component 1408) that when executed by the at least one processor 3024 facilitate performance of operations defined by the computer-executable instructions. In some embodiments, the memory 122 can also store information received, generated by, and/or employed by the computing device. For example, in the embodiment shown, the memory 3020 can store one or more AR data objects 3022 that can be used by the AR component 3004. The memory 3020 can also store information including but not limited to, captured image data and depth information derived for the captured image data, received 2D image data 102, the derived 3D data 116, and the 3D model and alignment data 128. The user device 3002 can further include a device bus 120 that communicatively couples the various components of the user device. Examples of said processor 3024 and memory 3020, as well as other suitable computer or computing-based elements that can be used in connection with implementing one or more of the systems or components shown and described in connection with FIG. 30 or other figures disclosed herein, can be found with reference to FIG. 35.

System 3000 can further include server device 3003. The server device 3003 can provide information and/or services to the user device 3002 that facilitate one or more features and functionalities of the AR component 3004. In this regard, the AR component 3004 can be or correspond to an AR application that provides one or more AR features and functionalities which involve integrating virtual digital data objects on or within a live view of an environment. For example, in an embodiment in which the user device 3002 comprises a wearable device configured to be worn by a user and includes a transparent display positioned in front of the user's eyes when worn (e.g., glasses, goggles or other forms of eyewear for example), the live view of the environment can include an actual view of the environment currently being viewed through the transparent display. With this embodiment, digital data objects can be rendered on the glass display with an appearance and position that causes the digital data objects to be aligned with the live view of the environment. In another example, the user device can include a tablet PC, smartphone, or the like with a display configured to render a live image data (e.g., video) of the environment captured via a forward-facing camera of the device. In accordance with this example embodiment, the digital data objects can be rendered as overlay data onto the live image data (e.g., snapshots and/or video) rendered on the device display.

The types of digital data objects capable of being integrated on or within a live view of an environment can vary and are referred to herein as AR data objects (e.g., AR data objects 3022). For example, the AR data objects 3022 can include a 3D or 2D graphical image or model of data of an object or person. In another example, the AR data objects 3022 can include icons, text, symbols tags, hyperlinks etc. that can be visually displayed and interacted with. In another example, the AR data objects 3022 can include data objects that are not visually displayed (or initially visually displayed) but can be interacted with and/or are activated in response to a trigger (e.g., a user pointing at, viewing in line of sight of the user, a gesture etc.). For example, in one embodiment involving, based on viewing or pointing to an actual object appearing in the environment, (e.g., a building), auxiliary data can be rendered that is associated with the building, such as text overlay identifying the building, video data, sound data, graphical image data corresponding to an object or thing emerging from an open window of the building, etc. In this regard, the AR data objects 3022 can include various types of auxiliary datasets. For example, the AR data objects 3022 can include marks or labels identifying objects or locations captured in image data (e.g., live video and/or snapshots) by the one or more cameras 1404. These marks may be manually or automatically (via image or object recognition algorithms) made during a current or prior capture of the environment or previously generated and associated with known objects or locations of an environment currently being viewed. In another example, the AR data objects 3022 can include images or 3D objects having predefined associations with one or more actual objects or locations or things included in a current environment. In yet another example, the AR data objects 3022 can include video data objects, audio data objects, hyperlinks and the like.

The AR component 3004 can employ 3D/depth data derived by the 3D-from-2D processing module 1406 from live 2D image data (e.g., snapshots or video frames) of an object or environment captured via the one or more cameras 1404 to facilitate various AR applications. In particular, the AR component 3004 can employ the 3D-from-2D techniques described herein to facilitate enhancing various AR applications with more accurate and photorealist integration of AR data objects as overlays onto a live view of an environment. In this regard, in accordance with various embodiments, the one or more cameras 1404 can capture live image data of an environment that corresponds to a current perspective of the environment view on or through a display of the user device 3002. The 3D-from-2D processing module 1406 can further derive depth data from the image data in real-time or substantially real-time. For example, in an implementation in which a user is walking around an empty home for potential purchase while wearing or holding the user device 3002 such that at least one of the one or more cameras 1404 of the user device 3002 capture image data corresponding to the current perspective of the user, the 3D-from-2D processing module 1406 can derive depth data from the image data that corresponds to actual 3D positions (e.g., depth/distance) of the user relative to physical structures of the house (e.g., walls, ceilings, kitchen cabinets, appliances, openings, doors, windows, etc.). The AR component 3004 can use this depth data to facilitate integrating one or more AR data objects on or within the live view of the environment.

In the embodiment shown, the AR component 3004 can include spatial alignment component 3006, integration component 3008, occlusion mapping component 3010, and AR data object interaction component 3012, AR data object generation component 3014, and 3D model localization component 3016.

The spatial alignment component 3006 can be configured to determine, based on the derived depth/3D data, a position for integrating an AR data object on or within a representation of an object or environment that corresponds to a current perspective of the object environment being viewed by user. The integration component 3008 can further integrate the AR data object on or within the representation of the object or environment at the position. For example, the integration component 3008 can render the auxiliary data object with a size, shape, orientation, and position on the display that aligns the auxiliary data object with the live view of the environment at the determined position. In this regard, if the display is a transparent display, the integration component 3008 can render the AR data object on the glass of the transparent display with at a position of on the display and with a size, shape, and/or orientation that aligns the AR data object with the determined position in the environment. The integration component 3008 can further determine the appropriate position, size shape and/or orientation for the AR data object based on a relative position of the user's eyes to the display and a type of the AR data object. In other implementations in which the representation of the environment comprises image data captured of the environment and rendered on the display, the integration component 3008 can render the AR data object as an overlay onto the image data with a size, shape, and/or orientation that aligns the AR data object with the determined position in the environment.

For example, based on depth data indicating a relative 3D position of the user to actual objects, things, people, etc., included in the environment such as a wall, an appliance, a window, etc., the spatial alignment component 3006 can determine a position for integrating an AR data object that spatially aligns the AR data object with wall, appliance, window, etc. For example, in one implementation, the spatial alignment component 3006 can determine a hypothetical 3D position and orientation of the AR data object relative to the actual wall, appliance, window, etc. based on the known relative position of the user to the actual wall, appliance, window, etc., as determined based on the derived depth data. The integration component 3008 can further use this hypothetical 3D position and orientation of the AR data object to determine a position for overlaying the data object onto the live representation of the environment viewed on or through the display, that spatially aligns the data object at the hypothetical 3D position with a size and shape of an appropriate scale (e.g., based on what the data object is).

The occlusion mapping component 3010 can facilitate accurately integrating AR data objects onto live views of an environment that accounts for relative positions of objects in the environment to one another and the current viewpoint of the user based on the derived 3D/depth data. In this regard, the occlusion mapping component 3010 can be configured to determine a relative position of the AR data object relative to another object included in the live representation of the object or environment viewed on or through the display based on the current perspective of the user and the derived 3D/depth data. For example, the occlusion mapping component 3010 can ensure that if the AR object is placed in front of an actual object appearing in the environment, that the portion of the AR data object located in front of the actual data object is occludes the actual data object. Likewise, if the AR object is placed behind an actual object appearing in the environment, that the portion of the AR data object located in behind the actual data object is occluded by the actual data object. Accordingly, the occlusion mapping component 3010 can employ the derived 3D/depth data for respective objects, things, etc., in an environment relative to a current position and viewpoint of the user to the respective object, things, etc. to ensure correct occlusion mapping or virtual objects relative to actual object (e.g., virtual objects are drawn "behind" real objects that are closer than them).

The AR data object interaction component 3012 can employ the derived 3D/depth data for an environment based on a current location and perspective of the viewer to the environment to facilitate user interaction with virtual AR data objects that are spatially integrated with the environment by the spatial alignment component 3006 and the integration component 3008. In this regard, the AR data object interaction component 3012 can employ the derived 3D/depth data directly by making virtual objects interact with or be constrained by their environment in more realistic ways.

The AR data object generation component 3014 can provide for generating 3D virtual data objects for use by the AR component 3004. For example, in one or more embodiments, the AR data object generation component 3014 can be configured to extract object image data of an object included in a 2D image. For instance, using the features and functionalities of the cropping component 510 discussed infra and essentially any 2D image including an object that can be segmented out of the image, the AR data object generation component 3014 can crop, segment out, or otherwise extract a 2D representation of the object from the image. The AR data object generation component 3014 can further employ 3D data derived for and associated with the extracted 2D object (i.e., the object image data) by the 3D-from-2D processing module 1406 to generate a 3D representation or model of the object. In various embodiments, the spatial alignment component can further be configured to determine a position for integrating 3D representation or model of the object (i.e., the object image data) on or within a live representation of the object based on the object three-dimensional data.

In some embodiments, a live environment being viewed and/or interacted with by a user using AR (e.g., using the features and functionalities of user device 3002), can be associated with a previously generated 3D model of the environment. The previously generated 3D model of the environment can also include or otherwise be associated with information identifying defined positions and/or orientations of AR data objects relative to the 3D model. For example, a 3D model generated by the 3D model generation component 118 can be associated with tags at various defined locations relative to the 3D model that identify objects (e.g., appliances, furniture, walls, buildings, etc.), provide information about the objects, provide hyperlinks to applications associated with the objects, and the like. Other types of AR data objects that can be associated with a previously generated 3D model of an object or environment can include but are not limited to:

Marks or labels identifying captured objects or locations; these marks may be manually or automatically (via image or object recognition algorithms) made during a current or prior capture of the environment or via a user of an external tool manipulating the captured 3D data.

Images or 3D objects added in particular positions relative to a prior 3D capture of the same environment; for example, an interior decorator or other user may capture a 3D environment, import the 3D environment into a 3D design program, make changes and additions to the 3D environment, and then use the 3D reconstruction system to view how those changes and additions would appear in the environment.

3D data from a previous capture of the same object or environment; in this case, differences between prior 3D data and present 3D data may be highlighted.

A 3D CAD model of the object or environment being captured; in this case, differences between the CAD model and the present 3D data may be highlighted, which can be useful for finding defects in manufacturing or construction, or items that were incorrectly installed.

Data captured by additional sensors during a current or a prior 3D capture process.

AR data objects (e.g., tags, those described above, and the like) that have been previously associated with defined positions relative to a 3D model of an object or environment are referred to herein as aligned AR data objects. In the embodiment shown, such previously generated 3D models of an environment and associated aligned AR data objects can be stored in a network accessible 3D space model database 3026, as 3D space models 3028, and aligned AR data objects 3030, respectively. In the embodiment shown, the 3D space model database 3026 can be provided by the server device 3003 and accessed by the AR component 3004 via one or more networks (e.g., using reception/communication component 1604). In other embodiments, the 3D space model database 3026 and/or some of the information provided by the 3D space model database 3026 can be stored locally at the user device 3002.

In accordance with these embodiments, the 3D model localization component 3016 can provide for using a previously generated 3D model of an environment and the aligned AR data objects (e.g., tags and other AR data objects discussed herein) to facilitate integrating the aligned AR data objects 3030 with a live view of the environment. In particular, the 3D model localization component 3016 can employ derived 3D/depth data determined for a current perspective of the environment from a current position and orientation of the user device 3002 to "localize" the user device relative to the 3D model. In this regard, based on the derived 3D data that indicates a position of the user device to respective objects in the environment, the 3D model localization component 3016 can determine a relative position and orientation of the user relative to the 3D model (as if the user was actually standing within the 3D model). The 3D model localization component 3016 can the further identify an AR data object associated with a defined position in the 3D model that is located within a current perspective of the user relative to the 3D model and the actual environment. The 3D model localization component 3016 can further provide for determining how to spatially align the AR data object with a live perspective of the environment based on how the auxiliary data object is aligned with the 3D model and the relative position of the user to the 3D model.

For example, imagine a scenario in which a 3D space model of house or building was previously generated and various objects included in the 3D space model were associated with tags, such as perhaps a tag associated with an electrical panel indicating describing respective functions of different circuits on the electrical panel. Now imagine a user operating the user device 3002 is viewing the house live and in person and has a current view of the real electrical panel (e.g., viewed through a transparent display for example). The AR component 3004 can provide for overlaying the tag data aligned with the actual electrical panel as viewed live through the transparent display. In order to accurately align the tag data with the electrical panel, the user device 3002 needs to localize itself with the previously generated 3D model. The 3D model localization component 3016 can perform this localization using derived 3D/depth data determined from a live image of the environment corresponding to a live perspective of the electrical panel. For example, the 3D model localization component 3016 can use the derived depth information corresponding to the user's actual position/orientation relative to the electrical panel to determine the relative position/orientation of the user to the electrical panel in the 3D model. Using the relative position/orientation and the actual position/orientation, the 3D spatial alignment component 3006 can determine how to position the tag data as an overlay onto the transparent display that aligns the tag data with the actual view of the electrical panel.

Figure 31:
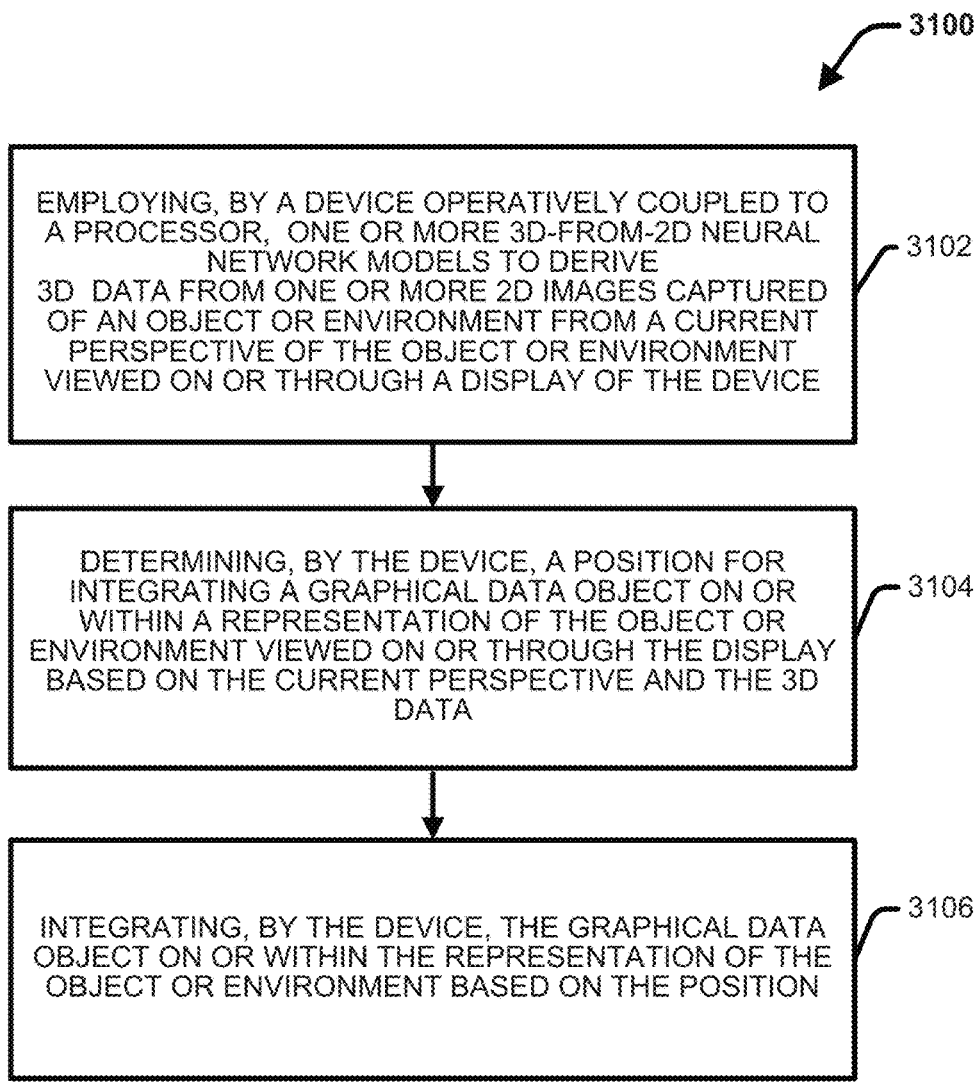
FIG. 31 presents an example computer-implemented method for using one or more 3D-from-2D techniques to in association with an AR application in accordance with various aspects and embodiments described herein.

FIG. 31 presents an example computer-implemented method 3100 for using one or more 3D-from-2D techniques to in association with an AR application in accordance with various aspects and embodiments described herein. Repetitive description of like elements employed in respective embodiments is omitted for sake of brevity.

At 3102, a device (e.g., user device 3002), operatively coupled to a processor, employs one or more 3D-from-2D neural network models to derive 3D data from one or more 2D images captured of an object or environment from a current perspective of the object or environment viewed on or through a display of the device (e.g., using 3D-from-2D processing module 1406). At 3104, the device determines a position for integrating a graphical data object on or within a representation of the object or environment viewed on or through the display based on the current perspective and the three-dimensional data (e.g., using spatial alignment component 3006 and/or 3D model localization component 3016). At 3106, the device integrates the graphical data object on or within the representation of the object or environment based on the position (e.g., using integration component 3008).

Figure 32:
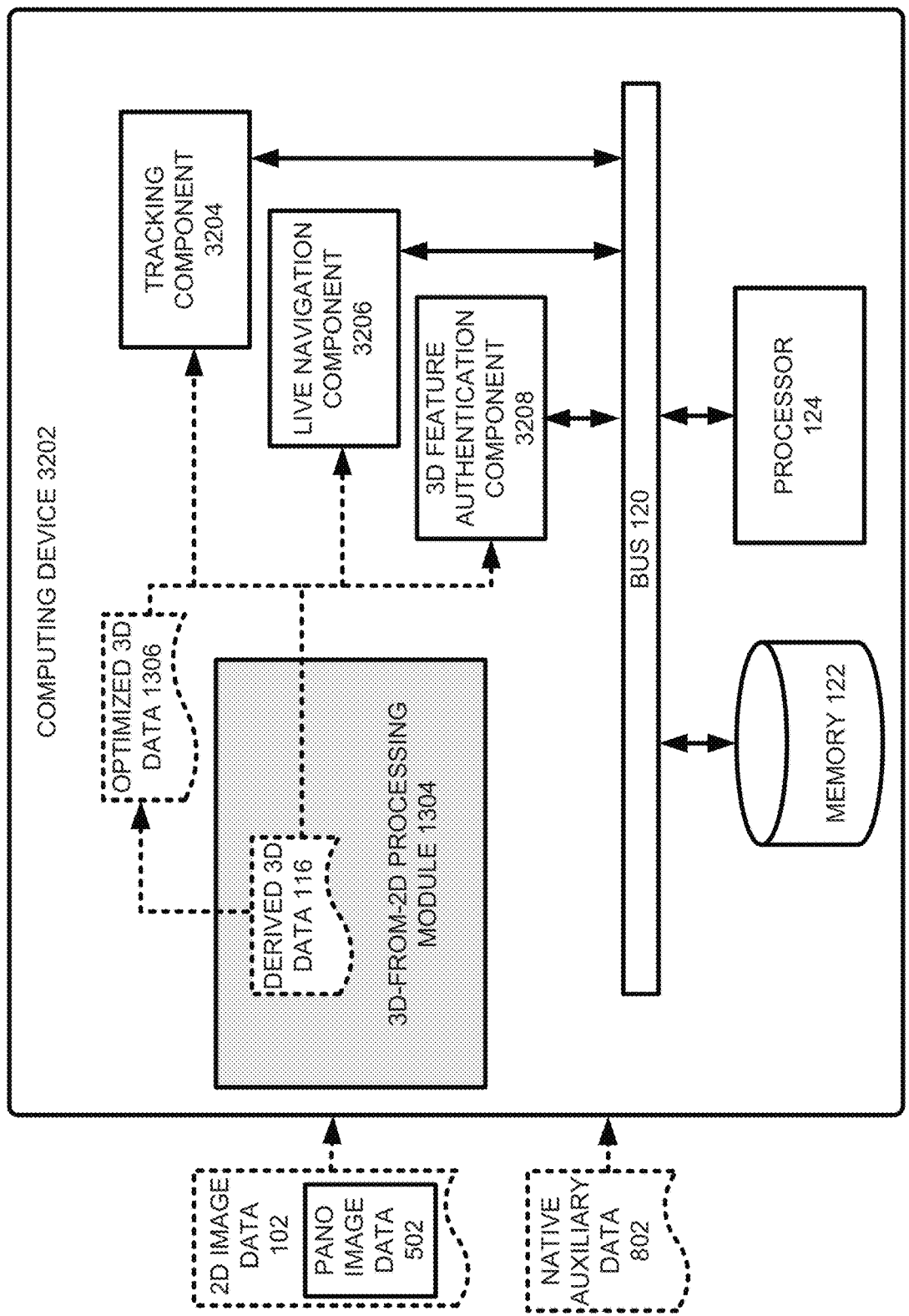
FIG. 32 presents an example computing device that employs one or more 3D-from-2D techniques in association with object tracking, live navigation and 3D feature-based security applications in accordance with various aspects and embodiments described herein.

FIG. 32 presents an example computing device 3202 that employs one or more 3D-from-2D techniques in association with object tracking, live navigation and 3D feature-based security applications in accordance with various aspects and embodiments described herein. Repetitive description of like elements employed in respective embodiments is omitted for sake of brevity.

With reference to FIGS. 13 and 32, computing device 3202 can include same or similar features and functionalities as computing device 104, including 3D-from-2D processing module 1304 configured to generate derived 3D data 116 and/or optimized 3D data 1306 based on received 2D image data 102 and optionally, native auxiliary data 802. Computing device 3202 further includes tracking component 3204, live navigation component 3206 and 3D feature authentication component 3208. The tracking component 3204, live navigation component 3206 and 3D feature authentication component 3208, can respectively include computer-executable components that stored in memory (e.g., memory 122) that when executed by a processor (e.g., processor 124), can perform the operations described.

In one or more embodiments, the tracking component 3204 can facilitate tracking relative locations or positions of objects, things, people, etc., included in an environment based on derived 3D data 116 and/or optimized 3D data 1306 determined for the object over a period of time from 2D image data captured of the object over the period of time. For example, in some implementations, the tracking component 3204 can receive sequential frames of video captured of an object over a period of time captured via one or more cameras. The tracking component 3204 can further use derived 3D data 116 and/or optimized 3D data 1306 determined for the object in at least some of the sequential frames of video to determine the relative position of the object to the camera over the period of time. In some implementations, the computing device 3202 can also house the one or more cameras. In some embodiments, the object comprises a mobile object and the one or more cameras can track the location of the object as the one or more cameras also move over the period of time or remain in a fixed position of the period of time with a perspective of the mobile object. In other embodiments, the object can comprise a fixed object and the one or more cameras can move relative to the object. For example, the one or more cameras can be attached to a moving vehicle or object, held in the hand of a user as the user moves above an environment, and the like.

The live navigation component 3206 can facilitate live navigation of an environment by a moving entity comprising the computing device 3202 and one or more cameras configured to capture and provide the 2D image data (and optionally the native auxiliary data 802). For example, the moving entity can include a user operated vehicle, an autonomously driving vehicle, a drone, a robot or another device that can benefit from knowing its relative location to objects included in the environment that the device is navigating. In accordance with this embodiment, the live navigation component 3206 can continuously, regularly (e.g., at defined points in time), or in response to a trigger (e.g., a sensory signal indicating one or more objects are located within a defined distance to the computing device), capture image data corresponding to a current perspective of the computing device relative to the environment. The 3D-from-2D processing module 1304 can further determine derived 3D data 116 and/or optimized 3D data 1306 for respective objects, things, people, included in the immediate environment of the computing device 3202. Based on the derived 3D data 116 and/or the optimized 3D data 1306 indicating a relative position of the computing device 3202 to one or more objects in the environment being navigated, the live navigation component 3206 can determine navigation information for the entity employing the computing device 3202, including a navigational path that avoids colliding with objects, a navigational path that facilitates brining the entity to a desired position relative to an object in the environment, and the like. In some implementations, the live navigation component 3206 can also use information that semantically identifies objects in included in the environment to facilitate navigation (e.g., where the vehicle should go, what the vehicle should avoid, etc.).

The 3D feature authentication component 3208 can employ derived 3D data 116 and/or optimized 3D data determined for an object to facilitate an authentication procedure. For example, in some embodiments, the object can include a person's face and the derived 3D data 116 and/or the optimized 3D data can include provide a depth map of the surface of the person's face. This depth map can be used to facilitate face based biometric authentication of an identity of a user.

Figure 33:
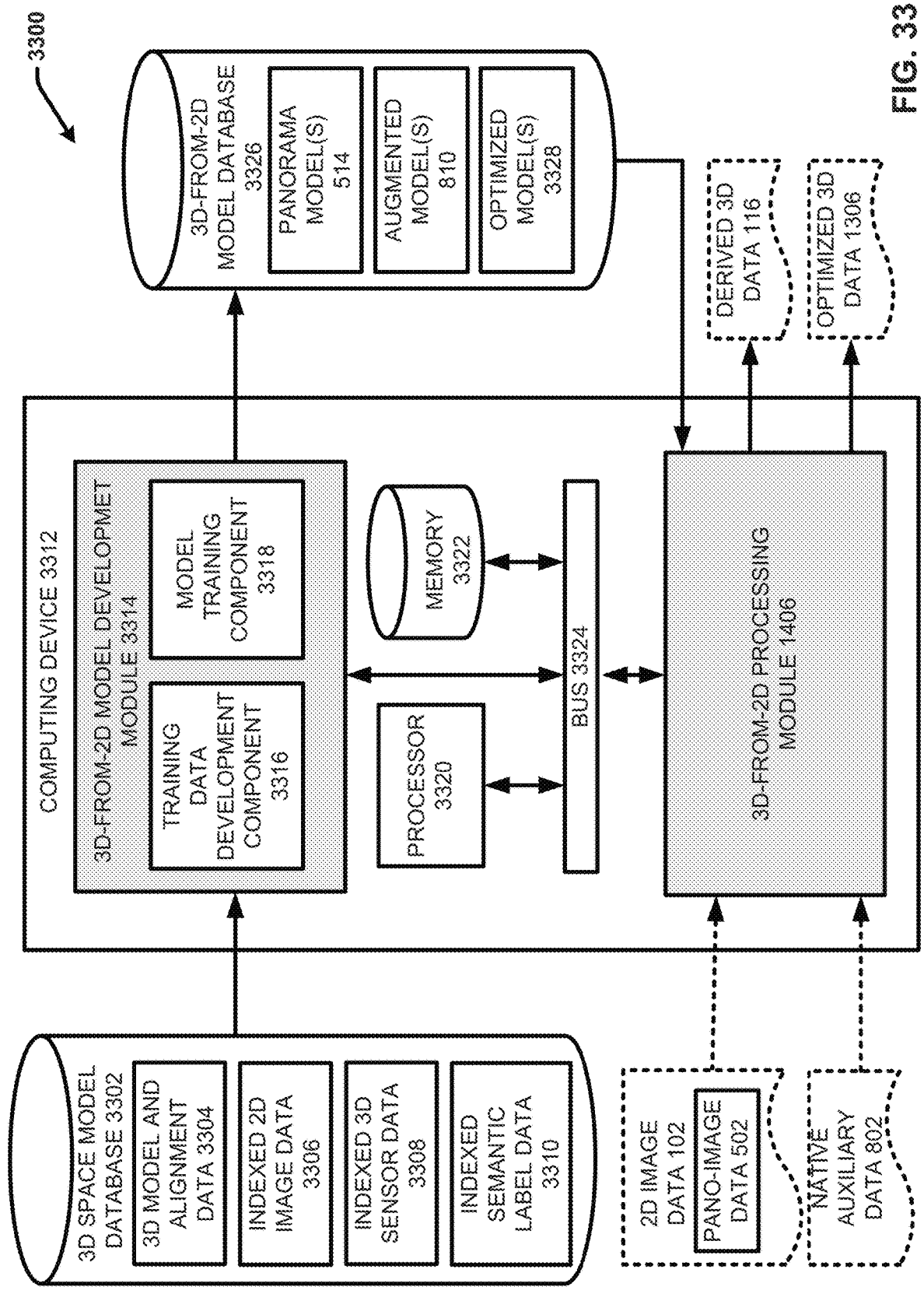
FIG. 33 presents an example system for developing and training 2D-from-3D models in accordance with various aspects and embodiments described herein.

FIG. 33 presents an example system 3300 for developing and training 2D-from-3D models in accordance with various aspects and embodiments described herein. System 3300 includes at least some same or similar features as previous systems disclosed herein (e.g., 3D-from-2D processing module 1406, 2D image data 102, pano-image data 502, native auxiliary data 802, derived 3D data 116, and optimized 3D data 1306). Repetitive description of like elements employed in respective embodiments is omitted for sake of brevity.

In the embodiment shown, system 3300 comprises a computing device 3312 including computer executable components, including a 3D-from-2D development module 3314 and 3D-from-2D processing module 1406. The computing device 3312 can include or be operatively coupled to at least one memory 3322 and at least one processor 3320. In one or more embodiments, the at least one memory 3322 can further store computer-executable instructions (e.g., the 3D-from-2D development module 3314 and the 2D-from-3D processing module 1406) that when executed by the at least one processor 3320 facilitate performance of operations defined by the computer-executable instructions. In some embodiments, the memory 3322 can also store information received, generated by, and/or employed by the computing device 3312, (e.g., the 3D space model database 3302, the 3D-from-2D model database 3326, the received 2D image data 102, the received native auxiliary data 802, the derived 3D data 116, the optimized 3D data 1306, and/or additional training data generated by the 3D-from-2D model development module 3314 discussed below). The computing device 3312 can further include a device bus 3324 that communicatively couples the various components of the computing device 3312. Examples of said processor 3320 and memory 3322, as well as other suitable computer or computing-based elements that can be used in connection with implementing one or more of the systems or components shown and described in connection with FIG. 33 or other figures disclosed herein, can be found with reference to FIG. 35.

System 3300 further includes 3D space model database 3302 and 3D-from-2D model database 3326. In one or more embodiments, the 3D-from-2D model development module 3314 can be configured to facilitate generating and/or training one or more 3D-from-2D models included in the 3D-from-2D model database 3326 based at least in part on data provided by the 3D space model database 3302. For example, in the embodiment shown, the 3D-from-2D model development module 3314 can include training data development component 3316 to facilitate gathering and/or generating training data based on various types of rich 3D model information (discussed below) provided by the 3D space model database 3302. The 3D-from-2D model development module 3314 can further include model training component 3318, which can be configured to employ the training data to train and/or develop one or more 3D-from-2D neural network models included in the 3D-from-2D model database 3326. The 3D-from-2D processing module 1406 can further employ the 3D-from-2D models included in the 3D-from-2D model database 3326 to generate derived 3D data 116 and/or optimized 3D data 1306 based on received input data including 2D image data 102 and/or native auxiliary data 802 in accordance with the various techniques described supra.

In one or more embodiments, the 3D space model database 3302 can include a plethora of proprietary data associated with previously generated 3D space models that were generated using proprietary alignment techniques (e.g., those described herein), captured 2D image data, and associated captured depth data captured by various 3D sensors. In this regard, data used to generate the 3D space models can be collected from scans (e.g. utilizing one or more types of 3D sensors) of real-world scenes, spaces (e.g. houses, office spaces, outdoor spaces, etc.), objects (e.g. furniture, decorations, goods, etc.), and the like. Data can also be generated based on computer implemented 3D modeling systems. For example, in some embodiments, the 3D space models were generated using one or more 2D/3D capture devices and/or systems described with reference to U.S. patent application Ser. No. 15/417,162 filed on Jan. 26, 2017 and entitled "CAPTURING AND ALIGNING PANORAMIC IMAGE AND DEPTH DATA," and U.S. patent application Ser. No. 14/070,426, filed on Nov. 1, 2013 and entitled, "CAPTURING AND ALIGNING THREE-DIMENSIONAL SCENES," the entirety of which is incorporated herein by reference. In some embodiments, the data provided by the 3D space model database 3302 can also include information for 3D space models generated by the 3D model generation component 118 in accordance with techniques described herein. The 3D space model database 3302 can also include information for the 3D space models 3028 discussed with reference to FIG. 30.

In this regard, the 3D space model database 3302 can include 3D model and alignment data 3304, indexed 2D image data 3306, indexed 3D sensor data 3308, and indexed semantic label data 3310. The 3D model and alignment data 3304 can include previously generated 3D space models for various objects and environments and associated alignment information regarding relative positions of geometric points, shapes, etc. that form the 3D models. For example, the 3D space models can include data representing positions, geometric shapes, curved surfaces, and the like. A 3D space model can also include data comprising a collection of points represented by 3D coordinates, such as points in a 3D Euclidean space. The collection of points can be associated with each other (e.g. connected) by geometric entities. For example, a mesh comprising a series of triangles, lines, curved surfaces (e.g. non-uniform rational basis splines (NURBS)), quads, n-grams, or other geometric shapes can connect the collection of points. For example, a 3D model of an interior environment of building can comprise mesh data (e.g., a triangle mesh, a quad mesh, a parametric mesh, etc.), one or more texture-mapped meshes (e.g., one or more texture-mapped polygonal meshes, etc.), a point cloud, a set of point clouds, surfels and/or other data constructed by employing one or more 3D sensors. In some implementations, portions of the 3D model geometric data (e.g., the mesh) can include image data describing texture, color, intensity, and the like. For example, the geometric data can comprise data points of geometry in addition to comprising texture coordinates associated with the data points of geometry (e.g., texture coordinates that indicate how to apply texture data to geometric data).

The indexed 2D image data 3306 can include 2D image data used to generate the 3D space models represented by the 3D model and alignment data 3304. For example, the indexed 2D image data 3306 can include the collection of images used to generate a 3D space model and further include information associating the respective images with portions of the 3D space model. For example, the 2D image data can be associated with portions of a 3D model mesh to associate visual data from the 2D image data 102 (e.g., texture data, color data, etc.) with the mesh. The indexed 2D image data 3306 can also include information associating 2D images with specific locations of the 3D model and/or specific perspectives for viewing the 3D space model. The indexed 3D sensor data 33308 can include 3D/depth measurements associated with the respective 2D images used to generate the 3D space models. In this regard, the indexed 3D sensor data 3308 can include captured 3D sensor readings captured by one or more 3D sensors and associated with respective pixels, superpixels, objects, etc. of the respective 2D images, that was used to align the 2D images to generate the 3D space models. The indexed semantic label data 3310 can include semantic labels previously determined and associated with respective objects or features of the 3D space models. For example, the indexed semantic label data 3310 can identify wall, ceilings, fixtures, appliances, etc., included in a 3D model, and further include information identifying the spatial boundaries of the respective objects within the 3D space models.

Conventional training data used to generate 3D-from-2D neural network models includes 2D images with known depth data for respective pixels, superpixels, objects, etc., included in the respective 2D images, such as the indexed 3D sensor data 3308 associated with the respective 2D images included in the indexed 2D image data 3306 used to generate the 3D space models included in the 3D model and alignment data 3304. In one or more embodiments, the training data development module 3314 can extract this training data (e.g., indexed 2D images and associated 3D sensor data) from the 3D space model database 3302 for provision to the model training component 3318 to use in association with generating and/or training the one or more 3D-from-2D neural network models included in the 3D-from-2D model database 3326. In various additional embodiments, the training data development component 3316 can further use the reconstructed 3D space models to create training examples that were never directly captured by 3D sensors for the respective 2D images. For example, in some implementations, the training data development component 3316 can employ a textured 3D mesh of a 3D space model included in the 3D model and alignment data 3304 to generate 2D images from camera positions where a real camera was never placed. For instance, the training data development component 3316 can use capture position/orientation information for respective images included in the indexed 2D image data 3306 to determine various virtual capture position/orientation combinations that are not represented by the captured 2D images. The training data development component 3316 can further generate synthetic images of the 3D model from these virtual capture positions/orientations. In some implementations, the training data development component 3316 can generate synthetic 2D images from various perspective of the 3D model that correspond to a sequence of images captured by a virtual camera in association with navigating the 3D space model, wherein the navigation assimilates a capture scenario as if a user were actually walking through the environment represented by the 3D model while holding a camera and capturing images along the way.

The training data development component 3316 can also generate other forms of training data to associated with the synthetic 2D images and actual 2D images in a similar manner. For example, training data development component 3316 can generate IMU measurements, magnetometer or depth sensor data, and the like, as if such a sensor were being placed in or moved through the 3D space. The training data development component 3316 can generate depth data for respective pixels, superpixels, objects, etc., included in the synthetic images based on known positions of points included in the synthetic images and the virtual camera capture position and orientation (from which the virtual camera captured the synthetic image) relative to the 3D space model. In another example, the training data development component 3316 can determine depth data for a captured 2D image based on aligning visual features of the 2D image with known features of the 2D model for which depth information is available. Generate other inputs as if a particular sensor had been used within the 3D space.

In some embodiments, the training data development component 3316 can further employ the 3D space models included in the 3D model and alignment data 3304 to create synthetic "ground truth" 3D data from those reconstructed environments to match each 2D used to create the 3D space model (e.g., included in the indexed 2D image data 3306) as well as synthetic 2D images generated from perspectives of the 3D space model that were never actually captured from the actual environment by an actual camera. As a result, the synthetic 3D "ground truth" data for the respective images can exceed the quality of actual 3D sensor data captured for the respective images (e.g., actual 3D sensor data captured for the respective images included in the indexed 3D sensor data 3308), thereby improving training results. In this regard, because the synthetic 3D data is derived from a 3D model generated based on aligning several images to one another with overlapping or partially overlapping image data using various alignment optimizations techniques, the aligned positions 3D positions of respective points in the images can become more accurate than 3D sensor data associated with the individual images captured by a 3D sensor. In this regard, an aligned pixel of a single 2D image as included in the 3D model will have a 3D position relative to the 3D model that has been determined not only based on captured 3D sensor data associated with the 2D image, but the alignment process used to create the 3D model, wherein the relative positions of other images to the 2D image and a 3D coordinate space were used to determine a final 3D position of the aligned pixel. Thus, the aligned 3D pixel position as associated with the 3D model can be considered more accurate that a 3D measurement for the pixel captured by a depth sensor.

In one or more additional embodiments, the training data development component 3316 can also extract additional scene information associated with a 3D space model, such as semantic labels included in the indexed semantic label data 3310, and include it with respective 2D images used as training data. In this regard, the training data development component 3316 can use the indexed semantic label data 3310 to determine and associate semantic labels with the 2D images (e.g., the indexed 2D images and/or synthetic 2D images) used by the model training component 3318 to develop and/or train the 3D-from-2D neural network models. This allows the model training component 3318 to train a 3D-from-2D neural network model to predict semantic labels (e.g. wall, ceiling, door, etc.) without requiring human annotation of the dataset.

In various embodiments, the model training component 3318 can employ the training data gathered and/or generated by the training data development component 3316 to train and/or develop one or more 3D-from-2D neural network models included in the 3D-from-2D model database 3326. In some implementations, the 3D-from-2D model database 3326 can be, include, or correspond to 3D-from-2D model database 112. For example, in the embodiment shown, the 3D-from-2D model database can include one or more panorama models 514, and one or more augmented models 810. In some implementations, the model training component 3318 can generate and/or train the one or more panorama models 514 and/or the one or more augmented models 810 (discussed supra), based at least in part on the training data provided by the training data development component 3316. The 3D-from-2D model database 3326 can also include one or more optimized models 3328. The one or more optimized models 3328 can include one or more 3D-from-2D neural network models that have been specifically trained using the training data provided by the training data development component 3316. In this regard, the one or more optimized models 3328 can employ various 3D-from-2D derivation techniques to derive 3D data from 2D images discussed herein, including the 3D-from-2D derivation techniques discussed with reference to the one or more standard models 114. However, relative to other 3D-from-2D models trained on conventional input data, the one or more optimized models 3328 can be configured to generate more precise and accurate depth derivation results based on training using the training data provided by the training data development component 3316. For example, in some embodiments, the optimized models 3328 can include a standard 3D-from-2D model that has been specifically trained using the training data provided by the training data development component 3316. As a result, the standard model 3D-from-2D model can be transformed into an optimized 3D-from-2D model configured to provide more accurate results relative to a standard 3D-from-2D model trained based on alternative training data (e.g., training data not provided the training data development component 3316).

Figure 34:
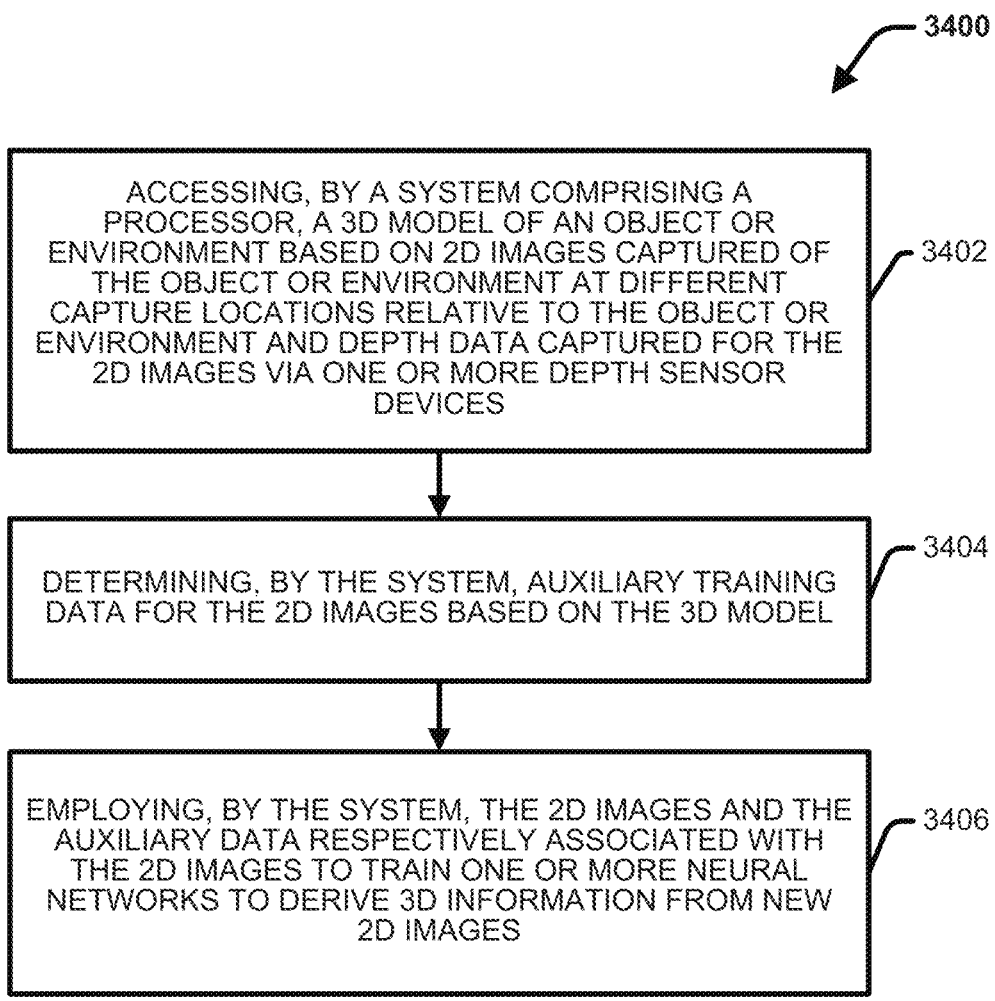
FIG. 34 presents an example computer-implemented method for developing and training 2D-from-3D models in accordance with various aspects and embodiments described herein.

FIG. 34 presents an example computer-implemented method 3400 for developing and training 2D-from-3D models in accordance with various aspects and embodiments described herein. Repetitive description of like elements employed in respective embodiments is omitted for sake of brevity.

At 3402, a system operatively coupled to a processor (e.g., system 3300), accesses (e.g., from 3D space model database 3302), a 3D model of an object or environment generated based on 2D images captured of the object or environment at different capture locations relative to the object or environment and depth data captured for the 2D images via one or more depth sensor devices (e.g., using training data development component 3316). At 3318, the system determines auxiliary training data for the 2D images based on the 3D model. For example, the training data development component 3316 can determine semantic labels for the images and/or synthetic 3D data for the 2D images. Then at 3406, the system can employ the 2D images and the auxiliary training data to train one or more 3D-from-2D neural networks to derive 3D information from new 2D images. the auxiliary data is treated as ground truth data in association with employing the auxiliary data to train the one or more neural networks.

Example Operating Environments

Figure 35:
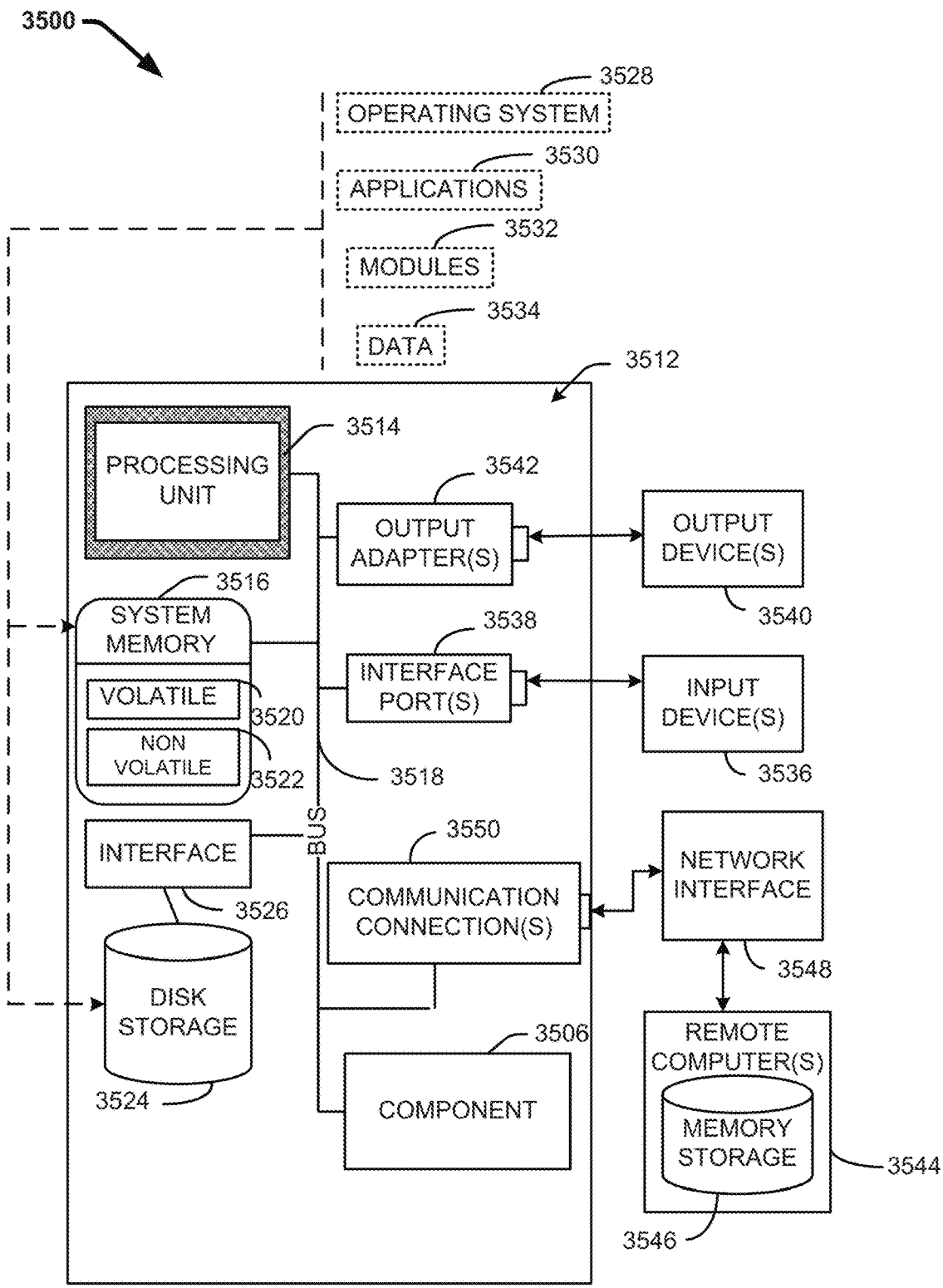
FIG. 35 is a schematic block diagram illustrating a suitable operating environment in accordance with various aspects and embodiments.
Figure 36:
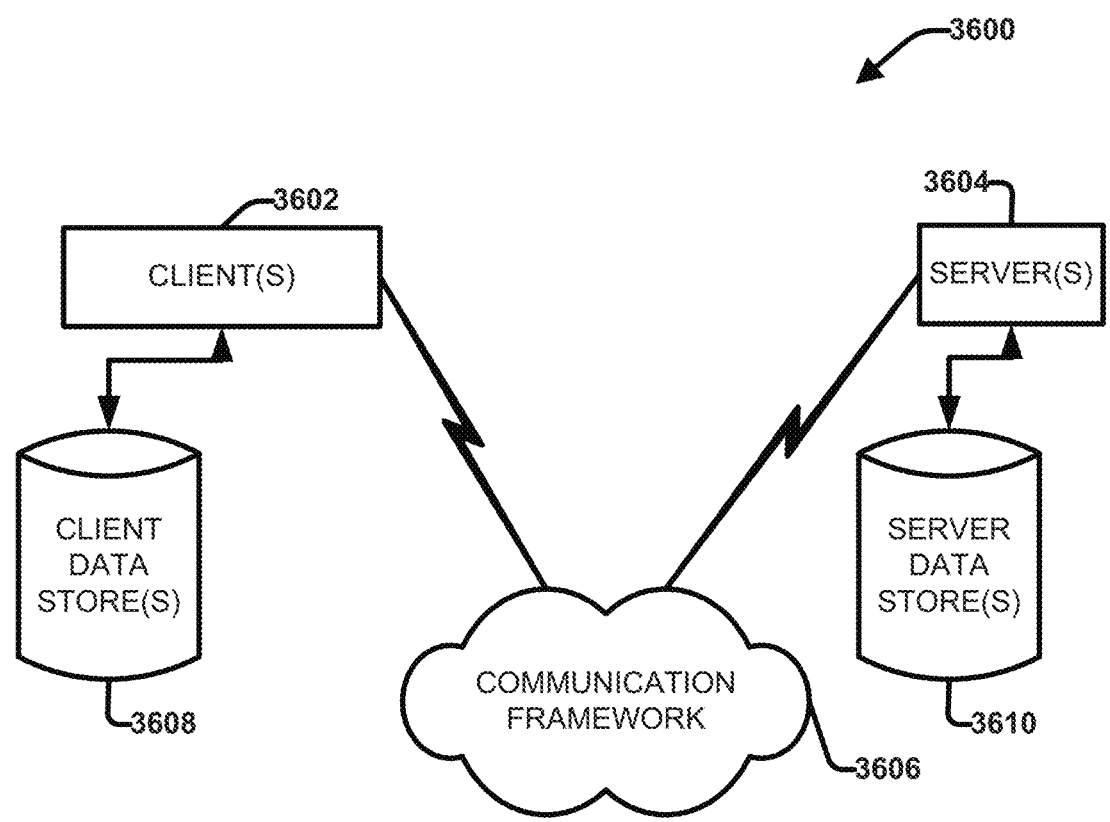
FIG. 36 is a schematic block diagram of a sample-computing environment in accordance with various aspects and embodiments.

In order to provide a context for the various aspects of the disclosed subject matter, FIGS. 35 and 36 as well as the following discussion are intended to provide a brief, general description of a suitable environment in which the various aspects of the disclosed subject matter may be implemented.

With reference to FIG. 35, a suitable environment 3500 for implementing various aspects of this disclosure includes a computer 3512. The computer 3512 includes a processing unit 3514, a system memory 3516, and a system bus 3518. The system bus 3518 couples system components including, but not limited to, the system memory 3516 to the processing unit 3514. The processing unit 3514 can be any of various available processors. Dual microprocessors and other multiprocessor architectures also can be employed as the processing unit 3514.

The system bus 3518 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 3516 includes volatile memory 3520 and nonvolatile memory 3522. The basic input/output system (BIOS), containing the basic routines to transfer information between elements within the computer 3512, such as during start-up, is stored in nonvolatile memory 3522. By way of illustration, and not limitation, nonvolatile memory 3522 can include read only memory (ROM), programmable ROM (PROM), electrically programmable ROM (EPROM), electrically erasable programmable ROM (EEPROM), flash memory, or nonvolatile random access memory (RAM) (e.g. ferroelectric RAM (FeRAM). Volatile memory 3520 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 3512 also includes removable/non-removable, volatile/non-volatile computer storage media. FIG. 35 illustrates, for example, a disk storage 3524. Disk storage 3524 includes, but is not limited to, devices like a magnetic disk drive, floppy disk drive, tape drive, Jaz drive, Zip drive, LS-100 drive, flash memory card, or memory stick. The disk storage 3524 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 3524 to the system bus 3518, a removable or non-removable interface is typically used, such as interface 3526.

FIG. 35 also depicts software that acts as an intermediary between users and the basic computer resources described in the suitable operating environment 3500. Such software includes, for example, an operating system 3528. Operating system 3528, which can be stored on disk storage 3524, acts to control and allocate resources of the computer system 3512. System applications 3530 take advantage of the management of resources by operating system 3528 through program modules 3532 and program data 3534, e.g. stored either in system memory 3516 or on disk storage 3524. It is to be appreciated that this disclosure can be implemented with various operating systems or combinations of operating systems.

A user enters commands or information into the computer 3512 through input device(s) 3536. Input devices 3536 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 3514 through the system bus 3518 via interface port(s) 3538. Interface port(s) 3538 include, for example, a serial port, a parallel port, a game port, and a universal serial bus (USB). Output device(s) 3540 use some of the same type of ports as input device(s) 3536. Thus, for example, a USB port may be used to provide input to computer 3512, and to output information from computer 3512 to an output device 3540. Output adapter 3542 is provided to illustrate that there are some output devices 3540 like monitors, speakers, and printers, among other output devices 3540, which require special adapters. The output adapters 3542 include, by way of illustration and not limitation, video and sound cards that provide a means of connection between the output device 3540 and the system bus 3518. It should be noted that other devices and/or systems of devices provide both input and output capabilities such as remote computer(s) 3544.

Computer 3512 can operate in a networked environment using logical connections to one or more remote computers, such as remote computer(s) 3544. The remote computer(s) 3544 can be a personal computer, a server, a router, a network PC, a workstation, a microprocessor based appliance, a peer device or other common network node and the like, and typically includes many or all of the elements described relative to computer 3512. For purposes of brevity, only a memory storage device 3546 is illustrated with remote computer(s) 3544. Remote computer(s) 3544 is logically connected to computer 3512 through a network interface 3548 and then physically connected via communication connection 3550. Network interface 3548 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 3550 refers to the hardware/software employed to connect the network interface 3548 to the bus 3518. While communication connection 3550 is shown for illustrative clarity inside computer 3512, it can also be external to computer 3512. The hardware/software necessary for connection to the network interface 3548 includes, for exemplary purposes only, internal and external technologies such as, modems including regular telephone grade modems, cable modems and DSL modems, ISDN adapters, and Ethernet cards.

It is to be appreciated that the computer 3512 can be used in connection with implementing one or more of the systems, components and/or methodologies shown and described in connection with FIGS. 1-34. In accordance with various aspects and implementations, the computer 3512 can be used to facilitate determining and/or executing commands associated with deriving depth data from 2D images, employing the derived depth data for various applications, including AR and object tracking, generating training data, and the like (e.g., by systems 100, 500, 800, 1300, 3000, 3200 and 3300). Computer 3512 can further provided for various processing of 2D image data and 3D depth data described in association with primary processing component 104, secondary processing component 110, tertiary processing component 114, processing component 420, processing component 1222 and processing component 1908. Computer 3512 can further provide for rendering and/or displaying 2D/3D image data and video data generated by the various 2D/3D panoramic capture devices, apparatus and systems described herein. Computer 3512 includes component 3506 which can embody one or more of the various components described in association with the various systems, apparatuses, assemblies, and computer readable mediums described herein.

FIG. 36 is a schematic block diagram of a sample-computing environment 3600 with which the subject matter of this disclosure can interact. The system 3600 includes one or more client(s) 3610. The client(s) 3610 can be hardware and/or software (e.g. threads, processes, computing devices). The system 3600 also includes one or more server(s) 3630. Thus, system 3600 can correspond to a two-tier client server model or a multi-tier model (e.g. client, middle tier server, data server), amongst other models. The server(s) 3630 can also be hardware and/or software (e.g. threads, processes, computing devices). The servers 3630 can house threads to perform transformations by employing this disclosure, for example. One possible communication between a client 3610 and a server 3630 may be in the form of a data packet transmitted between two or more computer processes.

The system 3600 includes a communication framework 3650 that can be employed to facilitate communications between the client(s) 3610 and the server(s) 3630. The client(s) 3610 are operatively connected to one or more client data store(s) 3620 that can be employed to store information local to the client(s) 3610. Similarly, the server(s) 3630 are operatively connected to one or more server data store(s) 3640 that can be employed to store information local to the servers 3630.

It is to be noted that aspects or features of this disclosure can be exploited in substantially any wireless telecommunication or radio technology, e.g. Wi-Fi; Bluetooth; Worldwide Interoperability for Microwave Access (WiMAX); Enhanced General Packet Radio Service (Enhanced GPRS); Third Generation Partnership Project (3GPP) Long Term Evolution (LTE); Third Generation Partnership Project 2 (3GPP2) Ultra Mobile Broadband (UMB); 3GPP Universal Mobile Telecommunication System (UMTS); High Speed Packet Access (HSPA); High Speed Downlink Packet Access (HSDPA); High Speed Uplink Packet Access (HSUPA); GSM (Global System for Mobile Communications) EDGE (Enhanced Data Rates for GSM Evolution) Radio Access Network (GERAN); UMTS Terrestrial Radio Access Network (UTRAN); LTE Advanced (LTE-A); etc. Additionally, some or all of the aspects described herein can be exploited in legacy telecommunication technologies, e.g. GSM. In addition, mobile as well non-mobile networks (e.g. the Internet, data service network such as internet protocol television (IPTV), etc.) can exploit aspects or features described herein.

While the subject matter has been described above in the general context of computer-executable instructions of a computer program that runs on a computer and/or computers, those skilled in the art will recognize that this disclosure also can or may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g. PDA, phone), microprocessor-based or programmable consumer or industrial electronics, and the like. The illustrated aspects may also be practiced in distributed computing environments where tasks are performed by remote processing devices that are linked through a communications network. However, some, if not all aspects of this disclosure can be practiced on stand-alone computers. In a distributed computing environment, program modules may be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g. data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g. within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

Various aspects or features described herein can be implemented as a method, apparatus, system, or article of manufacture using standard programming or engineering techniques. In addition, various aspects or features disclosed in this disclosure can be realized through program modules that implement at least one or more of the methods disclosed herein, the program modules being stored in a memory and executed by at least a processor. Other combinations of hardware and software or hardware and firmware can enable or implement aspects described herein, including a disclosed method(s). The term "article of manufacture" as used herein can encompass a computer program accessible from any computer-readable device, carrier, or storage media. For example, computer readable storage media can include but are not limited to magnetic storage devices (e.g. hard disk, floppy disk, magnetic strips . . . ), optical discs (e.g. compact disc (CD), digital versatile disc (DVD), blu-ray disc (BD) . . . ), smart cards, and flash memory devices (e.g. card, stick, key drive . . . ), or the like.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g. ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or methods herein are intended to include, without being limited to including, these and any other suitable types of memory.

It is to be appreciated and understood that components, as described with regard to a particular system or method, can include the same or similar functionality as respective components (e.g. respectively named components or similarly named components) as described with regard to other systems or methods disclosed herein.

What has been described above includes examples of systems and methods that provide advantages of this disclosure. It is, of course, not possible to describe every conceivable combination of components or methods for purposes of describing this disclosure, but one of ordinary skill in the art may recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system comprising:
a memory that stores computer executable components; and
a processor that executes the computer executable components stored in the memory, wherein the computer executable components comprise:
a three-dimensional data derivation component configured to employ one or more three-dimensional data from two-dimensional data (3D-from-2D) neural network models to derive three-dimensional data from one or more two-dimensional images captured of an object or environment from a current perspective of the object or environment viewed on or through a display of a device, the one or more 3D-from-2D neural network models are trained based on weighted values applied to respective pixels of the one or more two-dimensional images in association with depth data from the respective pixels, the weighted values being varied based on an angular area of the respective pixels; and
a spatial alignment component configured to determine a position for integrating a graphical data object on or within a representation of the object or environment viewed on or through the display based on the current perspective and the three-dimensional data.

2. The system of claim 1, wherein the computer executable components further comprise:
an integration component to integrate the graphical data object on or within the representation of the object or environment based on the position.

3. The system of claim 2, wherein the spatial alignment component further comprises an occlusion mapping component configured to determine a relative position of the graphical data object to another object included in the representation of the object or environment based on the current perspective and the three-dimensional data.

4. The system of claim 3, wherein based on a determination that the relative position of the graphical data object is behind the other object, the integration component is configured to occlude at least a portion of the graphical data object located behind the other object in association with integrating the graphical data object on or within the representation of the object or environment.

5. The system of claim 3, wherein based on a determination that the relative position of the graphical data object is in front of the other object, the integration component is configured to occlude at least a portion of the other object located behind the graphical data object in association with integrating the graphical data object on or within the representation of the environment.

6. The system of claim 2, wherein the representation of the object or environment comprises a two-dimensional image.

7. The system of claim 6, wherein the graphical data object comprises a three-dimensional object.

8. The system of claim 2, wherein the representation of the object or environment comprises a live view of the environment viewed through a transparent display, and wherein the integration component facilitates rendering the graphical data object on the display.

9. The system of claim 2, wherein the representation of the object or environment comprises a video.

10. The system of claim 1, further comprising:
an object segmentation component configured to extract object image data of an object included in a two-dimensional image, and wherein three-dimensional data derivation component is further configured to employ the one or more 3D-from-2D neural network models to derive object three-dimensional data from the object image data.

11. The system of claim 10, wherein the graphical data object comprises the object image data, and wherein the spatial alignment component is further configured to determine the position for integrating the object image data on or within the representation of the object based on the object three-dimensional data.

12. A method, comprising:
employing, by a system comprising a processor, one or more three-dimensional data from two-dimensional data (3D-from-2D) neural network models to derive three-dimensional data from one or more two-dimensional images captured of an object or environment from a current perspective of the object or environment viewed on or through a display of a device, the 3D-from-2D neural network models are trained based on weighted values applied to respective pixels of the one or more two-dimensional images in association with depth data from the respective pixels, the weighted values being varied based on an angular area of the respective pixels; and
determining, by the system, a position for integrating a graphical data object on or within a representation of the object or environment viewed on or through the display based on the current perspective and the three-dimensional data.

13. The method of claim 12, further comprising:
integrating, by the system, the graphical data object on or within the representation of the object or environment based on the position.

14. The method of claim 13, further comprising:
determining, by the system, a relative position of the graphical data object to another object included in the representation of the object or environment based on the current perspective and the three-dimensional data.

15. The method of claim 14, wherein based on a determination that the relative position of the graphical data object is behind the other object, the method further comprises:
occluding, by the system, at least a portion of the graphical data object located behind the other object in association with integrating the graphical data object on or within the representation of the object or environment.

16. The method of claim 14, wherein based on a determination that the relative position of the graphical data object is behind the other object, the method further comprises:

occluding, by the system, at least a portion of the other object located behind the graphical data object in association with integrating the graphical data object on or within the representation of the environment.

17. The method of claim 13, wherein the representation of the object or environment comprises a two-dimensional image or a video.

18. The method of claim 13, wherein the representation of the object or environment comprises a live view of the environment viewed through a transparent display, and wherein the integrating comprises rendering the graphical data object on the display.

19. A non-transitory machine-readable storage medium comprising executable instructions that, when executed by a processor, facilitate performance of operations, comprising:
   employing one or more three-dimensional data from two-dimensional data (3D-from-2D) neural network models to derive three-dimensional data from one or more two-dimensional images captured of an object or environment from a current perspective of the object or environment viewed on or through a display of a device, the 3D-from-2D neural network models are trained based on weighted values applied to respective pixels of the one or more two-dimensional images in association with depth data from the respective pixels, the weighted values being varied based on an angular area of the respective pixels;
   determining a position for integrating a graphical data object on or within a representation of the object or environment viewed on or through the display based on the current perspective and the three-dimensional data; and
   integrating the graphical data object on or within the representation of the object or environment based on the position.

20. The non-transitory machine-readable storage medium of claim 19, the operations further comprising:
   determining, a relative position of the graphical data object to another object included in the representation of the object or environment based on the current perspective and the three-dimensional data;
   based on a determination that the relative position of the graphical data object is behind the other object, occluding least a portion of the graphical data object located behind the other object in association with integrating the graphical data object on or within the representation of the object or environment; and
   based on a determination that the relative position of the graphical data object is behind the other object, occluding at least a portion of the other object located behind the graphical data object in association with integrating the graphical data object on or within the representation of the environment.

* * * * *